United States Patent [19]
Moore et al.

[11] Patent Number: 5,530,890
[45] Date of Patent: Jun. 25, 1996

[54] HIGH PERFORMANCE, LOW COST MICROPROCESSOR

[75] Inventors: Charles H. Moore, Woodside; Russell H. Fish, III, Mt. View, both of Calif.

[73] Assignee: Nanotronics Corporation, Eagle Point, Oreg.

[21] Appl. No.: 480,206

[22] Filed: Jun. 7, 1995

Related U.S. Application Data

[62] Division of Ser. No. 389,334, Aug. 3, 1989, Pat. No. 5,440,749.

[51] Int. Cl.⁶ ........................................ G06F 9/22
[52] U.S. Cl. ................... 395/800; 364/931; 364/925.6; 364/937.1; 364/965.4; 364/232.8; 364/244.3
[58] Field of Search .................................... 395/375, 500, 395/775, 800

[56] References Cited

U.S. PATENT DOCUMENTS

| | | | |
|---|---|---|---|
| 3,603,934 | 9/1971 | Heath | 395/181 |
| 4,003,033 | 1/1977 | O'Keefe et al. | 395/287 |
| 4,037,090 | 7/1977 | Raymond | 364/706 |
| 4,042,972 | 8/1977 | Grunes et al. | 395/375 |
| 4,050,058 | 9/1977 | Garlic | 395/800 |
| 4,067,058 | 1/1978 | Derchak | 395/740 |
| 4,079,455 | 3/1978 | Ozga | 395/800 |
| 4,110,822 | 8/1978 | Porter | 395/375 |
| 4,125,871 | 11/1978 | Martin | 395/550 |
| 4,128,873 | 12/1978 | Lamiaux | 395/183.06 |
| 4,253,785 | 3/1981 | Chamberlin | 375/375 |
| 4,354,228 | 10/1982 | Moore et al. | 395/800 |
| 4,376,977 | 3/1983 | Brunshorst | 395/375 |
| 4,382,279 | 5/1983 | Mgon | 395/800 |
| 4,403,303 | 9/1983 | Howes et al. | 395/500 |
| 4,450,519 | 5/1984 | Guttag et al. | 395/800 |
| 4,463,421 | 7/1984 | Laws | 395/325 |
| 4,538,239 | 8/1985 | Magar | 364/759 |

(List continued on next page.)

OTHER PUBLICATIONS

C. Whitby–Strevans, "The transputer", *The 12th Annual International Symposium on Computer Architecture, Conference Proceeings*, Jun. 17–19, 1985, pp. 292–300.

D. W. Best et al., "An Advanced–Architecture CMOS/SOS Microprocessor", *IEEE Micro*, vol. 2, No. 3, Aug. 1982, pp. 11–25.

*Primary Examiner*—David Y. Eng
*Attorney, Agent, or Firm*—Cooley Godward Castro Huddleson & Tatum

[57] ABSTRACT

A microprocessor (50) includes a main central processing unit (CPU) (70) and a separate direct memory access (DMA) CPU (72) in a single integrated circuit making up the microprocessor (50). The main CPU (70) has a first 16 deep push down stack (74), which has a top item register (76) and a next item register (78), respectively connected to provide inputs to an arithmetic logic unit (ALU) (80) by lines (82) and (84). An output of the ALU (80) is connected to the top item register (76) by line (86). The output of the top item register at (82) is also connected by line (88) to an internal data bus (90). A loop counter (92) is connected to a decrementer (94) by lines (96) and (98). The loop counter (92) is bidirectionally connected to the internal data bus (90) by line (100). Stack pointer (102), return stack pointer (104), mode register (106) and instruction register (108) are also connected to the internal data bus (90) by lines (110), (112), (114) and (116), respectively. The internal data bus (90) is connected to memory controller (118) and to gate (120). The gate (120) provides inputs on lines (122), (124), and (126) to X register (128), program counter (130) and Y register (132) of return push down stack (134). The X register (128), program counter (130) and Y register (132) provide outputs to internal address bus (136) on lines (138), (140) and (142). The internal address bus provides inputs to the memory controller (118) and to an incrementer (144). The incrementer (144) provides inputs to the X register, program counter and Y register via lines (146), (122), (124) and (126). The DMA CPU (72) provides inputs to the memory controller (118) on line (148). The memory controller (118) is connected to a RAM by address/data bus (150) and control lines (152).

10 Claims, 19 Drawing Sheets

U.S. PATENT DOCUMENTS

| | | | |
|---|---|---|---|
| 4,541,045 | 9/1985 | Kromer | 395/375 |
| 4,562,537 | 12/1985 | Barnett et al. | 395/375 |
| 4,577,282 | 3/1986 | Candel et al. | 395/800 |
| 4,607,332 | 8/1986 | Goldberg | 395/375 |
| 4,626,988 | 12/1986 | George et al. | 395/375 |
| 4,649,471 | 3/1987 | Briggs | 395/325 |
| 4,665,495 | 5/1987 | Thaden | 345/185 |
| 4,709,329 | 11/1987 | Hecker | 395/275 |
| 4,713,749 | 12/1987 | Magar et al. | 395/375 |
| 4,714,994 | 12/1987 | Oklobdzija et al. | 395/375 |
| 4,720,812 | 1/1988 | Kao et al. | 395/700 |
| 4,772,888 | 9/1988 | Kimura | 340/825.5 |
| 4,777,591 | 10/1988 | Chang et al. | 395/800 |
| 4,787,032 | 11/1988 | Culley et al. | 395/725 |
| 4,803,621 | 2/1989 | Kelly | 395/400 |
| 4,860,198 | 8/1989 | Takenaka | 395/307 |
| 4,870,562 | 9/1989 | Kimoto | 395/550 |
| 4,931,986 | 6/1990 | Daniel et al. | 395/550 |
| 5,036,460 | 7/1991 | Takahira | 395/425 |
| 5,070,451 | 12/1991 | Moore et al. | 395/375 |
| 5,127,091 | 6/1992 | Bonfarah | 395/375 |

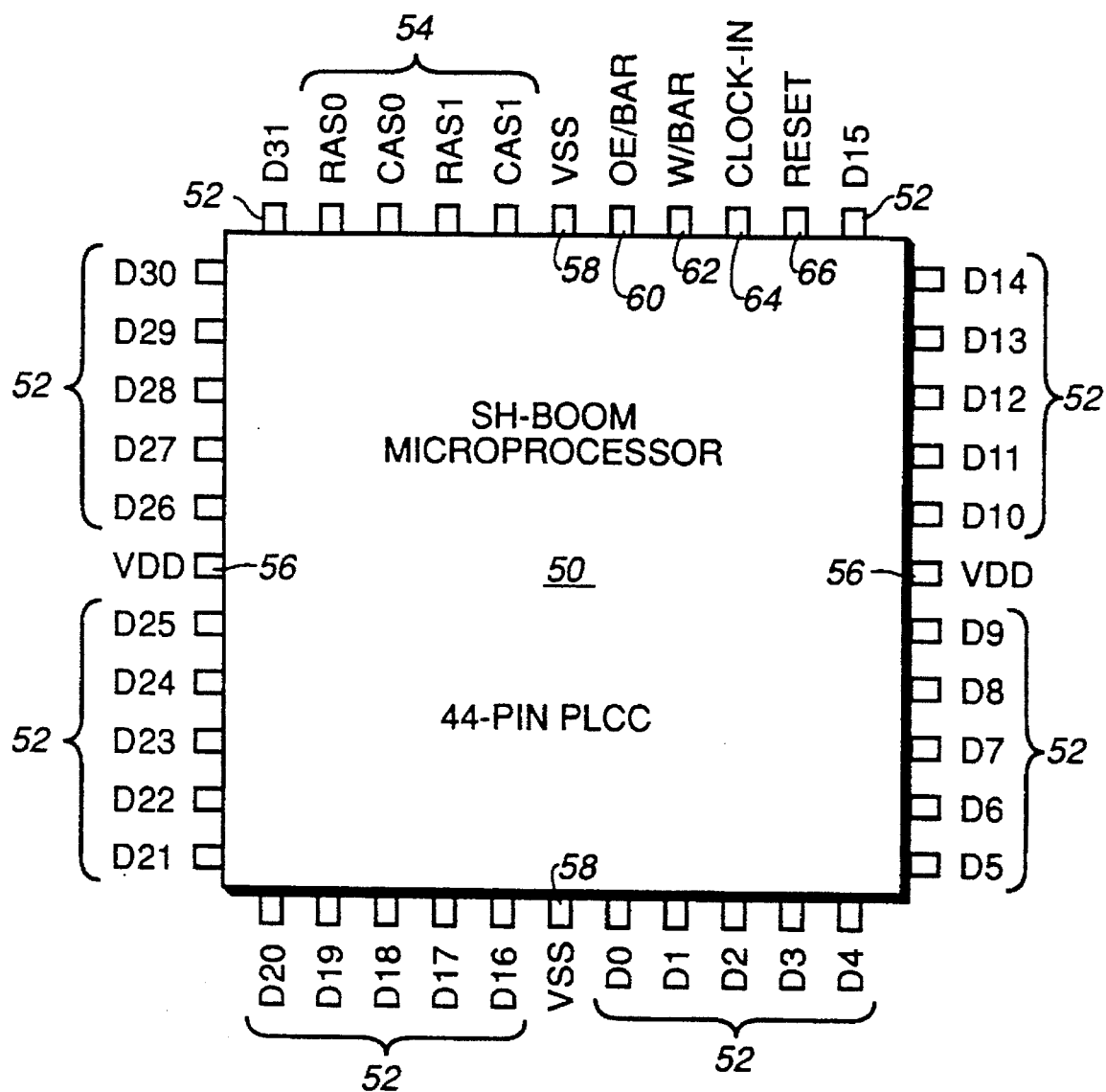
FIG._1

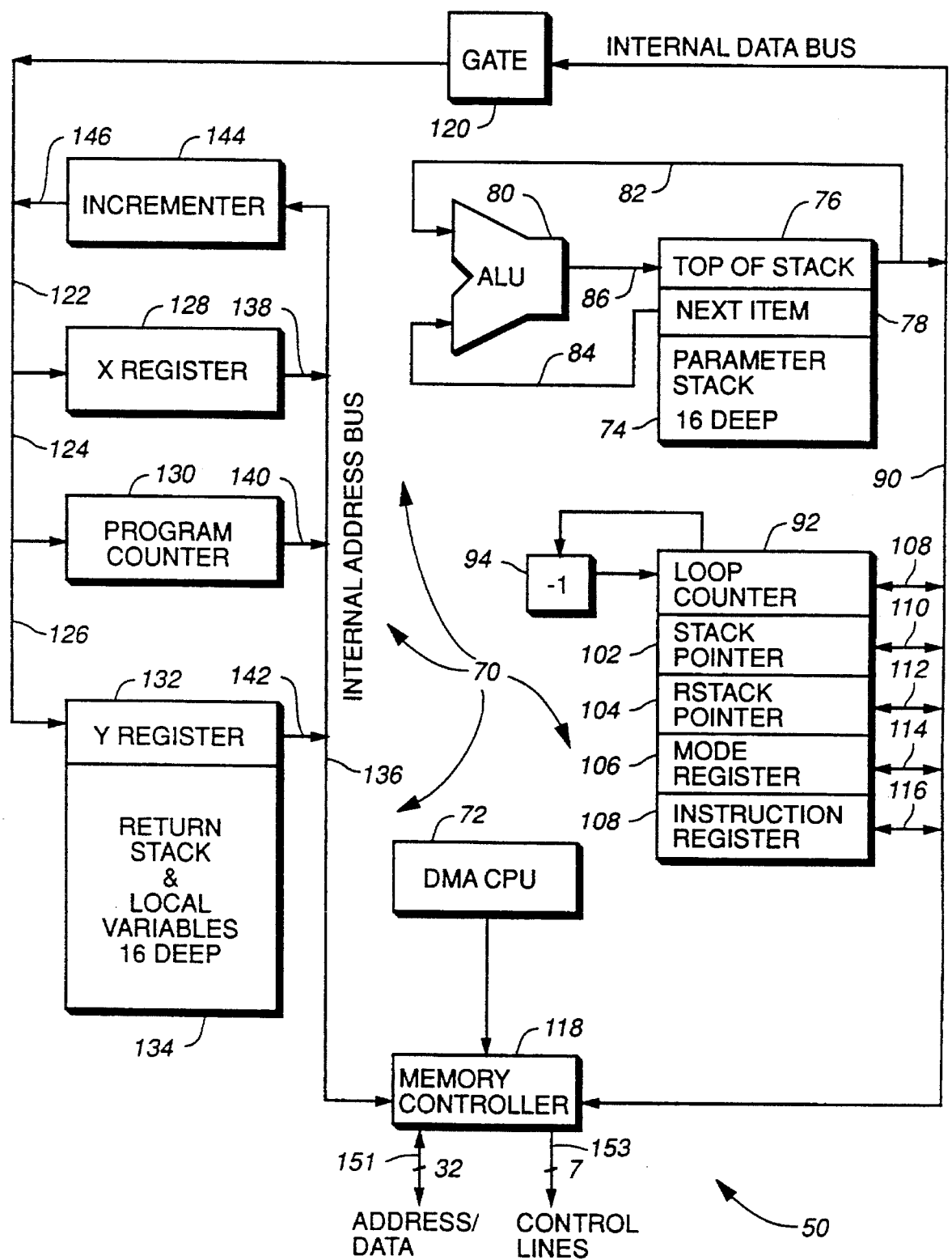
FIG._2

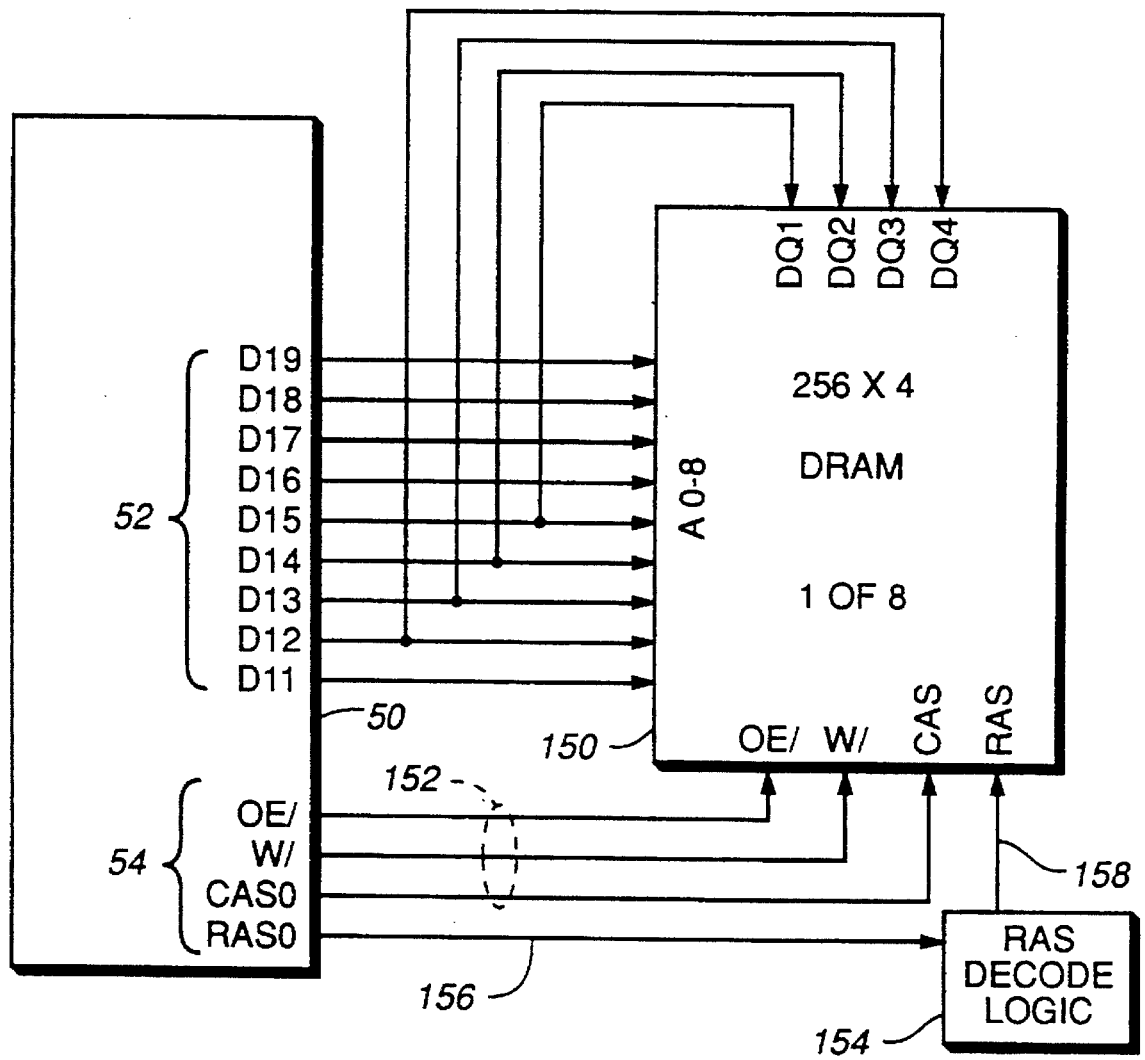
FIG._3

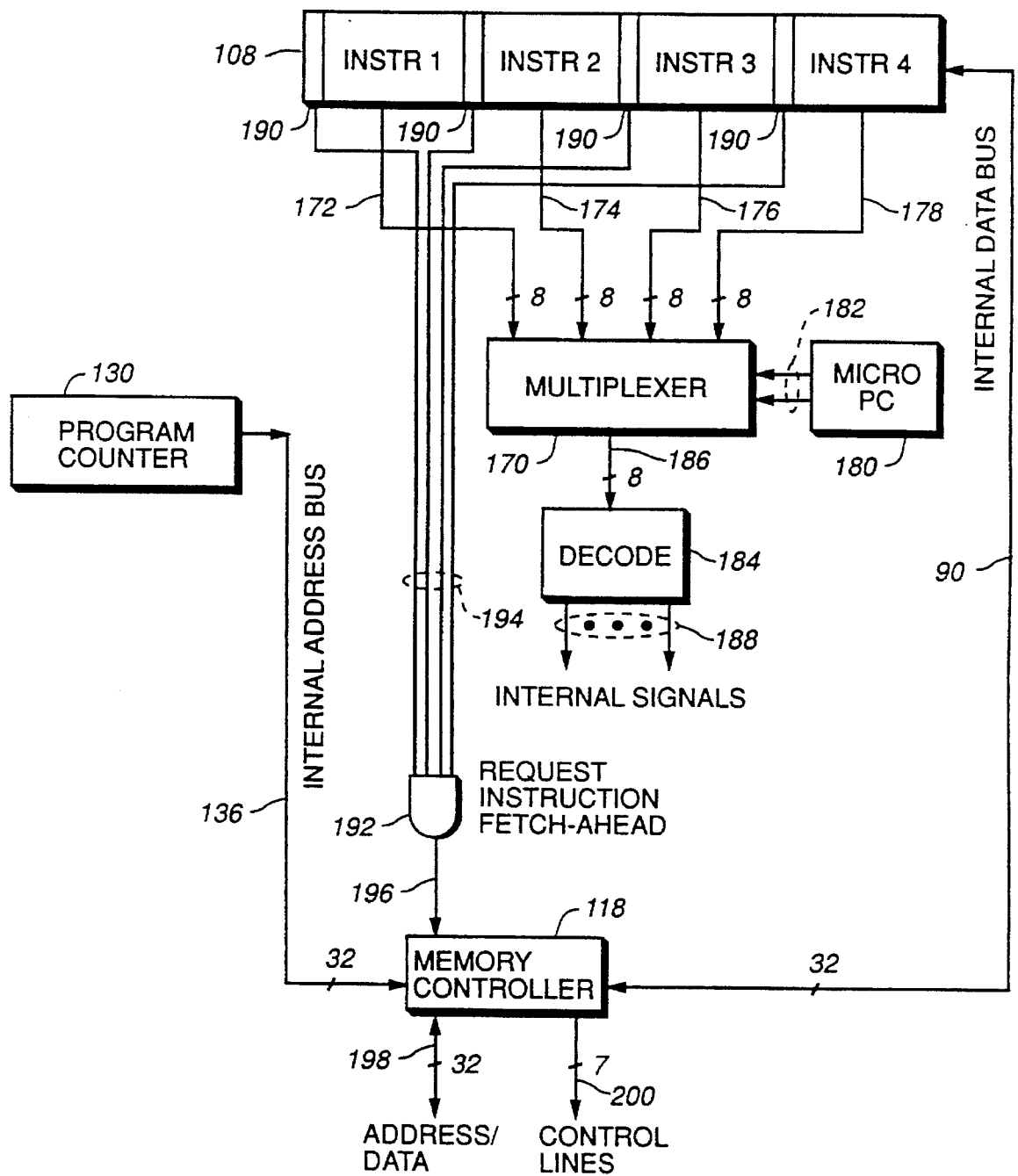
FIG._4

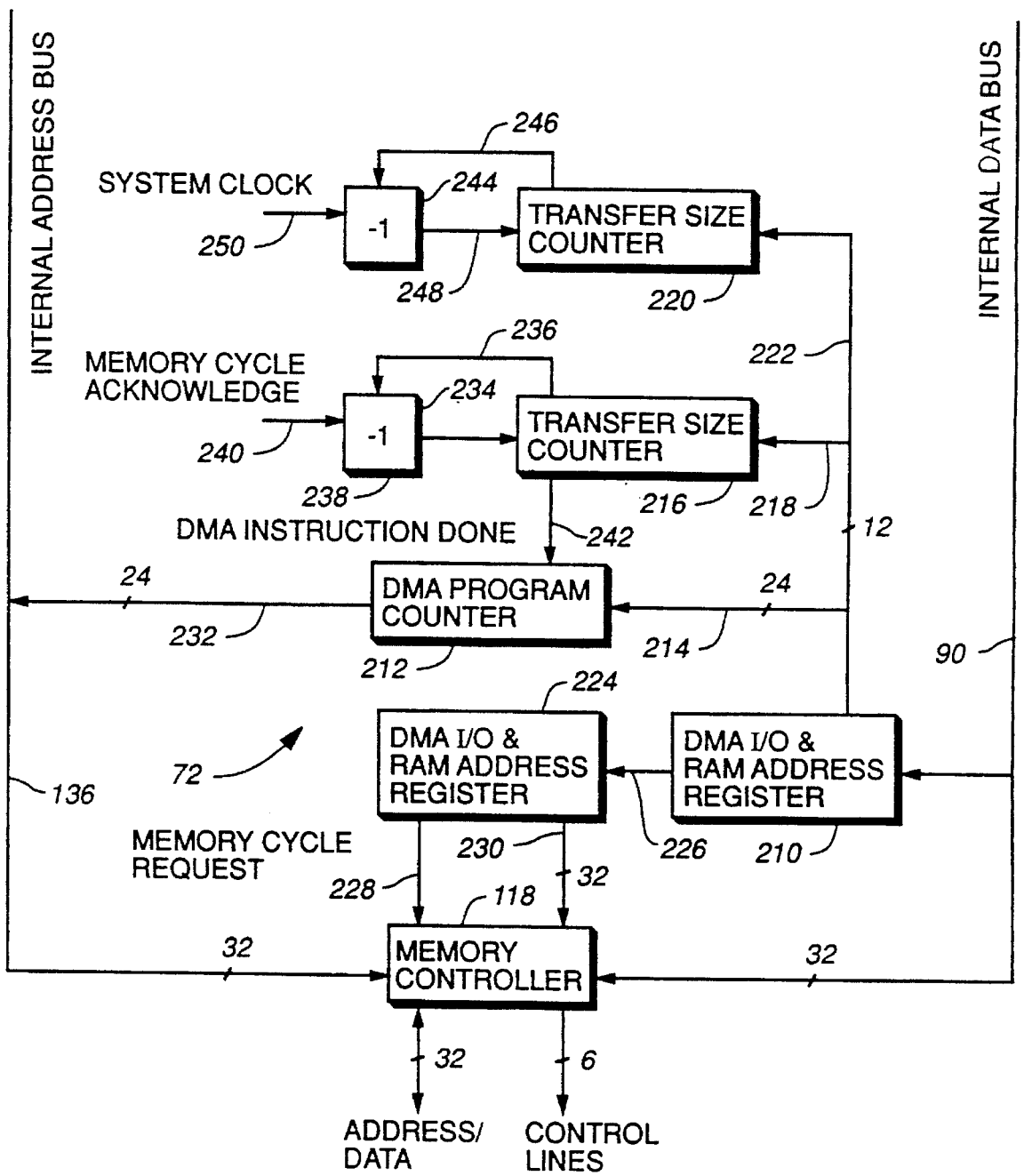
FIG._5

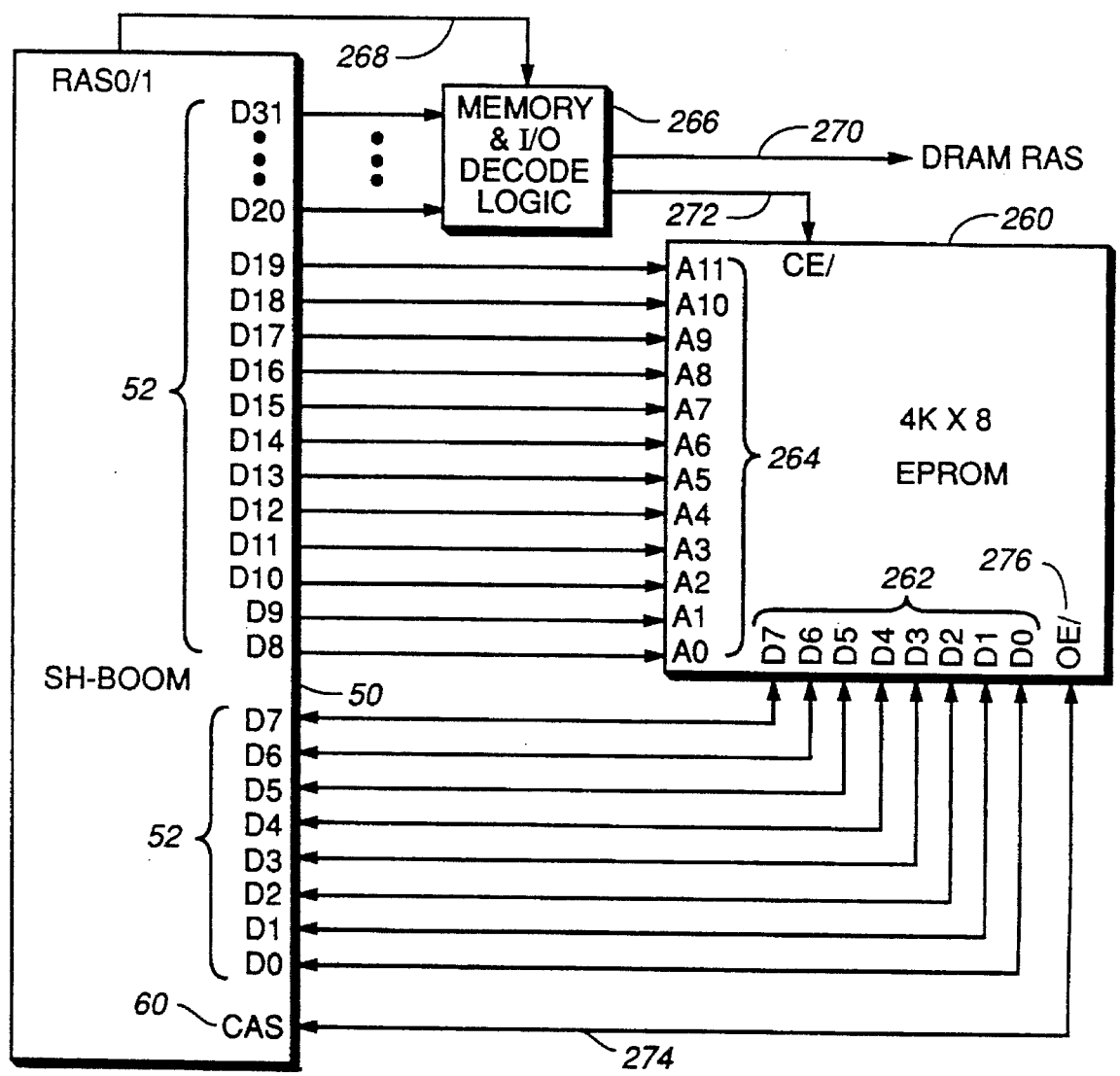
FIG._6

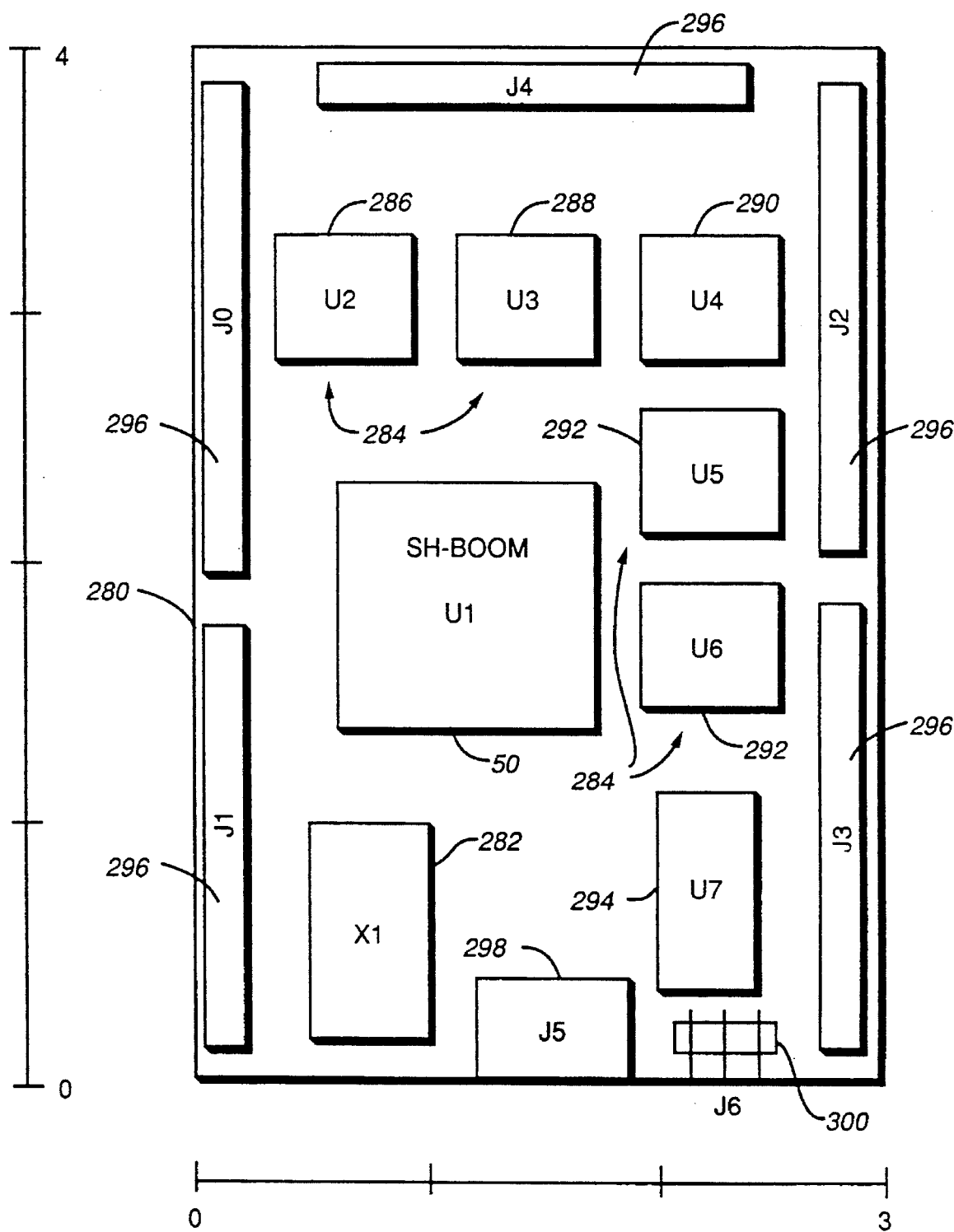
FIG._7

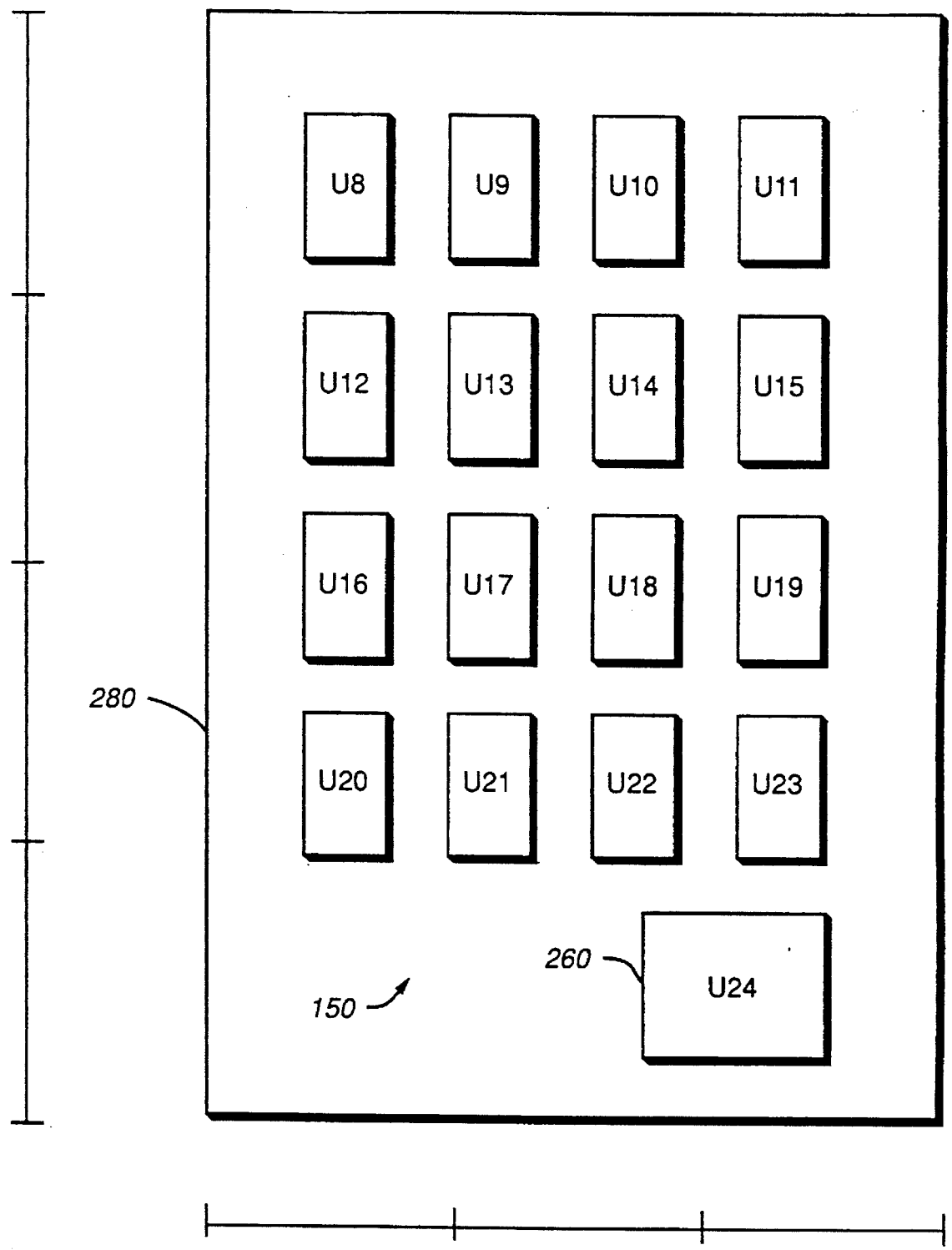
FIG._8

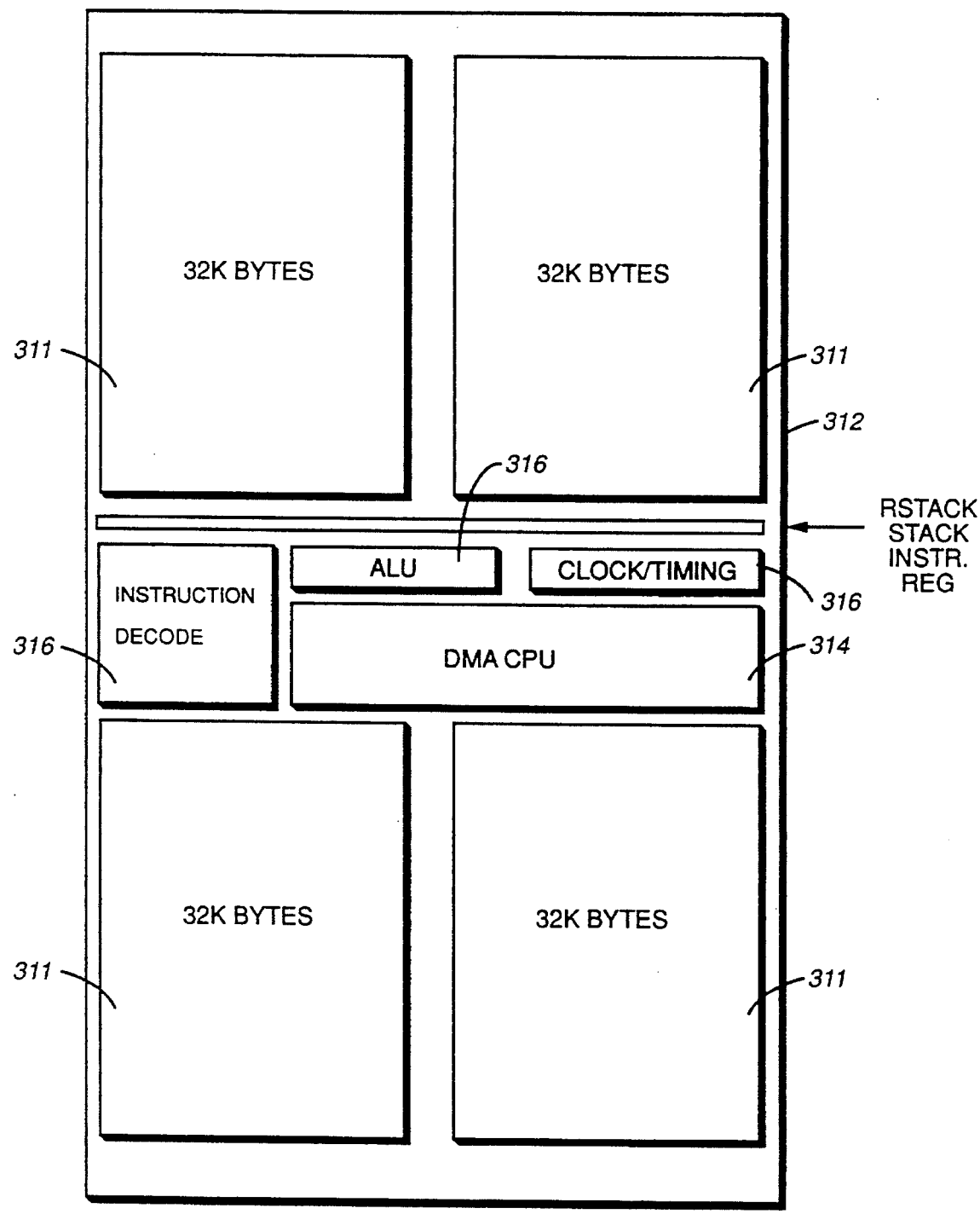
FIG._9

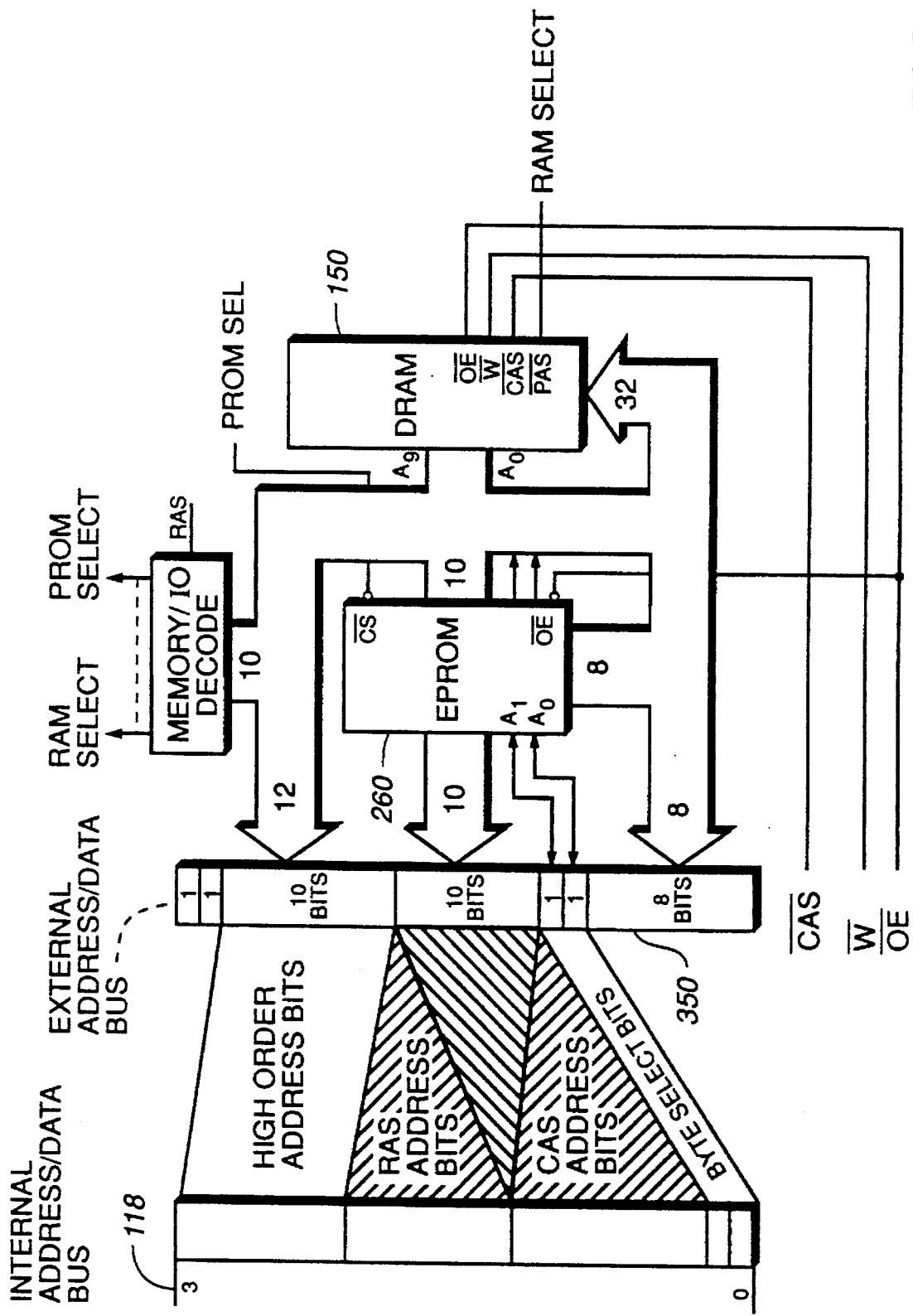
FIG.—10

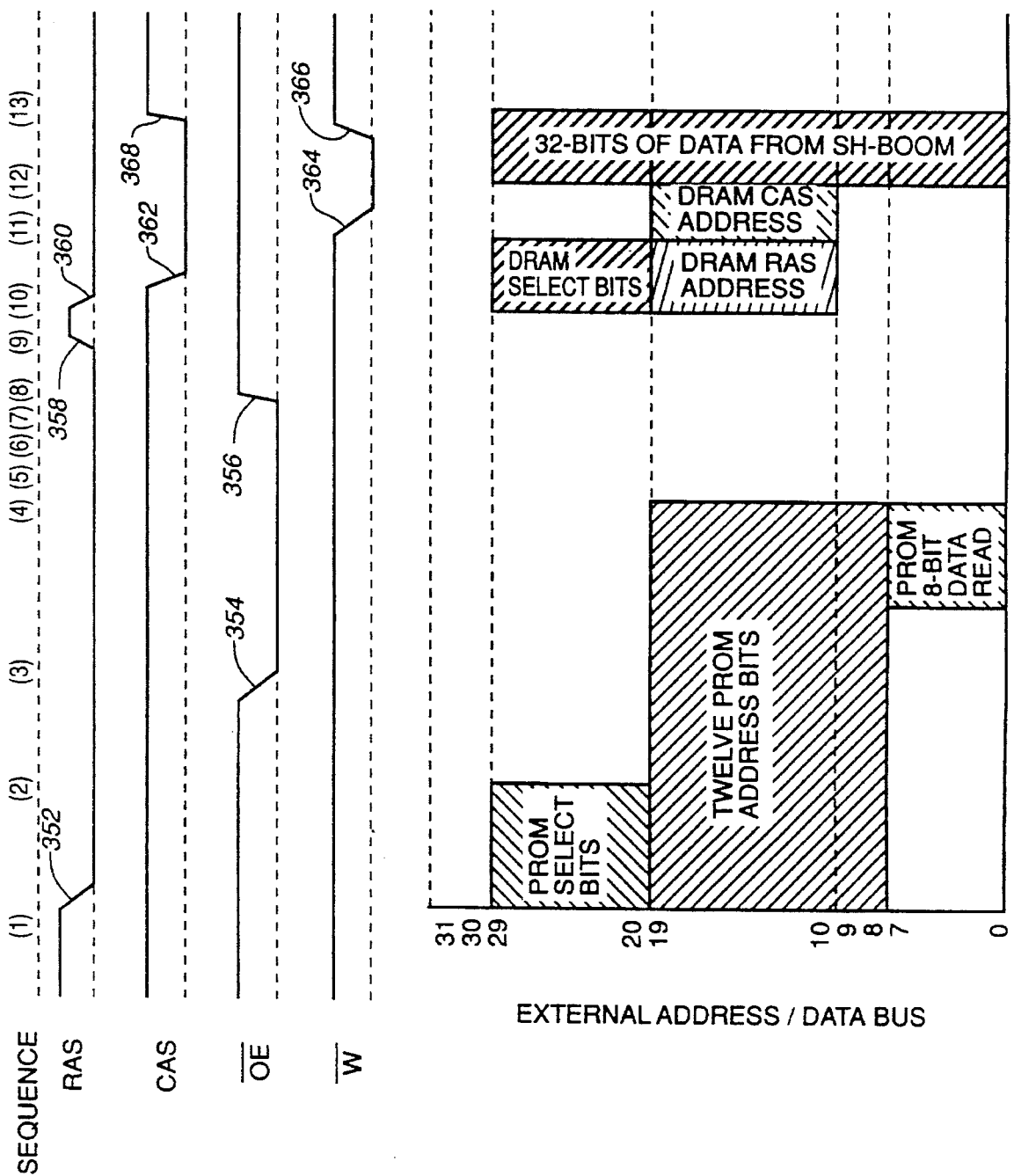
FIG._11

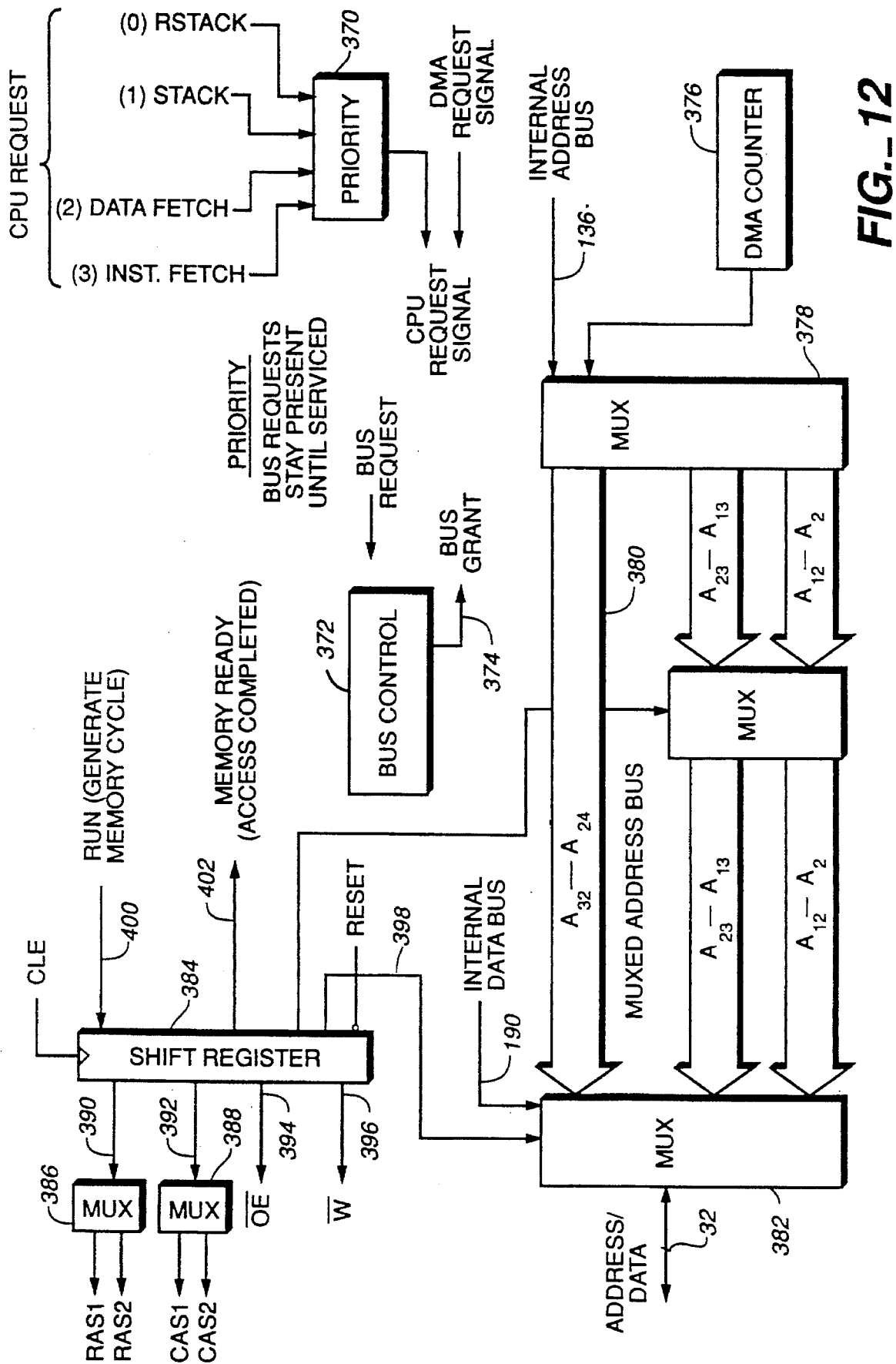

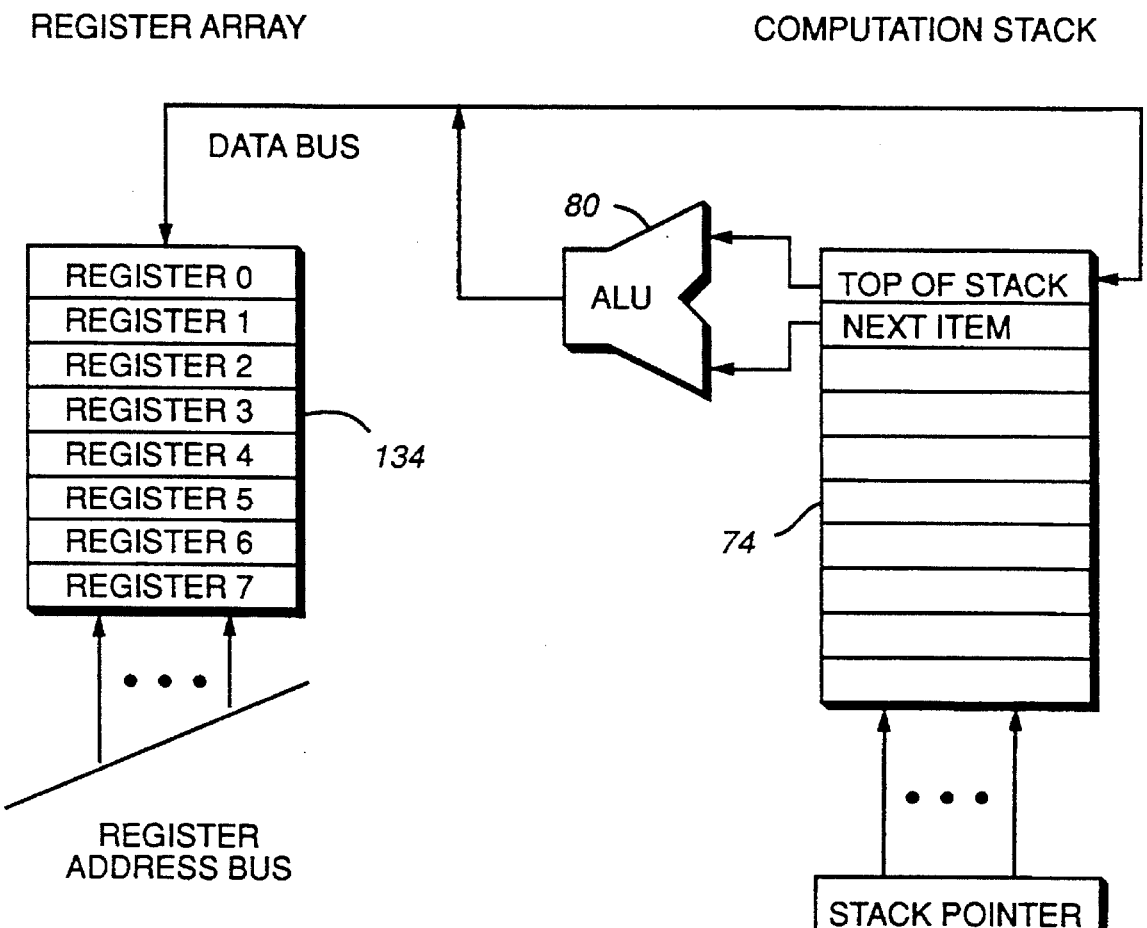
FIG._13

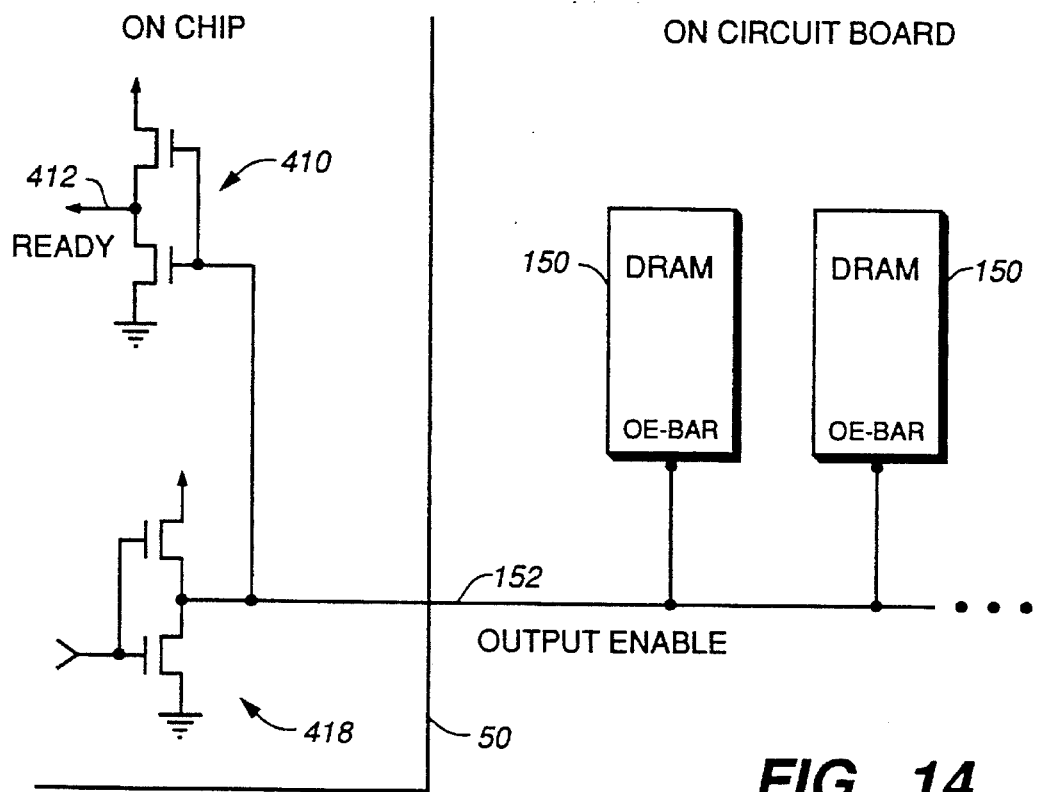
FIG._14
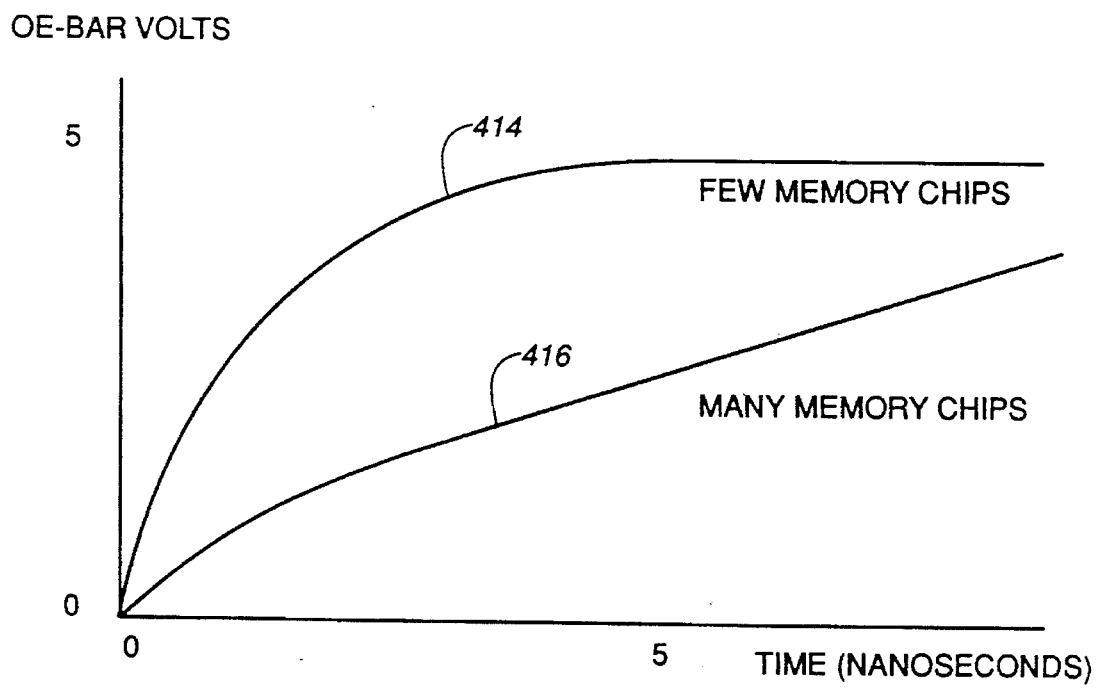
FIG._15

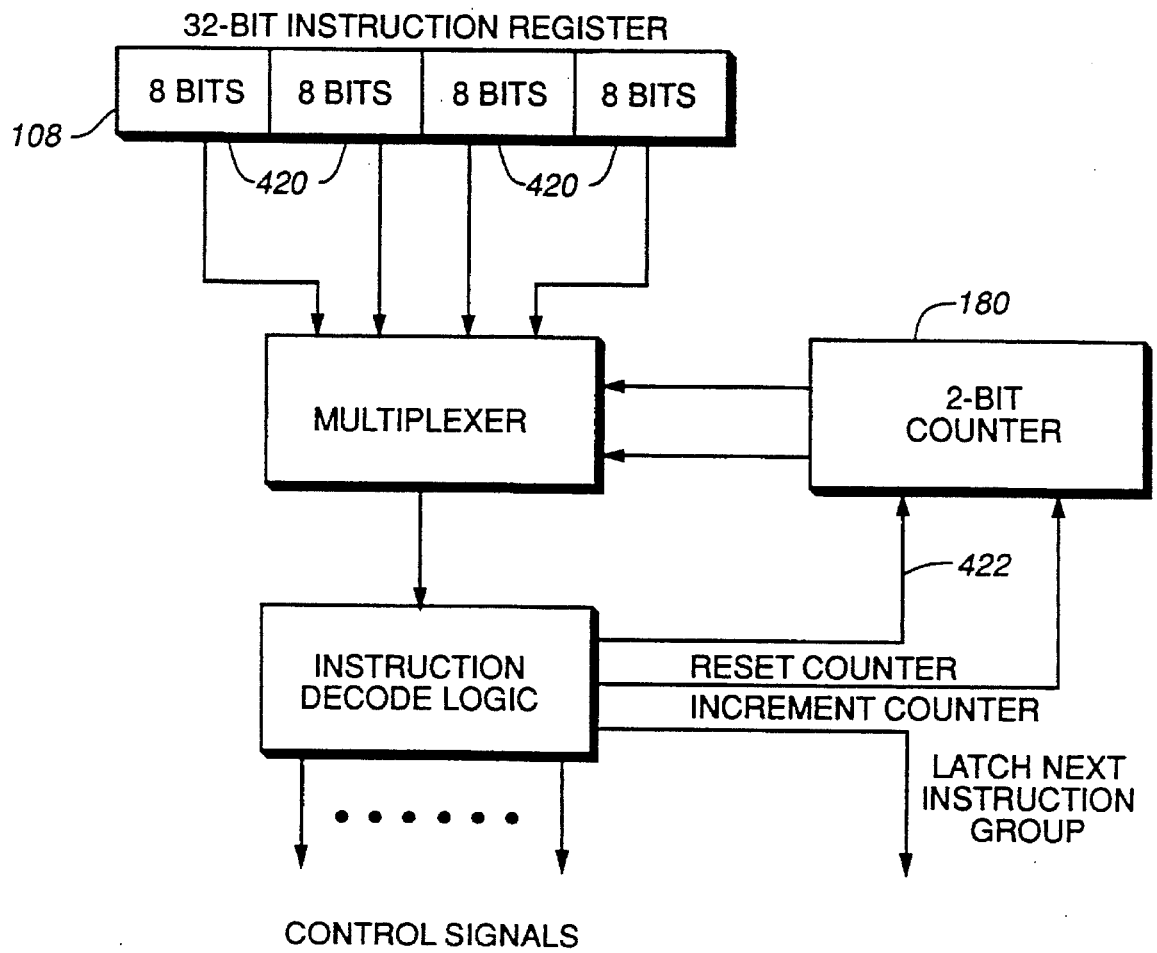
FIG._16
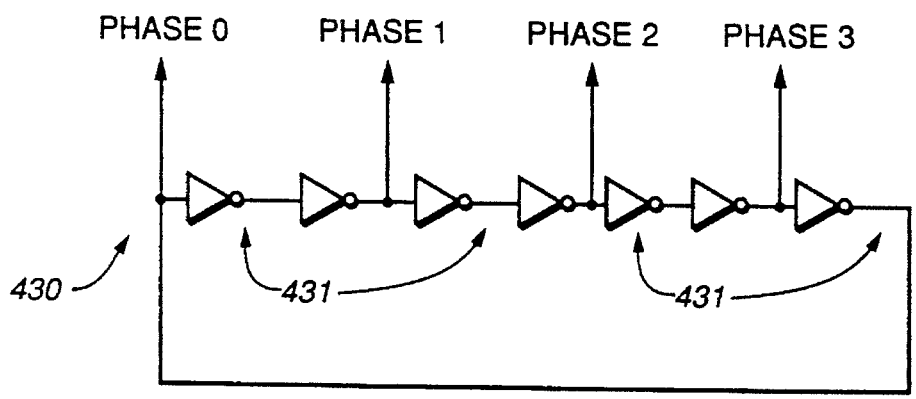
FIG._18

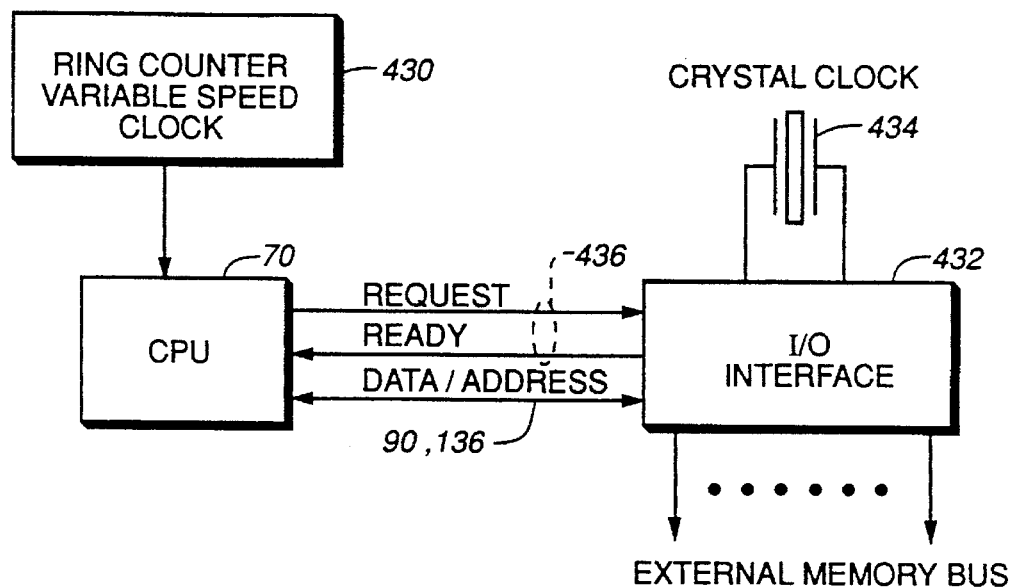
FIG._17
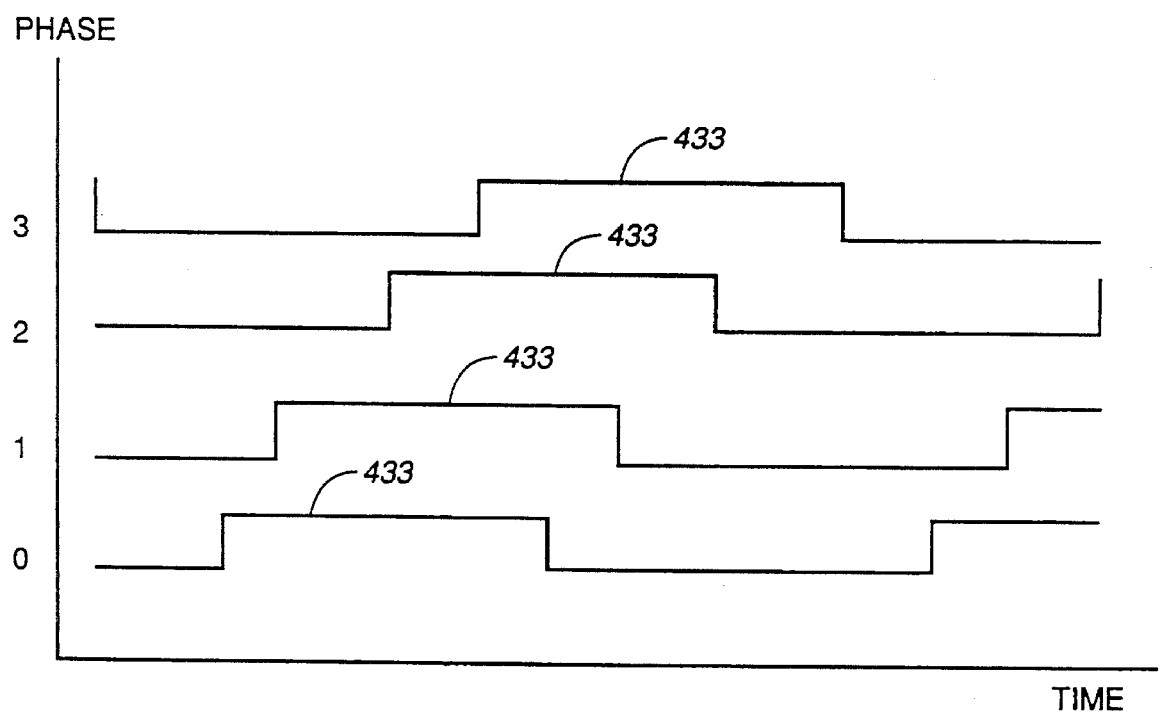
FIG._19

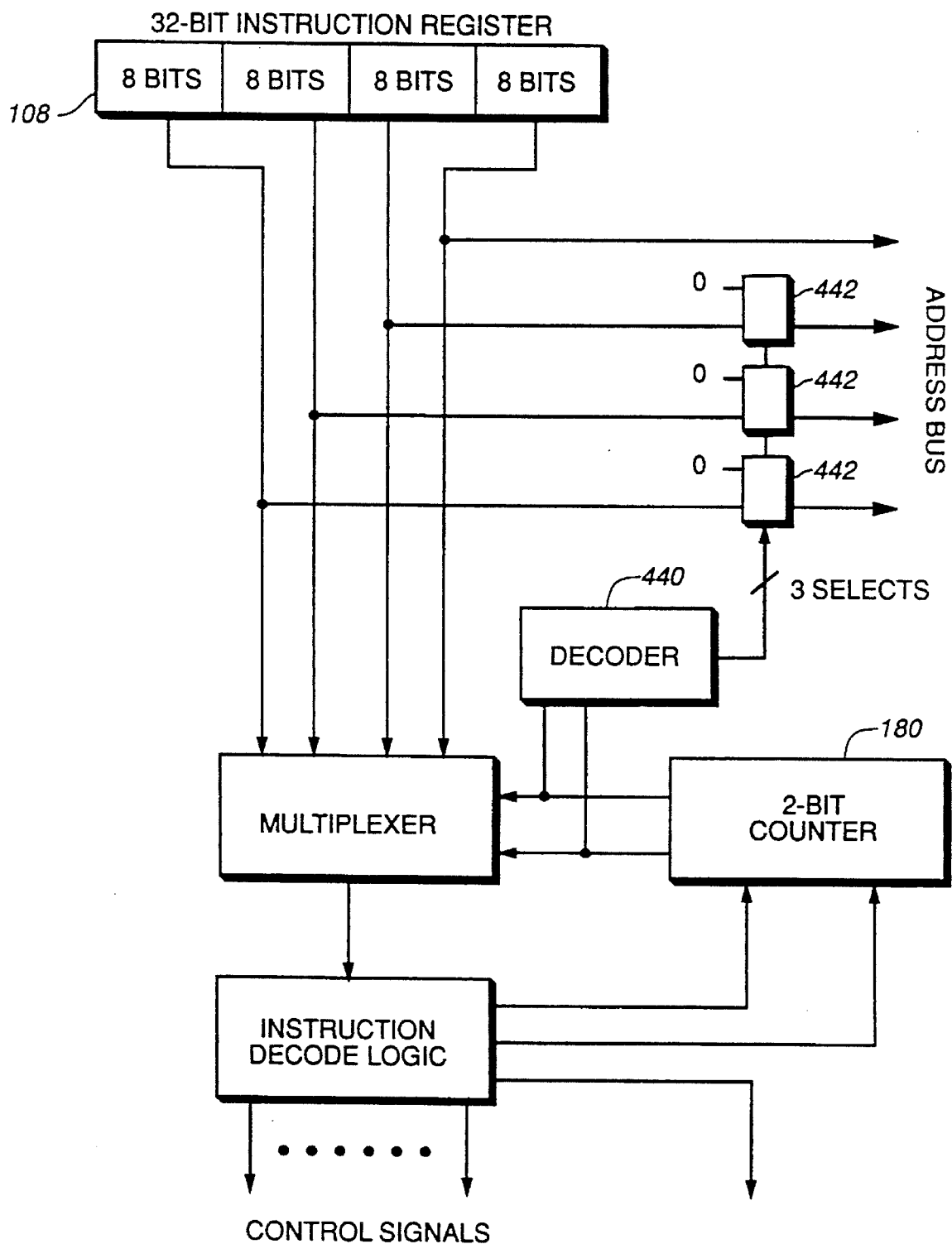
FIG._20

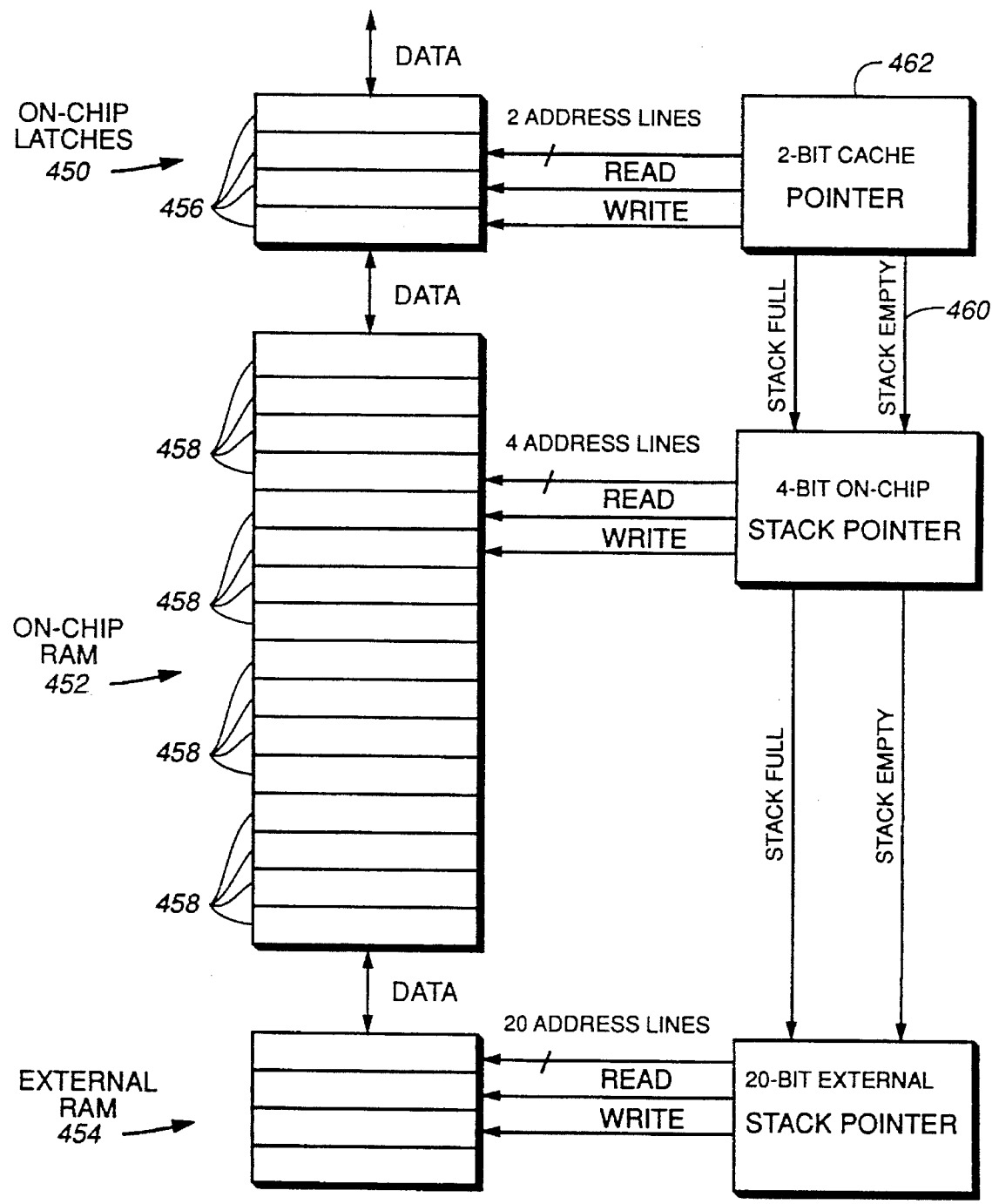
FIG._21

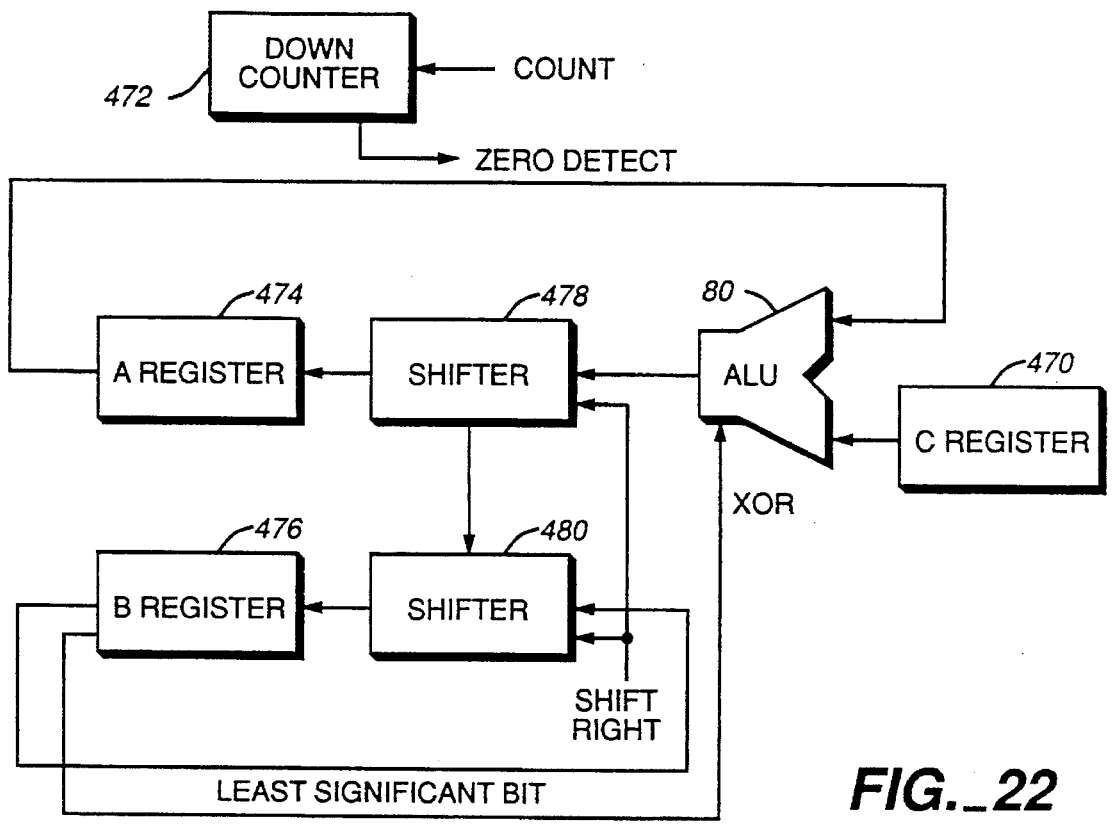
FIG._22
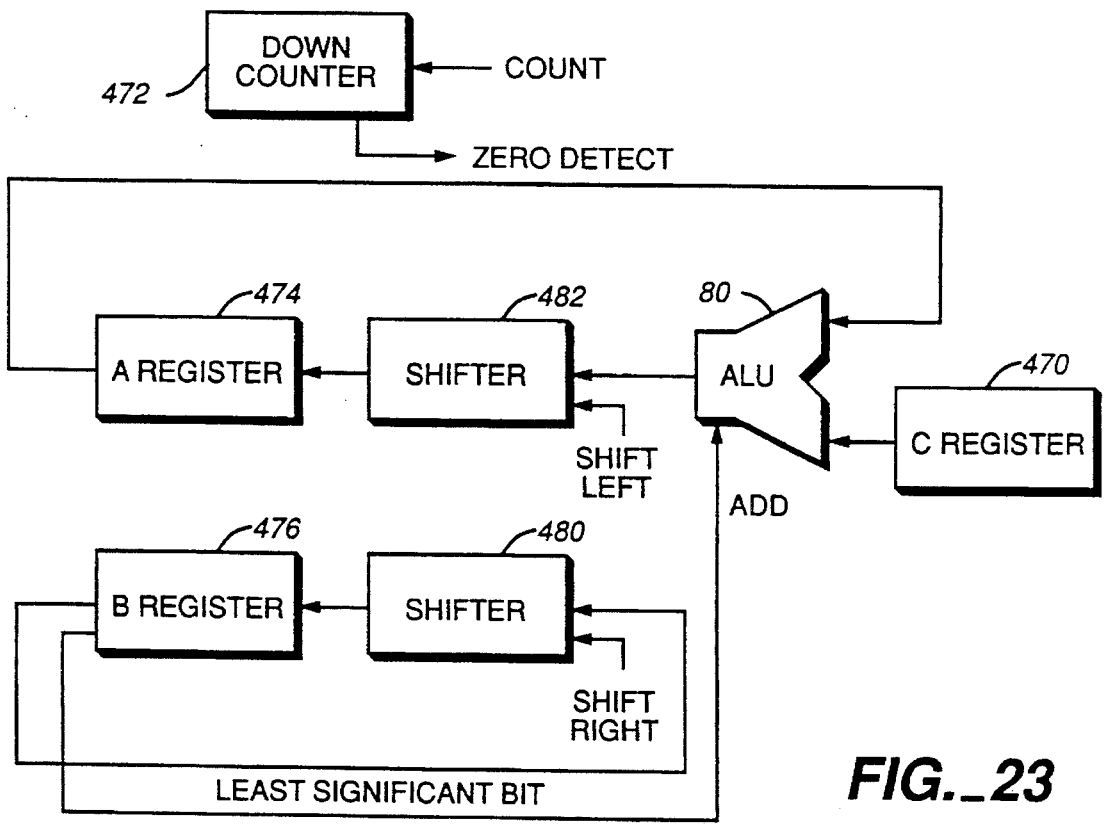
FIG._23

HIGH PERFORMANCE, LOW COST MICROPROCESSOR

CROSS REFERENCE TO RELATED APPLICATIONS

This application is a division of U.S. application Ser. No. 07/389,334, filed Aug. 3, 1989, now U.S. Pat. No. 5,440,749.

BACKGROUND OF THE INVENTION

1. Field of the Invention

The present invention relates generally to a simplified, reduced instruction set computer (RISC) microprocessor. More particularly, it relates to such a microprocessor which is capable of performance levels of, for example, 20 million instructions per second (MIPS) at a price of, for example, 20 dollars.

2. Description of the Prior Art since the invention of the microprocessor, improvements in its design have taken two different approaches. In the first approach, a brute force gain in performance has been achieved through the provision of greater numbers of faster transistors in the microprocessor integrated circuit and an instruction set of increased complexity. This approach is exemplified by the Motorola 68000 and Intel 80X86 microprocessor families. The trend in this approach is to larger die sizes and packages, with hundreds of pinouts.

More recently, it has been perceived that performance gains can be achieved through comparative simplicity, both in the microprocessor integrated circuit itself and in its instruction set. This second approach provides RISC microprocessors, and is exemplified by the Sun SPARC and the Intel 8960 microprocessors. However, even with this approach as conventionally practiced, the packages for the microprocessor are large, in order to accommodate the large number of pinouts that continue to be employed. A need therefore remains for further simplification of high performance microprocessors.

With conventional high performance microprocessors, fast static memories are required for direct connection to the microprocessors in order to allow memory accesses that are fast enough to keep up with the microprocessors. Slower dynamic random access memories (DRAMs) are used with such microprocessors only in a hierarchical memory arrangement, with the static memories acting as a buffer between the microprocessors and the DRAMs. The necessity to use static memories increases cost of the resulting systems.

Conventional microprocessors provide direct memory accesses (DMA) for system peripheral units through DMA controllers, which may be located on the microprocessor integrated circuit, or provided separately. Such DMA controllers can provide routine handling of DMA requests and responses, but some processing by the main central processing unit (CPU) of the microprocessor is required.

SUMMARY OF THE INVENTION

Accordingly, it is an object of this invention to provide a microprocessor with a reduced pin count and cost compared to conventional microprocessors.

It is another object of the invention to provide a high performance microprocessor that can be directly connected to DRAMs without sacrificing microprocessor speed.

It is a further object of the invention to provide a high performance microprocessor in which DMA does not require use of the main CPU during DMA requests and responses and which provides very rapid DMA response with predictable response times.

The attainment of these and related objects may be achieved through use of the novel high performance, low cost microprocessor herein disclosed. In accordance with one aspect of the invention, a microprocessor system in accordance with this invention has a central processing unit, a dynamic random access memory and a bus connecting the central processing unit to the dynamic random access memory. There is a multiplexing means on the bus between the central processing unit and the dynamic random access memory. The multiplexing means is connected and configured to provide row addresses, column addresses and data on the bus.

In accordance with another aspect of the invention, the microprocessor system has a means connected to the bus for fetching instructions for the central processing unit on the bus. The means for fetching instructions is configured to fetch multiple sequential instructions in a single memory cycle. In a variation of this aspect of the invention, a programmable read only memory containing instructions for the central processing unit is connected to the bus. The means for fetching instructions includes means for assembling a plurality of instructions from the programmable read only memory and storing the plurality of instructions in the dynamic random access memory.

In another aspect of the invention, the microprocessor system includes a central processing unit, a direct memory access processing unit and a memory connected by a bus. The direct memory access processing unit includes means for fetching instructions for the central processing unit and for fetching instructions for the direct memory access processing unit on the bus.

In a further aspect of the invention, the microprocessor system, including the memory, is contained in an integrated circuit. The memory is a dynamic random access memory, and the means for fetching multiple instructions includes a column latch for receiving the multiple instructions.

In still another aspect of the invention, the microprocessor system additionally includes an instruction register for the multiple instructions connected to the means for fetching instructions. A means is connected to the instruction register for supplying the multiple instructions in succession from the instruction register. A counter is connected to control the means for supplying the multiple instructions to supply the multiple instructions in succession. A means for decoding the multiple instructions is connected to receive the multiple instructions in succession from the means for supplying the multiple instructions. The counter is connected to said means for decoding to receive incrementing and reset control signals from the means for decoding. The means for decoding is configured to supply the reset control signal to the counter and to supply a control signal to the means for fetching instructions in response to a SKIP instruction in the multiple instructions. In a modification of this aspect of the invention, the microprocessor system additionally has a loop counter connected to receive a decrement control signal from the means for decoding. The means for decoding is configured to supply the reset control signal to the counter and the decrement control signal to the loop counter in response to a MICROLOOP instruction in the multiple instructions. In a further modification to this aspect of the invention, the means for decoding is configured to control the counter in response to an instruction utilizing a variable width operand. A means is connected to the counter to select the variable width operand in response to the counter.

In a still further aspect of the invention, the microprocessor system includes an arithmetic logic unit. A first push down stack is connected to the arithmetic logic unit. The first push down stack includes means for storing a top item connected to a first input of the arithmetic logic unit and means for storing a next item connected to a second input of the arithmetic logic unit. The arithmetic logic unit has an output connected to the means for storing a top item. The means for storing a top item is connected to provide an input to a register file. The register file desirably is a second push down stack, and the means for storing a top item and the register file are bidirectionally connected.

In another aspect of the invention, a data processing system has a microprocessor including a sensing circuit and a driver circuit, a memory, and an output enable line connected between the memory, the sensing circuit and the driver circuit. The sensing circuit is configured to provide a ready signal when the output enable line reaches a predetermined electrical level, such as a voltage. The microprocessor is configured so that the driver circuit provides an enabling signal on the output enable line responsive to the ready signal.

In a further aspect of the invention, the microprocessor system has a ring counter variable speed system clock connected to the central processing unit. The central processing unit and the ring counter variable speed system clock are provided in a single integrated circuit. An input/output interface is connected to exchange coupling control signals, addresses and data with the input/output interface. A second clock independent of the ring counter variable speed system clock is connected to the input/output interface.

In yet another aspect of the invention, a push down stack is connected to the arithmetic logic unit. The push down stack includes means for storing a top item connected to a first input of the arithmetic logic unit and means for storing a next item connected to a second input of the arithmetic logic unit. The arithmetic logic unit has an output connected to the means for storing a top item. The push down stack has a first plurality of stack elements configured as latches and a second plurality of stack elements configured as a random access memory. The first and second plurality of stack elements and the central processing unit are provided in a single integrated circuit. A third plurality of stack elements is configured as a random access memory external to the single integrated circuit. In this aspect of the invention, desirably a first pointer is connected to the first plurality of stack elements, a second pointer connected to the second plurality of stack elements, and a third pointer is connected to the third plurality of stack elements. The central processing unit is connected to pop items from the first plurality of stack elements. The first stack pointer is connected to the second stack pointer to pop a first plurality of items from the second plurality of stack elements when the first plurality of stack elements are empty from successive pop operations by the central processing unit. The second stack pointer is connected to the third stack pointer to pop a second plurality of items from the third plurality of stack elements when the second plurality of stack elements are empty from successive pop operations by the central processing unit.

In another aspect of the invention, a first register is connected to supply a first input to the arithmetic logic unit. A first shifter is connected between an output of the arithmetic logic unit and the first register. A second register is connected to receive a starting polynomial value. An output of the second register is connected to a second shifter. A least significant bit of the second register is connected to The arithmetic logic unit. A third register is connected to supply feedback terms of a polynomial to the arithmetic logic unit. A down counter, for counting down a number corresponding to digits of a polynomial to be generated, is connected to the arithmetic logic unit. The arithmetic logic unit is responsive to a polynomial instruction to carry out an exclusive OR of the contents of the first register with the contents of the third register if the least significant bit of the second register is a "ONE" and to pass the contents of the first register unaltered if the least significant bit of the second register is a "ZERO", until the down counter completes a count The polynomial to be generated results in said first register.

In still another aspect of the invention, a result register is connected to supply a first input to the arithmetic logic unit. A first, left shifting shifter is connected between an output of the arithmetic logic unit and the result register. A multiplier register is connected to receive a multiplier in bit reversed form. An output of the multiplier register is connected to a second, right shifting shifter. A least significant bit of the multiplier register is connected to the arithmetic logic unit. A third register is connected to supply a multiplicand to said arithmetic logic unit. A down counter, for counting down a number corresponding to one less than the number of digits of the multiplier, is connected to the arithmetic logic unit. The arithmetic logic unit is responsive to a multiply instruction to add the contents of the result register with the contents of the third register, when the least significant bit of the multiplier register is a "ONE" and to pass the contents of the result register unaltered, until the down counter completes a count. The product results in the result register.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 is an external, plan view of an integrated circuit package incorporating a microprocessor in accordance with the invention.

FIG. 2 is a block diagram of a microprocessor in accordance with the invention.

FIG. 3 is a block diagram of a portion of a data processing system incorporating the microprocessor of FIGS. 1 and 2.

FIG. 4 is a more detailed block diagram of a portion of the microprocessor shown in FIG. 2.

FIG. 5 is a more detailed block diagram of another portion of the microprocessor shown in FIG. 2.

FIG. 6 is a block diagram of another portion of the data processing system shown in part in FIG. 3 and incorporating the microprocessor of FIGS. 1–2 and 4–5.

FIGS. 7 and 8 are layout diagrams for the data processing system shown in part in FIGS. 3 and 6.

FIG. 9 is a layout diagram of a second embodiment of a microprocessor in accordance with the invention in a data processing system on a single integrated circuit.

FIG. 10 is a more detailed block diagram of a portion of the data processing system of FIGS. 7 and 8.

FIG. 11 is a timing diagram useful for understanding operation of the system portion shown in FIG. 12.

FIG. 12 is another more detailed block diagram of a further portion of the data processing system of FIGS. 7 and 8.

FIG. 13 is a more detailed block diagram of a portion of the microprocessor shown in FIG. 2.

FIG. 14 is a more detailed block and schematic diagram of a portion of the system shown in FIGS. 3 and 7–8.

FIG. 15 is a graph useful for understanding operation of the system portion shown in FIG. 14.

FIG. 16 is a more detailed block diagram showing part of the system portion shown in FIG. 4.

FIG. 17 is a more detailed block diagram of a portion of the microprocessor shown in FIG. 2.

FIG. 18 is a more detailed block diagram of part of the microprocessor portion shown in FIG. 17.

FIG. 19 is a set of waveform diagrams useful for understanding operation of the part of the microprocessor portion shown in FIG. 18.

FIG. 20 is a more detailed block diagram showing another part of the system portion shown in FIG. 4.

FIG. 21 is a more detailed block diagram showing another part of the system portion shown in FIG. 4.

FIGS. 22 and 23 are more detailed block diagrams showing another part of the system portion shown in FIG. 4.

DETAILED DESCRIPTION OF THE INVENTION

OVERVIEW

The microprocessor of this invention is desirably implemented as a 32-bit microprocessor optimized for:

HIGH EXECUTION SPEED, and
LOW SYSTEM COST.

In this embodiment, the microprocessor can be thought of as 20 MIPS for 20 dollars. Important distinguishing features of the microprocessor are:

Uses low-cost commodity DYNAMIC RAMS to run 20 MIPS
    4 instruction fetch per memory cycle
    On-chip fast page-mode memory management
    Runs fast without external cache
    Requires few interfacing chips
    Crams 32-bit CPU in 44 pin SOJ package The instruction set is organized so that most operations can be specified with 8-bit instructions. Two positive products of this philosophy are:

Programs are smaller,
Programs can execute much faster.

The bottleneck in most computer systems is the memory bus. The bus is used to fetch instructions and fetch and store data. The ability to fetch four instructions in a single memory bus cycle significantly increases the bus availability to handle data.

Turning now to the drawings, more particularly to FIG. 1, there is shown a packaged 32-bit microprocessor 50 in a 44-pin plastic leadless chip carrier, shown approximately 100 times its actual size of about 0.8 inch on a side. The fact that the microprocessor 50 is provided as a 44-pin package represents a substantial departure from typical microprocessor packages, which usually have about 200 input/output (I/O) pins. The microprocessor 50 is rated at 20 million instructions per second (MIPS). Address and data lines 52, also labelled D0–D31, are shared for addresses and data without speed penalty as a result of the manner in which the microprocessor 50 operates, as will be explained below.

DYNAMIC RAM

In addition to the low cost 44-pin package, another unusual aspect of the high performance microprocessor 50 is that it operates directly with dynamic random access memories (DRAMs), as shown by row address strobe (RAS) and column address strobe (CAS) I/O pins 54. The other I/O pins for the microprocessor 50 include $V_{DD}$ pins 56, $V_{SS}$ pins 58, output enable pin 60, write pin 62, clock pin 64 and reset pin 66.

All high speed computers require high speed and expensive memory to keep up. The highest speed static RAM memories cost as much as ten times as much as slower dynamic RAMs. This microprocessor has been optimized to use low-cost dynamic RAM in high-speed page-mode. Page-mode dynamic RAMs offer static RAM performance without the cost penalty. For example, low-cost 85 nsec. dynamic RAMs access at 25 nsec when operated in fast page-mode. Integrated fast page-mode control on the microprocessor chip simplifies system interfacing and results in a faster system.

Details of the microprocessor 50 are shown in FIG. 2. The microprocessor 50 includes a main central processing unit (CPU) 70 and a separate direct memory access (DMA) CPU 72 in a single integrated circuit making up the microprocessor 50. The main CPU 70 has a first 16 deep push down stack 74, which has a top item register 76 and a next item register 78, respectively connected to provide inputs to an arithmetic logic unit (ALU) 80 by lines 82 and 84. An output of the ALU 80 is connected to the top item register 76 by line 86. The output of the top item register at 82 is also connected by line 88 to an internal data bus 90.

A loop counter 92 is connected to a decrementer 94 by lines 96 and 98. The loop counter 92 is bidirectionally connected to the internal data bus 90 by line 100. Stack pointer 102, return stack pointer 104, mode register 106 and instruction register 108 are also connected to the internal data bus 90 by lines 110, 112, 114 and 116, respectively. The internal data bus 90 is connected to memory controller 118 and to gate 120. The gate 120 provides inputs on lines 122, 124, and 126 to X register 128, program counter 130 and Y register 132 of return push down stack 134. The X register 128, program counter 130 and Y register 132 provide outputs to internal address bus 136 on lines 138, 140 and 142. The internal address bus provides inputs to the memory controller 118 and to an incrementer 144. The incrementer 144 provides inputs to the X register, program counter and Y register via lines 146, 122, 124 and 126. The DMA CPU 72 provides inputs to the memory controller 118 on line 148. The memory controller 118 is connected to a RAM (not shown) by address/data bus 150 and control lines 152.

FIG. 2 shows that the microprocessor 50 has a simple architecture. Prior art RISC microprocessors are substantially more complex in design. For example, the SPARC RISC microprocessor has three times the gates of the microprocessor 50, and the Intel 8960 RISC microprocessor has 20 times the gates of the microprocessor 50. The speed of this microprocessor is in substantial part due to this simplicity. The architecture incorporates push down stacks and register write to achieve this simplicity.

The microprocessor 50 incorporates an I/O that has been tuned to make heavy use of resources provided on the integrated circuit chip. On chip latches allow use of the same I/O circuits to handle three different things: column addressing, row addressing and data, with a slight to non-existent speed penalty. This triple bus multiplexing results in fewer buffers to expand, fewer interconnection lines, fewer I/O pins and fewer internal buffers.

The provision of on-chip DRAM control gives a performance equal to that obtained with the use of static RAMs. As a result, memory is provided at ¼ the system cost of static RAM used in most RISC systems.

The microprocessor 50 fetches 4 instructions per memory cycle; the instructions are in an 8-bit format, and this is a 32-bit microprocessor. System speed is therefore 4 times the memory bus bandwidth. This ability enables the microprocessor to break the Von Neumann bottleneck of the speed of getting the next instruction. This mode of operation is possible because of the use of a push down stack and register array. The push down stack allows the use of implied addresses, rather than the prior art technique of explicit addresses for two sources and a destination.

Most instructions execute in 20 nanoseconds in the microprocessor 50. The microprocessor can therefore execute instructions at 50 peak MIPS without pipeline delays. This is a function of the small number of gates in the microprocessor 50 and the high degree of parallelism in the architecture of the microprocessor.

FIG. 3 shows how column and row addresses are multiplexed on lines D8–D14 of the microprocessor 50 for addressing DRAM 150 from I/O pins 52. The DRAM 150 is one of eight, but only one DRAM 150 has been shown for clarity. As shown, the lines D11–D18 are respectively connected to row address inputs A0–A8 of the DRAM 150. Additionally, lines D12–D15 are connected to the data inputs DQ1–DQ4 of the DRAM 150. The output enable, write and column address strobe pins 54 are respectively connected to the output enable, write and column address strobe inputs of the DRAM 150 by lines 152. The row address strobe pin 54 is connected through row address strobe decode logic 154 to the row address strobe input of the DRAM 150 by lines 156 and 158.

D0–D7 pins 52 (FIG. 1) are idle when the microprocessor 50 is outputting multiplexed row and column addresses on D11–D18 pins 52. The D0–D7 pins 52 can therefore simultaneously be used for I/O when right justified I/O is desired. Simultaneous addressing and I/O can therefore be carried out.

FIG. 4 shows how the microprocessor 50 is able to achieve performance equal to the use of static RAMS with DRAMs through multiple instruction fetch in a single clock cycle and instruction fetch-ahead. Instruction register 108 receives four 8-bit byte instruction words 1–4 on 32-bit internal data bus 90. The four instruction byte 1–4 locations of the instruction register 108 are connected to multiplexer 170 by busses 172, 174, 176 and 178, respectively. A microprogram counter 180 is connected to the multiplexer 170 by lines 182. The multiplexer 170 is connected to decoder 184 by bus 186. The decoder 184 provides internal signals to the rest of the microprocessor 50 on lines 188.

Most significant bits 190 of each instruction byte 1–4 location are connected to a 4-input decoder 192 by lines 194. The output of decoder 192 is connected to memory controller 118 by line 196. Program counter 130 is connected to memory controller 118 by internal address bus 136, and the instruction register 108 is connected to the memory controller 118 by the internal data bus 90. Address/data bus 198 and control bus 200 are connected to the DRAMS 150 (FIG. 3).

In operation, when the most significant bits 190 of remaining instructions 1–4 are "1" in a clock cycle of the microprocessor 50, there are no memory reference instructions in the queue. The output of decoder 192 on line 196 requests an instruction fetch ahead by memory controller 118 without interference with other accesses. While the current instructions in instruction register 108 are executing, the memory controller 118 obtains the address of the next set of four instructions from program counter 130 and obtains that set of instructions. By the time the current set of instructions has completed execution, the next set of instructions is ready for loading into the instruction register.

Details of the DMA CPU 72 are provided in FIG. 5. Internal data bus 90 is connected to memory controller 118 and to DMA instruction register 210. The DMA instruction register 210 is connected to DMA program counter 212 by bus 214, to transfer size counter 216 by bus 218 and to timed transfer interval counter 220 by bus 222. The DMA instruction register 210 is also connected to DMA I/O and RAM address register 224 by line 226. The DMA I/O and RAM address register 224 is connected to the memory controller 118 by memory cycle request line 228 and bus 230. The DMA program counter 212 is connected to the internal address bus 136 by bus 232. The transfer size counter 216 is connected to a DMA instruction done decrementer 234 by lines 236 and 238. The decrementer 234 receives a control input on memory cycle acknowledge line 240. When transfer size counter 216 has completed its count, it provides a control signal to DMA program counter 212 on line 242. Timed transfer interval counter 220 is connected to decrementer 244 by lines 246 and 248. The decrementer 244 receives a control input from a microprocessor system clock on line 250.

The DMA CPU 72 controls itself and has the ability to fetch and execute instructions. It operates as a co-processor to the main CPU 70 (FIG. 2) for time specific processing.

FIG. 6 shows how the microprocessor 50 is connected to an electrically programmable read only memory (EPROM) 260 by reconfiguring the data lines 52 so that some of the data lines 52 are input lines and some of them are output lines. Data lines 52 D0–D7 provide data to and from corresponding data terminals 262 of the EPROM 260. Data lines 52 D9–D18 provide addresses to address terminals 264 of the EPROM 260. Data lines 52 D19–D31 provide inputs from the microprocessor 50 to memory and I/O decode logic 266. RAS 0/1 control line 268 provides a control signal for determining whether the memory and I/O decode logic provides a DRAM RAS output on line 270 or a column enable output for the EPROM 260 on line 272. Column address strobe terminal 60 of the microprocessor 50 provides an output enable signal on line 274 to the corresponding terminal 276 of the EPROM 260.

FIGS. 7 and 8 show the front and back of a one card data processing system 280 incorporating the microprocessor 50, MSM514258-10 type DRAMs 150 totalling 2 megabytes, a Motorola 50 MegaHertz crystal oscillator clock 282, I/O circuits 284 and a 27256 type EPROM 260. The I/O circuits 284 include a 74HC04 type high speed hex inverter circuit 286, an IDT39C828 type 10-bit inverting buffer circuit 288, an IDT39C822 type 10-bit inverting register circuit 290, and two IDT39C823 type 9-bit non-inverting register circuits 292. The card 280 is completed with a MAX12V type DC—DC converter circuit 294, 34-pin dual AMP type headers 296, a coaxial female power connector 298, and a 3-pin AMP right angle header 300. The card 280 is a low cost, imbeddable product that can be incorporated in larger systems or used as an internal development tool.

The microprocessor 50 is a very high performance (50 MHz) RISC influenced 32-bit CPU designed to work closely with dynamic RAM. Clock for clock, the microprocessor 50 approaches the theoretical performance limits possible with a single CPU configuration. Eventually, the microprocessor 50 and any other processor is limited by the bus bandwidth and the number of bus paths. The critical conduit is between the CPU and memory.

One solution to the bus bandwidth/bus path problem is to integrate a CPU directly onto the memory chips, giving every memory a direct bus the CPU. FIG. 9 shows another microprocessor 310 that is provided integrally with 1 megabit of DRAM 311 in a single integrated circuit 312. Until the present invention, this solution has not been practical, because most high performance CPUs require from 500,000 to 1,000,000 transistors and enormous die sizes just by themselves. The microprocessor 310 is equivalent to the microprocessor 50 in FIGS. 1–8. The microprocessors 50 and 310 are the most transistor efficient high performance CPUs in existence, requiring fewer than 50,000 transistors for dual processors 70 and 72 (FIG. 2) or 314 and 316 (less memory). The very high speed of the microprocessors 50 and 310 is to a certain extent a function of the small number of active devices. In essence, the less silicon gets in the way, the faster the electrons can get where they are going.

The microprocessor 310 is therefore the only CPU suitable for integration on the memory chip die 312. Some simple modifications to the basic microprocessor 50 to take advantage of the proximity to the DRAM array 311 can also increase the microprocessor 50 clock speed by 50 percent, and probably more.

The microprocessor 310 core on board the DRAM die 312 provides most of the speed and functionality required for a large group of applications from automotive to peripheral control. However, the integrated CPU 310/DRAM 311 concept has the potential to redefine significantly the way multiprocessor solutions can solve a spectrum of very compute intensive problems. The CPU 310/DRAM 311 combination eliminates the Von Neumann bottleneck by distributing it across numerous CPU/DRAM chips 312. The microprocessor 310 is a particularly good core for multi-processing, since it was designed with the SDI targeting array in mind, and provisions were made for efficient interprocessor communications.

Traditional multiprocessor implementations have been very expensive in addition to being unable to exploit fully the available CPU horsepower. Multiprocessor systems have typically been built up from numerous board level or box level computers. The result is usually an immense amount of hardware with corresponding wiring, power consumption and communications problems. By the time the systems are interconnected, as much as 50 percent of the bus speed has been utilized just getting through the interfaces.

In addition, multiprocessor system software has been scarce. A multiprocessor system can easily be crippled by an inadequate load-sharing algorithm in the system software, which allows one CPU to do a great deal of work and the others to be idle. Great strides have been made recently in systems software, and even UNIX V.4 may be enhanced to support multiprocessing. Several commercial products from such manufacturers as DUAL Systems and UNISOFT do a credible job on 68030 type microprocessor systems now.

The microprocessor 310 architecture eliminates most of the interface friction, since up to 64 CPU 310/RAM 311 processors should be able to intercommunicate without buffers or latches. Each chip 312 has about 40 MIPS raw speed, because placing the DRAM 311 next to the CPU 310 allows the microprocessor 310 instruction cycle to be cut in half, compared to the microprocessor 50. A 64 chip array of these chips 312 is more powerful than any other existing computer. Such an array fits on a 3×5 card, cost less than a FAX machine, and draw about the same power as a small television.

Dramatic changes in price/performance always reshape existing applications and almost always create new ones. The introduction of microprocessors in the mid 1970s created video games, personal computers, automotive computers, electronically controlled appliances, and low cost computer peripherals.

The integrated circuit 312 will find applications in all of the above areas, plus create some new ones. A common generic parallel processing algorithm handles convolution/Fast Fourier Transform (FFT)/pattern recognition. Interesting product possibilities using the integrated circuit 312 include high speed reading machines, real-time speech recognition, spoken language translation, real-time robot vision, a product to identify people by their faces, and an automotive or aviation collision avoidance system.

A real time processor for enhancing high density television (HDTV) images, or compressing the HDTV information into a smaller bandwidth, would be very feasible. The load sharing in HDTV could be very straightforward. Splitting up the task according to color and frame would require 6, 9 or 12 processors. Practical implementation might require 4 meg RAMs integrated with the microprocessor 310.

The microprocessor 310 has the following specifications:
CONTROL LINES
4 - POWER/GROUND
1 - CLOCK
32 - DATA I/O
4 - SYSTEM CONTROL
   EXTERNAL MEMORY FETCH
   EXTERNAL MEMORY FETCH AUTOINCREMENT X
   EXTERNAL MEMORY FETCH AUTOINCREMENT Y
   EXTERNAL MEMORY WRITE
   EXTERNAL MEMORY WRITE AUTOINCREMENT X
   EXTERNAL MEMORY WRITE AUTOINCREMENT Y
   EXTERNAL PROM FETCH
   LOAD ALL X REGISTERS
   LOAD ALL Y REGISTERS
   LOAD ALL PC REGISTERS
   EXCHANGE X AND Y
   INSTRUCTION FETCH
   ADD TO PC
   ADD TO X
   WRITE MAPPING REGISTER
   READ MAPPING REGISTER
REGISTER CONFIGURATION
MICROPROCESSOR 310 CPU 316 CORE
COLUMN LATCH1 (1024 BITS) 32×32 MUX
STACK POINTER (16 BITS)
COLUMN LATCH2 (1024 BITS) 32×32 MUX
RSTACK POINTER (16 BITS)
PROGRAM COUNTER 32 BITS
X0 REGISTER 32 BITS (ACTIVATED ONLY FOR ON-CHIP ACCESSES)
Y0 REGISTER 32 BITS (ACTIVATED ONLY FOR ON-CHIP ACCESSES)
LOOP COUNTER 32 BITS
DMA CPU 314 CORE
DMA PROGRAM COUNTER 24 BITS
INSTRUCTION REGISTER 32 BITS
I/O & RAM ADDRESS REGISTER 32 BITS
TRANSFER SIZE COUNTER 12 BITS
INTERVAL COUNTER 12 BITS To offer memory expansion for the basic chip 312, an intelligent DRAM can be produced. This chip will be optimized for high speed operation with the integrated circuit 312 by having three on-chip address registers: Program Counter, X Register and Y register. As a result, to access the intelligent DRAM, no address is required, and a total access cycle could be as short as 10 nsec. Each expansion DRAM would maintain its own copy of the three registers and would be identified by a code specifying its memory address. Incrementing and adding to the three registers will actually take place on the memory chips. A maximum of 64 intelligent DRAM peripherals would allow a large system to be created without sacrificing speed by introducing multiplexers or buffers.

There are certain differences between the microprocessor 310 and the microprocessor 50 that arise from providing the microprocessor 310 on the same die 312 with the DRAM 311. Integrating the DRAM 311 allows architectural changes in the microprocessor 310 logic to take advantage of existing on-chip DRAM 311 circuitry. Row and column design is inherent in memory architecture. The DRAMs 311 access random bits in a memory array by first selecting a row of 1024 bits, storing them into a column latch, and then selecting one of the bits as the data to be read or written.

The time required to access the data is split between the row access and the column access. Selecting data already stored in a column latch is faster than selecting a random bit by at least a factor of six. The microprocessor 310 takes advantage of this high speed by creating a number of column latches and using them as caches and shift registers. Selecting a new row of information may be thought of as performing a 1024-bit read or write with the resulting immense bus bandwidth.

1. The microprocessor 50 treats its 32-bit instruction register 108 (see FIGS. 2 and 4) as a cache for four 8-bit instructions. Since the DRAM 311 maintains a 1024-bit latch for the column bits, the microprocessor 310 treats the column latch as a cache for 128 8-bit instructions. Therefore, the next instruction will almost always be already present in the cache. Long loops within the cache are also possible and more useful than the 4 instruction loops in the microprocessor 50.

2. The microprocessor 50 uses two 16×32-bit deep register arrays 74 and 134 (FIG. 2) for the parameter stack and the return stack. The microprocessor 310 creates two other 1024-bit column latches to provide the equivalent of two 32×32-bit arrays, which can be accessed twice as fast as a register array.

3. The microprocessor 50 has a DMA capability which can be used for I/O to a video shift register. The microprocessor 310 uses yet another 1024-bit column latch as a long video shift register to drive a CRT display directly. For color displays, three on-chip shift registers could also be used. These shift registers can transfer pixels at a maximum of 100 MHz.

4. The microprocessor 50 accesses memory via an external 32-bit bus. Most of the memory 311 for the microprocessor 310 is on the same die 312. External access to more memory is made using an 8-bit bus. The result is a smaller die, smaller package and lower power consumption than the microprocessor 50.

5. The microprocessor 50 consumes about a third of its operating power charging and discharging the I/O pins and associated capacitances. The DRAMs 150 (FIG. 8) connected to the microprocessor 50 dissipate most of their power in the I/O drivers. A microprocessor 310 system will consume about one-tenth the power of a microprocessor 50 system, since having the DRAM 311 next to the processor 310 eliminates most of the external capacitances to be charged and discharged.

6. Multiprocessing means splitting a computing task between numerous processors in order to speed up the solution. The popularity of multiprocessing is limited by the expense of current individual processors as well as the limited interprocessor communications ability. The microprocessor 310 is an excellent multiprocessor candidate, since the chip 312 is a monolithic computer complete with memory, rendering it low-cost and physically compact.

The shift registers implemented with the microprocessor 310 to perform video output can also be configured as interprocessor communication links. The INMOS transputer attempted a similar strategy, but at much lower speed and without the performance benefits inherent in the microprocessor 310 column latch architecture. Serial I/O is a prerequisite for many multiprocessor topologies because of the many neighbor processors which communicate. A cube has 6 neighbors. Each neighbor communicates using these lines:

DATA IN
CLOCK IN
READY FOR DATA
DATA OUT
DATA READY?
CLOCK OUT

A special start up sequence is used to initialize the on-chip DRAM 311 in each of the processors.

The microprocessor 310 column latch architecture allows neighbor processors to deliver information directly to internal registers or even instruction caches of other chips 312. This technique is not used with existing processors, because it only improves performance in a tightly coupled DRAM system.

7. The microprocessor 50 architecture offers two types of looping structures: LOOP-IF-DONE and MICRO-LOOP. The former takes an 8-bit to 24-bit operand to describe the entry point to the loop address. The latter performs a loop entirely within the 4 instruction queue and the loop entry point is implied as the first instruction in the queue. Loops entirely within the queue run without external instruction fetches and execute up to three times as fast as the long loop construct. The microprocessor 310 retains both constructs with a few differences. The microprocessor 310 microloop functions in the same fashion as the microprocessor 50 operation, except the queue is 1024-bits or 128 8-bit instructions long. The microprocessor 310 microloop can therefore contain jumps, branches, calls and immediate operations not possible in the 4 8-bit instruction microprocessor 50 queue.

Microloops in the microprocessor 50 can only perform simple block move and compare functions. The larger microprocessor 310 queue allows entire digital signal processing or floating point algorithms to loop at high speed in the queue.

The microprocessor 50 offers four instructions to redirect execution:

CALL
BRANCH
BRANCH-IF-ZERO
LOOP-IF-NOT-DONE

These instructions take a variable length address operand 8, 16 or 24 bits long. The microprocessor 50 next address logic treats the three operands similarly by adding or subtracting them to the current program counter. For the microprocessor 310, the 16 and 24-bit operands function in the same manner as the 16 and 24-bit operands in the microprocessor 50. The 8-bit class operands are reserved to operate entirely within the instruction queue. Next address decisions can therefore be made quickly, because only 10 bits of addresses are affected, rather than 32. There is no carry or borrow generated past the 10 bits.

8. The microprocessor 310 CPU 316 resides on an already crowded DRAM die 312. To keep chip size as small as possible, the DMA processor 72 of the microprocessor 50 has been replaced with a more traditional DMA controller 314. DMA is used with the microprocessor 310 to perform the following functions:

Video output to a CRT

Multiprocessor serial communications
8-bit parallel I/O
The DMA controller 314 can maintain both serial and parallel transfers simultaneously. The following DMA sources and destinations are supported by the microprocessor 310:

| DESCRIPTION | I/O | LINES |
|---|---|---|
| 1. Video shift register | OUTPUT | 1 to 3 |
| 2. Multiprocessor serial | BOTH | 6 lines/channel |
| 3. 8-bit parallel | BOTH | 8 data, 4 control |

The three sources use separate 1024-bit buffers and separate I/O pins. Therefore, all three may be active simultaneously without interference.

The microprocessor 310 can be implemented with either a single multiprocessor serial buffer or separate receive and sending buffers for each channel, allowing simultaneous bidirectional communications with six neighbors simultaneously.

FIGS. 10 and 11 provide details of the PROM DMA used in the microprocessor 50. The microprocessor 50 executes faster than all but the fastest PROMs. PROMS are used in a microprocessor 50 system to store program segments and perhaps entire programs. The microprocessor 50 provides a feature on power-up to allow programs to be loaded from low-cost, slow speed PROMs into high speed DRAM for execution. The logic which performs this function is part of the DMA memory controller 118. The operation is similar to DMA, but not identical, since four 8-bit bytes must be assembled on the microprocessor 50 chip, then written to the DRAM 150.

The microprocessor 50 directly interfaces to DRAM 150 over a triple multiplexed data and address bus 350, which carries RAS addresses, CAS addresses and data. The EPROM 260, on the other hand, is read with non-multiplexed busses. The microprocessor 50 therefore has a special mode which unmultiplexes the data and address lines to read 8 bits of EPROM data. Four 8-bit bytes are read in this fashion. The multiplexed bus 350 is turned back on, and the data is written to the DRAM 150.

When the microprocessor 50 detects a RESET condition, the processor stops the main CPU 70 and forces a mode 0 (PROM LOAD) instruction into the DMA CPU 72 instruction register. The DMA instruction directs the memory controller to read the EPROM 260 data at 8 times the normal access time for memory. Assuming a 50 MHz microprocessor 50, this means an access time of 320 nsec. The instruction also indicates:

The selection address of the EPROM 260 to be loaded,
The number of 32-bit words to transfer,
The DRAM 150 address to transfer into.

The sequence of activities to transfer one 32-bit word from EPROM 260 to DRAM 150 are:

1. RAS goes low at 352, latching the EPROM 260 select information from the high order address bits. The EPROM 260 is selected.
2. Twelve address bits (consisting of what is normally DRAM CAS addresses plus two byte select bits are placed on the bus 350 going to the EPROM 260 address pins. These signals will remain on the lines until the data from the EPROM 260 has been read into the microprocessor 50. For the first byte, the byte select bits will be binary 00.
3. CAS goes low at 354, enabling the EPROM 260 data onto the lower 8 bits of the external address/data bus 350. NOTE: It is important to recognize that, during this part of the cycle, the lower 8 bits of the external data/address bus are functioning as inputs, but the rest of the bus is still acting as outputs.
4. The microprocessor 50 latches these eight least significant bits internally and shifts them 8 bits left to shift them to the next significant byte position.
5. Steps 2, 3 and 4 are repeated with byte address 01.
6. Steps 2, 3 and 4 are repeated with byte address 10.
7. Steps 2, 3 and 4 are repeated with byte address 11.
8. CAS goes high at 356, taking the EPROM 260 off the data bus.
9. RAS goes high at 358, indicating the end of the EPROM 260 access.
10. RAS goes low at 360, latching the DRAM select information from the high order address bits. At the same time, the RAS address bits are latched into the DRAM 150. The DRAM 150 is selected.
11. CAS goes low at 362, latching the DRAM 150 CAS addresses.
12. The microprocessor 50 places the previously latched EPROM 260 32-bit data onto the external address/data bus 350. W goes low at 364, writing the 32 bits into the DRAM 150.
13. W goes high at 366. CAS goes high at 368. The process continues with the next word.

FIG. 12 shows details of the microprocessor 50 memory controller 118. In operation, bus requests stay present until they are serviced. CPU 70 requests are prioritized at 370 in the order of: 1, Parameter Stack; 2, Return Stack; 3, Data Fetch; 4, Instruction Fetch. The resulting CPU request signal and a DMA request signal are supplied as bus requests to bus control 372, which provides a bus grant signal at 374. Internal address bus 136 and a DMA counter 376 provide inputs to a multiplexer 378. Either a row address or a column address are provided as an output to multiplexed address bus 380 as an output from the multiplexer 378. The multiplexed address bus 380 and the internal data bus 90 provide address and data inputs, respectively, to multiplexer 382. Shift register 384 supplies row address strobe (RAS) 1 and 2 control signals to multiplexer 386 and column address strobe (CAS) 1 and 2 control signals to multiplexer 388 on lines 390 and 392. The shift register 384 also supplies output enable (OE) and write (W) signals on lines 394 and 396 and a control signal on line 398 to multiplexer 382. The shift register 384 receives a RUN signal on line 400 to generate a memory cycle and supplies a MEMORY READY signal on line 402 when an access is complete.

STACK/REGISTER ARCHITECTURE

Most microprocessors use on-chip registers for temporary storage of variables. The on-chip registers access data faster than off-chip RAM. A few microprocessors use an on-chip push down stack for temporary storage.

A stack has the advantage of faster operation compared to on-chip registers by avoiding the necessity to select source and destination registers. (A math or logic operation always uses the top two stack items as source and the top of stack as destination.) The stack's disadvantage is that it makes some operations clumsy. Some compiler activities in particular require on-chip registers for efficiency.

As shown in FIG. 13, the microprocessor 50 provides both on-chip registers 134 and a stack 74 and reaps the benefits of both.

BENEFITS:

1. Stack math and logic is twice as fast as those available on an equivalent register only machine. Most programmers and optimizing compilers can take advantage of this feature.

2. Sixteen registers are available for on-chip storage of local variables which can transfer to the stack for computation. The accessing of variables is three to four times as fast as available on a strictly stack machine.

The combined stack 74/register 134 architecture has not been used previously due to inadequate understanding by computer designers of optimizing compilers and the mix of transfer versus math/logic instructions.

ADAPTIVE MEMORY CONTROLLER

A microprocessor must be designed to work with small or large memory configurations. As more memory loads are added to the data, address, and control lines, the switching speed of the signals slows down. The microprocessor 50 multiplexes the address/data bus three ways, so timing between the phases is critical. A traditional approach to the problem allocates a wide margin of time between bus phases so that systems will work with small or large numbers of memory chips connected. A speed compromise of as much as 50% is required.

As shown in FIG. 14, the microprocessor 50 uses a feedback technique to allow the processor to adjust memory bus timing to be fast with small loads and slower with large ones. The OUTPUT ENABLE (OE) line 152 from the microprocessor 50 is connected to all memories 150 on the circuit board. The loading on the output enable line 152 to the microprocessor 50 is directly related to the number of memories 150 connected. By monitoring how rapidly OE 152 goes high after a read, the microprocessor 50 is able to determine when the data hold time has been satisfied and place the next address on the bus.

The level of the OE line 152 is monitored by CMOS input buffer 410 which generates an internal READY signal on line 412 to the microprocessor's memory controller. Curves 414 and 416 of the FIG. 15 graph show the difference in rise time likely to be encountered from a lightly to heavily loaded memory system. When the OE line 152 has reached a predetermined level to generate the READY signal, driver 418 generates an OUTPUT ENABLE signal on OE line 152.

SKIP WITHIN THE INSTRUCTION CACHE

The microprocessor 50 fetches four 8-bit instructions each memory cycle and stores them in a 32-bit instruction register 108, as shown in FIG. 16. A class of "test and skip" instructions can very rapidly execute a very fast jump operation within the four instruction cache.

SKIP CONDITIONS:

Always

ACC non-zero

ACC negative

Carry flag equal logic one

Never

ACC equal zero

ACC positive

Carry flag equal logic zero

The SKIP instruction can be located in any of the four byte positions 420 in the 32-bit instruction register 108. If the test is successful, SKIP will jump over the remaining one, two, or three 8-bit instructions in the instruction register 108 and cause the next four-instruction group to be loaded into the register 108. As shown, the SKIP operation is implemented by resetting the 2-bit microinstruction counter 180 to zero on line 422 and simultaneously latching the next instruction group into the register 108. Any instructions following the SKIP in the instruction register are overwritten by the new instructions and not executed.

The advantage of SKIP is that optimizing compilers and smart programmers can often use it in place of the longer conditional JUMP instruction. SKIP also makes possible microloops which exit when the loop counts down or when the SKIP jumps to the next instruction group. The result is very fast code.

Other machines (such as the PDP-8 and Data General NOVA) provide the ability to skip a single instruction. The microprocessor 50 provides the ability to skip up to three instructions.

MICROLOOP IN THE INSTRUCTION CACHE

The microprocessor 50 provides the MICROLOOP instruction to execute repetitively from one to three instructions residing in the instruction register 108. The microloop instruction works in conjunction with the LOOP COUNTER 92 (FIG. 2) connected to the internal data bus 90. To execute a microloop, the program stores a count in LOOP COUNTER 92. MICROLOOP may be placed in the first, second, third, or last byte 420 of the instruction register 108. If placed in the first position, execution will just create a delay equal to the number stored in LOOP COUNTER 92 times the machine cycle. If placed in the second, third, or last byte 420, when the microloop instruction is executed, it will test the LOOP COUNT for zero. If zero, execution will continue with the next instruction. If not zero, the LOOP COUNTER 92 is decremented and the 2-bit microinstruction counter is cleared, causing the preceding instructions in the instruction register to be executed again.

Microloop is useful for block move and search operations. By executing a block move completely out of the instruction register 108, the speed of the move is doubled, since all memory cycles are used by the move rather than being shared with instruction fetching. Such a hardware implementation of microloops is much faster than conventional software implementation of a comparable function.

OPTIMAL CPU CLOCK SCHEME

The designer of a high speed microprocessor must produce a product which operate over wide temperature ranges, wide voltage swings, and wide variations in semiconductor processing. Temperature, voltage, and process all affect transistor propagation delays. Traditional CPU designs are done so that with the worse case of the three parameters, the circuit will function at the rated clock speed. The result are designs that must be clocked a factor of two slower than their maximum theoretical performance, so they will operate properly in worse case conditions.

The microprocessor 50 uses the technique shown in FIGS. 17–19 to generate the system clock and its required phases. Clock circuit 430 is the familiar "ring oscillator" used to test process performance. The clock is fabricated on the same silicon chip as the rest of the microprocessor 50.

The ring oscillator frequency is determined by the parameters of temperature, voltage, and process. At room temperature, the frequency will be in the neighborhood of 100 MHZ. At 70 degrees Centigrade, the speed will be 50 MHZ. The ring oscillator 430 is useful as a system clock, with its stages 431 producing phase 0-phase 3 outputs 433 shown in FIG. 19, because its performance tracks the parameters which similarly affect all other transistors on the same silicon die. By deriving system timing from the ring oscillator 430, CPU 70 will always execute at the maximum frequency possible, but never too fast. For example, if the processing of a particular die is not good resulting in slow transistors, the latches and gates on the microprocessor 50 will operate slower than normal. Since the microprocessor 50 ring oscillator clock 430 is made from the same transistors on the same die as the latches and gates, it too will operate slower (oscillating at a lower frequency), providing compensation which allows the rest of the chip's logic to operate properly.

ASYNCHRONOUS/SYNCHRONOUS CPU

Most microprocessors derive all system timing from a single clock. The disadvantage is that different parts of the system can slow all operations. The microprocessor 50 provides a dual-clock scheme as shown in FIG. 17, with the CPU 70 operating asynchronously to I/O interface 432 forming part of memory controller 118 (FIG. 2) and the I/O interface 432 operating synchronously with the external world of memory and I/O devices. The CPU 70 executes at the fastest speed possible using the adaptive ring oscillator clock 430. Speed may vary by a factor of four depending upon temperature, voltage, and process. The external world must be synchronized to the microprocessor 50 for operations such as video display updating and disc drive reading and writing. This synchronization is performed by the I/O interface 432, speed of which is controlled by a conventional crystal clock 434. The interface 432 processes requests for memory accesses from the microprocessor 50 and acknowledges the presence of I/O data. The microprocessor 50 fetches up to four instructions in a single memory cycle and can perform much useful work before requiring another memory access. By decoupling the variable speed of the CPU 70 from the fixed speed of the I/O interface 432, optimum performance can be achieved by each. Recoupling between the CPU 70 and the interface 432 is accomplished with hand shake signals on lines 436, with data/addresses passing on bus 90, 136.

ASYNCHRONOUS/SYNCHRONOUS CPU IMBEDDED ON A DRAM CHIP

System performance is enhanced even more when the DRAM 311 and CPU 314 (FIG. 9) are located on the same die. The proximity of the transistors means that DRAM 311 and CPU 314 parameters will closely follow each other. At room temperature, not only would the CPU 314 execute at 100 MHZ, but the DRAM 311 would access fast enough to keep up. The synchronization performed by the I/O interface 432 would be for DMA and reading and writing I/O ports. In some systems (such as calculators) no I/O synchronization at all would be required, and the I/O clock would be tied to the ring counter clock.

VARIABLE WIDTH OPERANDS

Many microprocessors provide variable width operands. The microprocessor 50 handles operands of 8, 16, or 24 bits using the same op-code. FIG. 20 shows the 32-bit instruction register 108 and the 2-bit microinstruction register 180 which selects the 8-bit instruction. Two classes of microprocessor 50 instructions can be greater than 8-bits, JUMP class and IMMEDIATE. A JUMP or IMMEDIATE op-code is 8-bits, but the operand can be 8, 16, or 24 bits long. This magic is possible because operands must be right justified in the instruction register. This means that the least significant bit of the operand is always located in the least significant bit of the instruction register. The microinstruction counter 180 selects which 8-bit instruction to execute. If a JUMP or IMMEDIATE instruction is decoded, the state of the 2-bit microinstruction counter selects the required 8, 16, or 24 bit operand onto the address or data bus. The unselected 8-bit bytes are loaded with zeros by operation of decoder 440 and gates 442. The advantage of this technique is the saving of a number of op-codes required to specify the different operand sizes in other microprocessors.

TRIPLE STACK CACHE

Computer performance is directly related to the system memory bandwidth. The faster the memories, the faster the computer. Fast memories are expensive, so techniques have been developed to move a small amount of high-speed memory around to the memory addresses where it is needed. A large amount of slow memory is constantly updated by the fast memory, giving the appearance of a large fast memory array. A common implementation of the technique is known as a high-speed memory cache. The cache may be thought of as fast acting shock absorber smoothing out the bumps in memory access. When more memory is required than the shock can absorb, it bottoms out and slow speed memory is accessed. Most memory operations can be handled by the shock absorber itself.

The microprocessor 50 architecture has the ALU 80 (FIG. 2) directly coupled to the top two stack locations 76 and 78. The access time of the stack 74 therefore directly affects the execution speed of the processor. The microprocessor 50 stack architecture is particularly suitable to a triple cache technique, shown in FIG. 21 which offers the appearance of a large stack memory operating at the speed of on-chip latches 450. Latches 450 are the fastest form of memory device built on the chip, delivering data in as little as 3 nsec. However latches 450 require large numbers of transistors to construct. On-chip RAM 452 requires fewer transistors than latches, but is slower by a factor of five (15 nsec access). Off-chip RAM 150 is the slowest storage of all. The microprocessor 50 organizes the stack memory hierarchy as three interconnected stacks 450, 452 and 454. The latch stack 450 is the fastest and most frequently used. The on-chip RAM stack 452 is next. The off-chip RAM stack 454 is slowest. The stack modulation determines the effective access time of the stack. If a group of stack operations never push or pull more than four consecutive items on the stack, operations will be entirely performed in the 3 nsec latch stack. When the four latches 456 are filled, the data in the bottom of the latch stack 450 is written to the top of the on-chip RAM stack 452. When the sixteen locations 458 in the on-chip RAM stack 452 are filled, the data in the bottom of the on-chip RAM stack 452 is written to the top of the off-chip RAM stack 454. When popping data off a full stack 450, four pops will be performed before stack empty line 460 from the latch stack pointer 462 transfers data from the on-chip RAM stack 452. By waiting for the latch stack 450 to empty before performing the slower on-chip RAM access, the high effective speed of the latches 456 are made available to the processor. The same approach is employed with the on-chip RAM stack 452 and the off-chip RAM stack 454.

POLYNOMIAL GENERATION INSTRUCTION

Polynomials are useful for error correction, encryption, data compression, and fractal generation. A polynomial is generated by a sequence of shift and exclusive OR operations. Special chips are provided for this purpose in the prior art.

The microprocessor 50 is able to generate polynomials at high speed without external hardware by slightly modifying how the ALU 80 works. As shown in FIG. 21, a polynomial is generated by loading the "order" (also known as the feedback terms) into C Register 470. The value thirty one (resulting in 32 iterations) is loaded into DOWN COUNTER 472. A register 474 is loaded with zero. B register 476 is loaded with the starting polynomial value. When the POLY instruction executes, C register 470 is exclusively ORed with A register 474 if the least significant bit of B register 476 is a one. Otherwise, the contents of the A register 474 passes through the ALU 80 unaltered. The combination of A and B is then shifted right (divided by 2) with shifters 478 and 480. The operation automatically repeats the specified number of iterations, and the resulting polynomial is left in A register 474.

FAST MULTIPLY

Most microprocessors offer a 16×16 or 32×32 bit multiply instruction. Multiply when performed sequentially takes one shift/add per bit, or 32 cycles for 32 bit data. The microprocessor 50 provides a high speed multiply which allows multiplication by small numbers using only a small number of cycles. FIG. 23 shows the logic used to implement the high speed algorithm. To perform a multiply, the size of the multiplier less one is placed in the DOWN COUNTER 472. For a four bit multiplier, the number three would be stored in the DOWN COUNTER 472. Zero is loaded into the A register 474. The multiplier is written bit reversed into the B Register 476. For example, a bit reversed five (binary 0101) would be written into B as 1010. The multiplicand is written into the C register 470. Executing the FAST MULT instruction will leave the result in the A Register 474, when the count has been completed. The fast multiply instruction is important because many applications scale one number by a much smaller number. The difference in speed between multiplying a 32×32 bit and a 32×4 bit is a factor of 8. If the least significant bit of the multiplier is a "ONE", the contents of the A register 474 and the C register 470 are added. If the least significant bit of the multiplier is a "ZERO", the contents of the A register are passed through the ALU 80 unaltered. The output of the ALU 80 is shifted left by shifter 482 in each iteration. The contents of the B register 476 are shifted right by the shifter 480 in each iteration.

INSTRUCTION EXECUTION PHILOSOPHY

The microprocessor 50 uses high speed D latches in most of the speed critical areas. Slower on-chip RAM is used as secondary storage.

The microprocessor 50 philosophy of instruction execution is to create a hierarchy of speed as follows:

| Logic and D latch transfers | 1 cycle | 20 nsec |
|---|---|---|
| Math | 2 cycles | 40 nsec |
| Fetch/store on-chip RAM | 2 cycles | 40 nsec |
| Fetch/store in current RAS page | 4 cycles | 80 nsec |
| Fetch/store with RAS cycle | 11 cycles | 220 nsec |

With a 50 MHZ clock, many operations can be performed in 20 nsec. and almost everything else in 40 nsec.

To maximize speed, certain techniques in processor design have been used. They include:
 Eliminating arithmetic operations on addresses,
 Fetching up to four instructions per memory cycle,
 Pipelineless instruction decoding
 Generating results before they are needed,
 Use of three level stack caching.

PIPELINE PHILOSOPHY

Computer instructions are usually broken down into sequential pieces, for example: fetch, decode, register read, execute, and store. Each piece will require a single machine cycle. In most Reduced Instruction Set Computer (RISC) chips, instruction require from three to six cycles.

RISC instructions are very parallel. For example, each of 70 different instructions in the SPARC (SUN Computer's RISC chip) has five cycles. Using a technique called "pipelining", the different phases of consecutive instructions can be overlapped.

To understand pipelining, think of building five residential homes. Each home will require in sequence, a foundation, framing, plumbing and wiring, roofing, and interior finish. Assume that each activity takes one week. To build one house will take five weeks.

But what if you want to build an entire subdivision? You have only one of each work crew, but when the foundation men finish on the first house, you immediately start them on the second one, and so on. At the end of five weeks, the first home is complete, but you also have five foundations. If you have kept the framing, plumbing, roofing, and interior guys all busy, from five weeks on, a new house will be completed each week.

This is the way a RISC chip like SPARC appears to execute an instruction in a single machine cycle. In reality, a RISC chip is executing one fifth of five instructions each machine cycle. And if five instructions stay in sequence, an instruction will be completed each machine cycle.

The problems with a pipeline are keeping the pipe full with instructions. Each time an out of sequence instruction such as a BRANCH or CALL occurs, the pipe must be refilled with the next sequence. The resulting dead time to refill the pipeline can become substantial when many IF/THEN/ELSE statements or subroutines are encountered.

THE PIPELINE APPROACH

The microprocessor 50 has no pipeline as such. The approach of this microprocessor to speed is to overlap instruction fetching with execution of the previously fetched instruction(s). Beyond that, over half the instructions (the most common ones) execute entirely in a single machine cycle of 20 nsec. This is possible because:

1. Instruction decoding resolves in 2.5 nsec.
2. Incremented/decremented and some math values are calculated before they are needed, requiring only a latching signal to execute.
3. Slower memory is hidden from high speed operations by high-speed D latches which access in 4 nsec.

The disadvantage for this microprocessor is a more complex chip design process. The advantage for the chip user is faster ultimate throughput since pipeline stalls cannot exist. Pipeline synchronization with availability flag bits and other such pipeline handling is not required by this microprocessor.

For example, in some RISC machines an instruction which tests a status flag may have to wait for up to four cycles for the flag set by the previous instruction to be available to be tested. Hardware and software debugging is also somewhat easier because the user doesn't have to visualize five instructions simultaneously in the pipe.

OVERLAPPING INSTRUCTION FETCH/EXECUTE

The slowest procedure the microprocessor 50 performs is to access memory. Memory is accessed when data is read or written. Memory is also read when instructions are fetched. The microprocessor 50 is able to hide fetch of the next instruction behind the execution of the previously fetched instruction(s). The microprocessor 50 fetches instructions in 4-byte instruction groups. An instruction group may contain from one to four instructions. The amount of time required to execute the instruction group ranges from 4 cycles for simple instructions to 64 cycles for a multiply.

When a new instruction group is fetched, the microprocessor instruction decoder looks at the most significant bit of all four of the bytes. The most significant bit of an instruction determines if a memory access is required. For example, CALL, FETCH, and STORE all require a memory access to execute. If all four bytes have nonzero most significant bits, the microprocessor initiates the memory fetch of the next sequential 4-byte instruction group. When the last instruction in the group finishes executing, the next 4-byte instruction group is ready and waiting on the data bus needing only to be latched into the instruction register. If the 4-byte instruction group required four or more cycles to execute and the next sequential access was a column address strobe (CAS) cycle, the instruction fetch was completely overlapped with execution.

INTERNAL ARCHITECTURE

The microprocessor 50 architecture consists of the following:

| PARAMETER STACK | <--> | Y REGISTER |
| | ALU* | RETURN STACK |
| | <--> | |
| <--- 32 BITS ---> | | <---32 BITS---> |
| 16 DEEP | | 16 DEEP |
| Used for math and logic. | | Used for subroutine and interrupt return addresses as well as local variables. |
| Push down stack. | | Push down stack. |
| Can overflow into | | Can overflow into |
| off-chip RAM. | | off-chip RAM. |
| | | Can also be accessed relative to top of stack. |
| LOOP COUNTER | | (32-bits, can decrement by 1) Used by class of test and loop instructions. |
| X REGISTER | | (32-bits, can increment or decrement by 4). Used to point to RAM locations. |
| PROGRAM COUNTER | | (32-bits, increments by 4). Points to 4-byte instruction groups in RAM. |
| INSTRUCTION REG | | (32-Bits). Holds 4-byte instruction groups while they are being decoded and executed. |

*Math and logic operations use the TOP item and NEXT to top Parameter Stack items as the operands. The result is pushed onto the Parameter Stack.
*Return addresses from subroutines are placed on the Return Stack. The Y REGISTER is used as a pointer to RAM locations. Since the Y REGISTER is the top item of the Return Stack, nesting of indices is straightforward.
MODE - A register with mode and status bits.
MODE-BITS:
Slow down memory accesses by 8 if "1". Run full speed if "0". (Provided for access to slow EPROM.)
Divide the system clock by 1023 if "1" to reduce power consumption. Run full speed if "0". (On-chip counters slow down if this bit is set.)
Enable external interrupt 1.
Enable external interrupt 2.
Enable external interrupt 3.
Enable external interrupt 4.
Enable external interrupt 5.
Enable external interrupt 6.
Enable external interrupt 7.
ON-CHIP MEMORY LOCATIONS:
MODE-BITS
DMA-POINTER
DMA-COUNTER

| STACK-POINTER | Pointer into Parameter Stack. |
| STACK-DEPTH | Depth of on-chip Parameter Stack |
| RSTACK-POINTER | Pointer into Return Stack |
| RSTACK-DEPTH | Depth of on-chip Return Stack |

ADDRESSING MODE HIGH POINTS

The data bus is 32-bits wide. All memory fetches and stores are 32-bits. Memory bus addresses are 30 bits. The least significant 2 bits are used to select one-of-four bytes in some addressing modes. The Program Counter, X Register, and Y Register are implemented as D latches with their outputs going to the memory address bus and the bus incrementer/decrementer. Incrementing one of these registers can happen quickly, because the incremented value has already rippled through the inc/dec logic and need only be clocked into the latch. Branches and Calls are made to 32-bit word-boundaries.

INSTRUCTION SET

32-BIT INSTRUCTION FORMAT

The thirty two bit instructions are CALL, BRANCH, BRANCH-IF-ZERO, and LOOP-IF-NOT-DONE. These instructions require the calculation of an effective address. In many computers, the effective address is calculated by adding or subtracting an operand with the current Program Counter. This math operation requires from four to seven machine cycles to perform and can definitely bog down machine execution. The microprocessor's strategy is to perform the required math operation at assembly or linking time and do a much simpler "Increment to next page" or "Decrement to previous page" operation at run time. As a result, the microprocessor branches execute in a single cycle.

24-BIT OPERAND FORM:
  Byte 1      Byte 2      Byte 3      Byte 4
  WWWWWW XX - YYYYYYYY - YYYYYYYY - YYYYYYYY
  With a 24-bit operand, the current page is
  considered to be defined by the most
  significant 6 bits of the Program Counter.
16-BIT OPERAND FORM:
  QQQQQQQQ - WWWWWW XX - YYYYYYYY - YYYYYYYY
  With a 16-bit operand, the current page is
  considered to be defined by the most
  significant 14 bits of the Program Counter.
8-BIT OPERAND FORM:
  QQQQQQQQ - QQQQQQQQ - WWWWWW XX - YYYYYYYY
  With an 8-bit operand, the current page is
  considered to be defined by the most
  significant 22 bits of the Program Counter.
QQQQQQQQ - Any 8-bit instruction.
WWWWWW - Instruction op-code.
XX - Select how the address bits will be used:
  00 - Make all high-order bits zero. (Page zero addressing)
  01 - Increment the high-order bits. (Use next page)
  10 - Decrement the high-order bits. (Use previous page)
  11 - Leave the high-order bits unchanged. (Use current page)
YYYYYYYY - The address operand field. This field is always shifted left two bits (to generate a word rather than byte address) and loaded into the Program Counter. The microprocessor instruction decoder figures out the width of the operand field by the location of the instruction op-code in the four bytes.

The compiler or assembler will normally use the shortest operand required to reach the desired address so that the leading bytes can be used to hold other instructions. The effective address is calculated by combining:

The current Program Counter,

The 8, 16, or 24 bit address operand in the instruction,

Using one of the four allowed addressing modes.

EXAMPLES OF EFFECTIVE ADDRESS CALCULATION

Example 1:

| Byte 1 | Byte 2 | Byte 3 | Byte 4 |
| QQQQQQQQ | QQQQQQQQ | 00000011 | 10011000 |

The "QQQQQQQQs" in Byte 1 and 2 indicate space in the 4-byte memory fetch which could be hold two other instructions to be executed prior to the CALL instruction. Byte 3 indicates a CALL instruction (six zeros) in the current page (indicated by the 11 bits). Byte 4 indicates that the hexadecimal number 98 will be forced into the Program Counter bits 2 through 10. (Remember, a CALL or BRANCH always goes to a word boundary so the two least significant bits are always set to zero). The effect of this instruction would be to CALL a subroutine at WORD location HEX 98 in the current page. The most significant 22 bits of the Program Counter define the current page and will be unchanged.

Example 2:

| Byte 1 | Byte 2 | Byte 3 | Byte 4 |
|--------|--------|--------|--------|
| 000001 01 | 00000001 | 00000000 | 00000000 |

If we assume that the Program Counter was HEX 0000 0156 which is binary:

00000000 00000000 00000001 01010110 = OLD PROGRAM COUNTER.

Byte 1 indicates a BRANCH instruction op code (000001) and "01" indicates select the next page. Byte 2,3, and 4 are the address operand. These 24-bits will be shifted to the left two places to define a WORD address. HEX 0156 shifted left two places is HEX 0558. Since this is a 24-bit operand instruction, the most significant 6 bits of the Program Counter define the current page. These six bits will be incremented to select the next page. Executing this instruction will cause the Program Counter to be loaded with HEX 0400 0558 which is binary:

00000100 00000000 00000101 01011000 = NEW PROGRAM COUNTER.

INSTRUCTIONS
CALL-LONG
    0000 00XX - YYYYYYYY - YYYYYYYY - YYYYYYYY

Load the Program Counter with the effective WORD address specified. Push the current PC contents onto the RETURN STACK.

OTHER EFFECTS: CARRY or modes, no effect. May cause Return Stack to force an external memory cycle if on-chip Return Stack is full.

BRANCH
    0000 01XX - YYYYYYYY - YYYYYYYY - YYYYYYYY

Load the Program Counter with the effective WORD address specified.
OTHER EFFECTS: NONE

BRANCH-IF-ZERO
    0000 10XX - YYYYYYYY - YYYYYYYY - YYYYYYYY

Test the TOP value on the Parameter Stack. If the value is equal to zero, load the Program Counter with the effective WORD address specified. If the TOP value is not equal to zero, increment the Program Counter and fetch and execute the next instruction.
OTHER EFFECTS: NONE

LOOP-IF-NOT-DONE
    0000 11YY - (XXXX XXXX) - (XXXX XXXX) - (XXXX XXXX)

If the LOOP COUNTER is not zero, load the Program Counter with the effective WORD address specified. If the LOOP COUNTER is zero, decrement the LOOP COUNTER, increment the Program Counter and fetch and execute the next instruction.

OTHER EFFECTS: NONE

8-BIT INSTRUCTIONS PHILOSOPHY

Most of the work in the microprocessor 50 is done by the 8-bit instructions. Eight bit instructions are possible with the microprocessor because of the extensive use of implied stack addressing. Many 32-bit architectures use 8-bits to specify the operation to perform but use an additional 24-bits to specify two sources and a destination.

For math and logic operations, the microprocessor 50 exploits the inherent advantage of a stack by designating the source operand(s) as the top stack item and the next stack item. The math or logic operation is performed, the operands are popped from the stack, and the result is pushed back on the stack. The result is a very efficient utilization of instruction bits as well as registers. A comparable situation exists between Hewlett Packard calculators (which use a stack) and Texas Instrument calculators which don't. The identical operation on an HP will require one half to one third the keystrokes of the TI.

The availability of 8-bit instructions also allows another architectural innovation, the fetching of four instructions in a single 32-bit memory cycle. The advantages of fetching multiple instructions are:

Increased execution speed even with slow memories,

Similar performance to the Harvard (separate data and instruction busses) without the expense, Opportunities to optimize groups of instructions, The capability to perform loops within this mini-cache. The microloops inside the four instruction group are effective for searches and block moves.

SKIP INSTRUCTIONS

The microprocessor 50 fetches instructions in 32-bit chunks called 4-byte instruction groups. These four bytes may contain four 8-bit instructions or some mix of 8-bit and 16 or 24-bit instructions. SKIP instructions in the microprocessor skip any remaining instructions in a 4-byte instruction group and cause a memory fetch to get the next 4-byte instruction group. Conditional SKIPs when combined with 3-byte BRANCHES will create conditional BRANCHES. SKIPs may also be used in situations when no use can be made of the remaining bytes in a 4-instruction group. A SKIP executes in a single cycle, whereas a group of three NOPs would take three cycles.

| | |
|---|---|
| SKIP-ALWAYS - | skip any remaining instructions in this 4-byte instruction group. Increment the most significant 30-bits of the Program Counter and proceed to fetch the next 4-byte instruction group. |
| SKIP-IF-ZERO - | If the TOP item of the Parameter Stack is zero, skip any remaining instructions in the 4-byte instruction group. Increment the most significant 30-bits of the Program Counter and proceed to fetch the next 4-byte instruction group. If the TOP item is not zero, execute the next sequential instruction. |
| SKIP-IF-POSITIVE - | If the TOP item of the Parameter Stack has a the most significant bit (the sign bit) equal to "0", skip any remaining instructions in the 4-byte instruction group. Increment the most significant 30-bits of the Program Counter and proceed to fetch the next 4-byte instruction group. If the TOP item is not "0", execute the next sequential instruction. |

| | |
|---|---|
| SKIP-IF-NO-CARRY - | If the CARRY flag from a SHIFT or arithmetic operation is not equal to "1", skip any remaining instructions in the 4-byte instruction group. Increment the most significant 30-bits of the Program Counter and proceed to fetch the next 4-byte instruction group. If the CARRY is equal to "1", execute the next sequential instruction. |
| SKIP-NEVER (NOP) | Execute the next sequential instruction. (Delay one machine cycle). |
| SKIP-IF-NOT-ZERO - | If the TOP item on the Parameter Stack is not equal to "0", skip any remaining instructions in the 4-byte instruction group. Increment the most significant 30-bits of the Program Counter and proceed to fetch the next 4-byte instruction group. If the TOP item is equal 0", execute the next sequential instruction. |
| SKIP-IF-NEGATIVE - | If the TOP item on the Parameter Stack has its most significant bit (sign bit) set to "1", skip any remaining instructions in the 4-byte instruction group. Increment the most significant 30-bits of the Program Counter and proceed to fetch the next 4-byte instruction group. If the TOP item has its most significant bit set to "0", execute the next sequential instruction. |
| SKIP-IF-CARRY - | If the CARRY flag is set to "1" as a result of SHIFT or arithmetic operation, skip any remaining instructions in the 4-byte instruction group. Increment the most significant 30-bits of the Program Counter and proceed to fetch the next 4-byte instruction group. If the CARRY flag is "0", execute the next sequential instruction. |

MICROLOOPS

Microloops are a unique feature of the microprocessor architecture which allows controlled looping within a 4-byte instruction group. A microloop instruction tests the LOOP COUNTER for "0" and may perform an additional test. If the LOOP COUNTER is not "0" and the test is met, instruction execution continues with the first instruction in the 4-byte instruction group, and the LOOP COUNTER is decremented. A microloop instruction will usually be the last byte in a 4-byte instruction group, but it can be any byte. If the LOOP COUNTER is "0" or the test is not met, instruction execution continues with the next instruction. If the microloop is the last byte in the 4-byte instruction group, the most significant 30-bits of the Program Counter are incremented and the next 4-byte instruction group is fetched from memory. On a termination of the loop on LOOP COUNTER equal to "0", the LOOP COUNTER will remain at "0". Microloops allow short iterative work such as moves and searches to be performed without slowing down to fetch instructions from memory.

EXAMPLE:

| | |
|---|---|
| Byte 1 FETCH-VIA-X-AUTOINCREMENT | Byte 2 STORE-VIA-Y-AUTO-INCREMENT |
| Byte 3 ULOOP-UNTIL-DONE | Byte 4 QQQQQQQQ |

This example will perform a block move. To initiate the transfer, X will be loaded with the starting address of the source. Y will be loaded with the starting address of the destination. The LOOP COUNTER will be loaded with the number of 32-bit words to move. The microloop will FETCH and STORE and count down the LOOP COUNTER until it reaches zero. QQQQQQQQ indicates any instruction can follow.

MICROLOOP INSTRUCTIONS

ULOOP-UNTIL-DONE—If the LOOP COUNTER is not "0", continue execution with the first instruction in the 4-byte instruction group. Decrement the LOOP COUNTER. If the LOOP COUNTER is "0", continue execution with the next instruction.

ULOOP-IF-ZERO—If the LOOP COUNTER is not "0" and the TOP item on the Parameter Stack is "0", continue execution with the first instruction in the 4-byte instruction group. Decrement the LOOP COUNTER. If the LOOP COUNTER is "0" or the TOP item is "1", continue execution with the next instruction.

ULOOP-IF-POSITIVE—If the LOOP COUNTER is not "0" and the most significant bit (sign bit) is "0", continue execution with the first instruction in the 4-byte instruction group. Decrement the LOOP COUNTER. If the LOOP COUNTER is "0" or the TOP item is "1", continue execution with the next instruction.

ULOOP-IF-NOT-CARRY-CLEAR—If the LOOP COUNTER is not "0" and the floating point exponents found in TOP and NEXT are not aligned, continue execution with the first instruction in the 4-byte instruction group. Decrement the LOOP COUNTER. If the LOOP COUNTER is "0" or the exponents are aligned, continue execution with the next instruction. This instruction is specifically designed for combination with special SHIFT instructions to align two floating point numbers.

ULOOP-NEVER—(DECREMENT-LOOP-COUNTER) Decrement the LOOP COUNTER. Continue execution with the next instruction.

ULOOP-IF-NOT-ZERO—If the LOOP COUNTER is not "0" and the TOP item of the Parameter Stack is "0", continue execution with the first instruction in the 4-byte instruction group. Decrement the LOOP COUNTER. If the LOOP COUNTER is "0" or the TOP item is "1", continue execution with the next instruction.

ULOOP-IF-NEGATIVE—If the LOOP COUNTER is not "0" and the most significant bit (sign bit) of the TOP item of the Parameter Stack is "1", continue execution with the first instruction in the 4-byte instruction group. Decrement the LOOP COUNTER. If the LOOP COUNTER is "0" or the most significant bit of the Parameter Stack is "0", continue execution with the next instruction.

ULOOP-IF-CARRY-SET—If the LOOP COUNTER is not "0" and the exponents of the floating point numbers found in TOP and NEXT are not aligned, continue execution with the first instruction in the 4-byte instruction group. Decrement the LOOP COUNTER. If the LOOP COUNTER is "0" or the exponents are aligned, continue execution with the next instruction.

RETURN FROM SUBROUTINE OR INTERRUPT

Subroutine calls and interrupt acknowledgements cause a redirection of normal program execution. In both cases, the current Program Counter is pushed onto the Return Stack, so the microprocessor can return to its place in the program after executing the subroutine or interrupt service routine.

NOTE: When a CALL to subroutine or interrupt is acknowledged the Program Counter has already been incremented and is pointing to the 4-byte instruction group following the 4-byte group currently being executed. The instruction decoding logic allows the microprocessor to perform a test and execute a return conditional on the outcome of the test in a single cycle. A RETURN pops an address from the Return Stack and stores it to the Program Counter.

| RETURN INSTRUCTIONS | |
| --- | --- |
| RETURN-ALWAYS - | Pop the top item from the Return Stack and transfer it to the Program Counter. |
| RETURN-IF-ZERO - | If the TOP item on the Parameter Stack is "0", pop the top item from the Return Stack and transfer it to the Program Counter. Otherwise execute the next instruction. |
| RETURN-IF-POSITIVE - | If the most significant bit (sign bit) of the TOP item on the Parameter Stack is a "0", pop the top item from the Return Stack and transfer it to the Program Counter. Otherwise execute the next instruction. |
| RETURN-IF-CARRY-CLEAR - | If the exponents of the floating point numbers found in TOP and NEXT are not aligned, pop the top item from the Return Stack and transfer it to the Program Counter. Otherwise execute the next instruction. |
| RETURN-NEVER - (NOP) | Execute the next instruction. |
| RETURN-IF-NOT-ZERO - | If the TOP item on the Parameter Stack is not "0", pop the top item from the Return Stack and transfer it to the Program Counter. Otherwise execute the next instruction. |
| RETURN-IF-NEGATIVE - | If the most significant bit (sign bit) of the TOP item on the Parameter Stack is a "1", pop the top item from the Return Stack and transfer it to the Program Counter. Otherwise execute the next instruction. |
| RETURN-IF-CARRY-SET - | If the exponents of the floating point numbers found in TOP and NEXT are aligned, pop the top item from the Return Stack and transfer it to the Program. Counter. Otherwise execute the next instruction. |

HANDLING MEMORY FROM DYNAMIC RAM

The microprocessor 50, like any RISC type architecture, is optimized to handle as many operations as possible on-chip for maximum speed. External memory operations take from 80 nsec. to 220 nsec. compared with on-chip memory speeds of from 4 nsec. to 30 nsec. There are times when external memory must be accessed.

External memory is accessed using three registers:

X-REGISTER—A 30-bit memory pointer which can be used for memory access and simultaneously incremented or decremented.

Y-REGISTER—A 30-bit memory pointer which can be used for memory access and simultaneously incremented or decremented.

PROGRAM-COUNTER—A 30-bit memory pointer normally used to point to 4-byte instruction groups. External memory may be accessed at addresses relative to the PC. The operands are sometimes called "Immediate" or "Literal" in other computers. When used as memory pointer, the PC is also incremented after each operation.

MEMORY LOAD & STORE INSTRUCTIONS

FETCH-VIA-X—Fetch the 32-bit memory content pointed to by X and push it onto the Parameter Stack. X is unchanged.

FETCH-VIA-Y—Fetch the 32-bit memory content pointed to by X and push it onto the Parameter Stack. Y is unchanged.

FETCH-VIA-X-AUTOINCREMENT—Fetch the 32-bit memory content pointed to by X and push it onto the Parameter Stack. After fetching, increment the most significant 30 bits of X to point to the next 32-bit word address.

FETCH-VIA-Y-AUTOINCREMENT—Fetch the 32-bit memory content pointed to by Y and push it onto the Parameter Stack. After fetching, increment the most significant 30 bits of Y to point to the next 32-bit word address.

FETCH-VIA-X-AUTODECREMENT—Fetch the 32-bit memory content pointed to by X and push it onto the Parameter Stack. After fetching, decrement the most significant 30 bits of X to point to the previous 32-bit word address.

FETCH-VIA-Y-AUTODECREMENT—Fetch the 32-bit memory content pointed to by Y and push it onto the Parameter Stack. After fetching, decrement the most significant 30 bits of Y to point to the previous 32-bit word address.

STORE-VIA-X—Pop the top item of the Parameter Stack and store it in the memory location pointed to by X. X is unchanged.

STORE-VIA-Y—Pop the top item of the Parameter Stack and store it in the memory location pointed to by Y. Y is unchanged.

STORE-VIA-X-AUTOINCREMENT—Pop the top item of the Parameter Stack and store it in the memory location pointed to by X. After storing, increment the most significant 30 bits of X to point to the next 32-bit word address.

STORE-VIA-Y-AUTOINCREMENT—Pop the top item of the Parameter Stack and store it in the memory location pointed to by Y. After storing, increment the most significant 30 bits of Y to point to the next 32-bit word address.

STORE-VIA-X-AUTODECREMENT—Pop the top item of the Parameter Stack and store it in the memory location pointed to by X. After storing, decrement the most significant 30 bits of X to point to the previous 32-bit word address.

STORE-VIA-Y-AUTODECREMENT—Pop the top item of the Parameter Stack and store it in the memory location pointed to by Y. After storing, decrement the most significant 30 bits of Y to point to the previous 32-bit word address.

FETCH-VIA-PC—Fetch the 32-bit memory content pointed to by the Program Counter and push it onto the Parameter Stack. After fetching, increment the most significant 30 bits of the Program Counter to point to the next 32-bit word address.

*NOTE When this instruction executes, the PC is pointing to the memory location following the instruction. The effect is of loading a 32-bit immediate operand. This is an 8-bit instruction and therefore will be combined with other 8-bit instructions in a 4-byte instruction fetch. It is possible to have from one to four FETCH-VIA-PC instructions in a 4-byte instruction fetch. The PC increments after each execution of FETCH-VIA-PC, so it is possible to push four immediate operands on the stack. The four operands would be the found in the four memory locations following the instruction.

BYTE-FETCH-VIA-X—Fetch the 32-bit memory content pointed to by the most significant 30 bits of X. Using the two least significant bits of X, select one of four bytes from the 32-bit memory fetch, right justify the byte in a 32-bit field and push the selected byte preceded by leading zeros onto the Parameter Stack.

BYTE-STORE-VIA-X—Fetch the 32-bit memory content pointed to by the most significant 30 bits of X. Pop the TOP item from the Parameter Stack. Using the two least significant bits of X place the least significant byte into the 32-bit memory data and write the 32-bit entity back to the location pointed to by the most significant 30 bits of X.

OTHER EFFECTS OF MEMORY ACCESS INSTRUCTIONS:

Any FETCH instruction will push a value on the Parameter Stack 74. If the on-chip stack is full, the stack will overflow into off-chip memory stack resulting in an additional memory cycle. Any STORE instruction will pop a value from the Parameter Stack 74. If the on-chip stack is empty, a memory cycle will be generated to fetch a value from off-chip memory stack.

HANDLING ON-CHIP VARIABLES

High-level languages often allow the creation of LOCAL VARIABLES. These variables are used by a particular procedure and discarded. In cases of nested procedures, layers of these variables must be maintained. On-chip storage is up to five times faster than off-chip RAM, so a means of keeping local variables on-chip can make operations run faster. The microprocessor 50 provides the capability for both on-chip storage of local variables and nesting of multiple levels of variables through the Return Stack.

The Return Stack 134 is implemented as 16 on-chip RAM locations. The most common use for the Return Stack 134 is storage of return addresses from subroutines and interrupt calls. The microprocessor allows these 16 locations to also be used as addressable registers. The 16 locations may be read and written by two instructions which indicate a Return Stack relative address from 0–15. When high-level procedures are nested, the current procedure variables push the previous procedure variables further down the Return Stack 134. Eventually, the Return Stack will automatically overflow into off-chip RAM.

ON-CHIP VARIABLE INSTRUCTIONS

READ-LOCAL-VARIABLE XXXX—Read the XXXXth location relative to the top of the Return Stack. (XXXX is a binary number from 0000–1111). Push the item read onto the Parameter Stack.
OTHER EFFECTS: If the Parameter Stack is full, the push operation will cause a memory cycle to be generated as one item of the stack is automatically stored to external RAM. The logic which selects the location performs a modulo 16 subtraction. If four local variables have been pushed onto the Return Stack, and an instruction attempts to READ the fifth item, unknown data will be returned.

WRITE-LOCAL-VARIABLE XXXX—Pop the TOP item of the Parameter Stack and write it into the XXXXth location relative to the top of the Return Stack. (XXXX is a binary number from 0000–1111.)
OTHER EFFECTS: If the Parameter Stack is empty, the pop operation will cause a memory cycle to be generated to fetch the Parameter Stack item from external RAM. The logic which selects the location performs a modulo 16 subtraction. If four local variables have been pushed onto the Return Stack, and an instruction attempts to WRITE to the fifth item, it is possible to clobber return addresses or wreak other havoc.

REGISTER AND FLIP-FLOP TRANSFER AND PUSH INSTRUCTIONS

DROP—Pop the TOP item from the Parameter Stack and discard it.

SWAP—Exchange the data in the TOP Parameter Stack location with the data in the NEXT Parameter Stack location.

DUP—Duplicate the TOP item on the Parameter Stack and push it onto the Parameter Stack.

PUSH-LOOP-COUNTER—Push the value in LOOP COUNTER onto the Parameter Stack.

POP-RSTACK-PUSH-TO-STACK—Pop the top item from the Return Stack and push it onto the Parameter Stack.

PUSH-X-REG—Push the value in the X Register onto the Parameter Stack.

PUSH-STACK-POINTER—Push the value of the Parameter Stack pointer onto the Parameter Stack.

PUSH-RSTACK-POINTER—Push the value of the Return Stack pointer onto the Return Stack.

PUSH-MODE-BITS—Push the value of the MODE REGISTER onto the Parameter Stack.

PUSH-INPUT—Read the 10 dedicated input bits and push the value (right justified and padded with leading zeros) onto the Parameter Stack.

SET-LOOP-COUNTER—Pop the TOP value from the Parameter Stack and store it into LOOP COUNTER.

POP-STACK-PUSH-TO-RSTACK—Pop the TOP item from the Parameter Stack and push it onto the Return Stack.

SET-X-REG—Pop the TOP item from the Parameter Stack and store it into the X Register.

SET-STACK-POINTER—Pop the TOP item from the Parameter Stack and store it into the Stack Pointer.

SET-RSTACK-POINTER—Pop the TOP item from the Parameter Stack and store it into the Return Stack Pointer.

SET-MODE-BITS—Pop the TOP value from the Parameter Stack and store it into the MODE BITS.

SET-OUTPUT—Pop the TOP item from the Parameter Stack and output it to the 10 dedicated output bits.
OTHER EFFECTS: Instructions which push or pop the Parameter Stack or Return Stack may cause a memory cycle as the stacks overflow back and forth between on-chip and off-chip memory.

LOADING A SHORT LITERAL

A special case of register transfer instruction is used to push an 8-bit literal onto the Parameter Stack. This instruction requires that the 8-bits to be pushed reside in the last byte of a 4-byte instruction group. The instruction op-code loading the literal may reside in ANY of the other three bytes in the instruction group.

EXAMPLE:

| BYTE 1 | BYTE 2 | BYTE 3 |
|---|---|---|
| LOAD-SHORT-LITERAL | QQQQQQQQ | QQQQQQQQ |
| BYTE 4 | | |
| 00001111 | | |

In this example, QQQQQQQQ indicates any other 8-bit instruction. When Byte 1 is executed, binary 00001111 (HEX 0f) from Byte 4 will be pushed (right justified and padded by leading zeros) onto the Parameter Stack. Then the instructions in Byte 2 and Byte 3 will execute. The microprocessor instruction decoder knows not to execute Byte 4. It is possible to push three identical 8-bit values as follows:

| | |
|---|---|
| BYTE 1 | BYTE 2 |
| LOAD-SHORT-LITERAL | LOAD-SHORT-LITERAL |
| BYTE 3 | BYTE 4 |
| LOAD-SHORT-LITERAL | 00001111 |
| SHORT-LITERAL-INSTRUCTION | |
| LOAD-SHORT-LITERAL - | Push the 8-bit value found in Byte 4 of the current 4-byte instruction group onto the Parameter Stack. |

LOGIC INSTRUCTIONS

Logical and math operations used the stack for the source of one or two operands and as the destination for results. The stack organization is a particularly convenient arrangement for evaluating expressions. TOP indicates the top value on the Parameter Stack 74. NEXT indicates the next to top value on the Parameter Stack 74.

AND—Pop TOP and NEXT from the Parameter Stack, perform the logical AND operation on these two operands, and push the result onto the Parameter Stack.

OR—Pop TOP and NEXT from the Parameter Stack, perform the logical OR operation on these two operands, and push the result onto the Parameter Stack.

XOR—Pop TOP and NEXT from the Parameter Stack, perform the logical exclusive OR on these two operands, and push the result onto the Parameter Stack.

BIT-CLEAR—Pop TOP and NEXT from the Parameter Stack, toggle all bits in NEXT, perform the logical AND operation on TOP, and push the result onto the Parameter Stack. (Another way of understanding this instruction is thinking of it as clearing all bits in TOP that are set in NEXT.)

MATH INSTRUCTIONS

Math instruction pop the TOP item and NEXT to top item of the Parameter Stack 74 to use as the operands. The results are pushed back on the Parameter Stack. The CARRY flag is used to latch the "33rd bit" of the ALU result.

ADD—Pop the TOP item and NEXT to top item from the Parameter Stack, add the values together and push the result back on the Parameter Stack. The CARRY flag may be changed.

ADD-WITH-CARRY—Pop the TOP item and the NEXT to top item from the Parameter Stack, add the values together. If the CARRY flag is "1" increment the result. Push the ultimate result back on the Parameter Stack. The CARRY flag may be changed.

ADD-X—Pop the TOP item from the Parameter Stack and read the third item from the top of the Parameter Stack. Add the values together and push the result back on the Parameter Stack. The CARRY flag may be changed.

SUB—Pop the TOP item and NEXT to top item from the Parameter Stack, Subtract NEXT from TOP and push the result back on the Parameter Stack. The CARRY flag may be changed.

SUB-WITH-CARRY—Pop the TOP item and NEXT to top item from the Parameter Stack. Subtract NEXT from TOP. If the CARRY flag is "1" increment the result. Push the ultimate result back on the Parameter Stack. The CARRY flag may be changed.

SUB-X—
SIGNED-MULT-STEP—
UNSIGNED-MULT-STEP—
SIGNED-FAST-MULT—
FAST-MULT-STEP—
UNSIGNED-DIV-STEP—
GENERATE-POLYNOMIAL
ROUND—

COMPARE—Pop the TOP item and NEXT to top item from the Parameter Stack. Subtract NEXT from TOP. If the result has the most significant bit equal to "0" (the result is positive), push the result onto the Parameter Stack. If the result has the most significant bit equal to "1" (the result is negative), push the old value of TOP onto the Parameter Stack. The CARRY flag may be affected.

SHIFT/ROTATE

SHIFT-LEFT—Shift the TOP Parameter Stack item left one bit. The CARRY flag is shifted into the least significant bit of TOP.

SHIFT-RIGHT—Shift the TOP Parameter Stack item right one bit. The least significant bit of TOP is shifted into the CARRY flag. Zero is shifted into the most significant bit of TOP.

DOUBLE-SHIFT-LEFT—Treating the TOP item of the Parameter Stack as the most significant word of a 64-bit number and the NEXT stack item as the least significant word, shift the combined 64-bit entity left one bit. The CARRY flag is shifted into the least significant bit of NEXT.

DOUBLE-SHIFT-RIGHT—Treating the TOP item of the Parameter Stack as the most significant word of a 64-bit number and the NEXT stack item as the least significant word, shift the combined 64-bit entity right one bit. The least significant bit of NEXT is shifted into the CARRY flag. Zero is shifted into the most significant bit of TOP.

OTHER INSTRUCTIONS

FLUSH-STACK—Empty all on-chip Parameter Stack locations into off-chip RAM. (This instruction is useful for multitasking applications). This instruction accesses a counter which holds the depth of the on-chip stack and can require from none to 16 external memory cycles.

FLUSH-RSTACK—Empty all on-chip Return Stack locations into off-chip RAM. (This instruction is useful for multitasking applications). This instruction accesses a counter which holds the depth of the on-chip Return Stack and can require from none to 16 external memory cycles.

It should further be apparent to those skilled in the art that various changes in form and details of the invention as shown and described may be made. It is intended that such changes be included within the spirit and scope of the claims appended hereto.

What is claimed is:

1. A microprocessor, which comprises a main central processing unit and a separate direct memory access central processing unit in a single integrated circuit comprising said microprocessor, said main central processing unit having an arithmetic logic unit, a first push down stack with a top item register and a next item register, connected to provide inputs to said arithmetic logic unit, an output of said arithmetic logic unit being connected to said top item register, said top item register also being connected to provide inputs to an internal data bus, said internal data bus being bidirectionally connected to a loop counter, said loop counter being connected to a decrementer, said internal data bus being bidirectionally connected to a stack pointer, return stack pointer, mode register and instruction register, said internal data bus being connected to a memory controller, to a Y register of a return push down stack, an X register and a program counter, said Y register, X register and program counter providing outputs to an internal address bus, said internal address bus providing inputs to said memory controller and to an incrementer, said incrementer being connected to said internal data bus, said direct memory access central processing unit providing inputs to said memory controller, said memory controller having an address/data bus and a plurality of control lines for connection to a random access memory.

2. The microprocessor of claim 1 in which said memory controller includes a multiplexing means between said central processing unit and said address/data bus, said multiplexing means being connected and configured to provide row addresses, column addresses and data on said address/data bus.

3. The microprocessor of claim 1 in which said memory controller includes means for fetching instructions for said central processing unit on said address/data bus, said means for fetching instructions being configured to fetch multiple sequential instructions in a single memory cycle.

4. The microprocessor of claim 3 additionally comprising means connected to said means for fetching instructions for determining if multiple instructions fetched by said means for fetching instructions require a memory access, said means for fetching instructions fetching additional multiple instructions if the multiple instructions do not require a memory access.

5. The microprocessor of claim 3 in which said microprocessor and a dynamic random access memory are contained in a single integrated circuit and said means for fetching instructions includes a column latch for receiving the multiple instructions.

6. The microprocessor of claim 1 in which said microprocessor includes a sensing circuit and a driver circuit, and an output enable line for connection between the random access memory, said sensing circuit and said driver circuit, said sensing circuit being configured to provide a ready signal when said output enable line reaches a predetermined electrical level, said microprocessor being configured so that said driver circuit provides an enabling signal on said output enable line responsive to the ready signal.

7. The microprocessor of claim 1 additionally comprising a ring oscillator variable speed system clock connected to said main central processing unit, said main central processing unit and said ring oscillator variable speed system clock being provided in a single integrated circuit.

8. The microprocessor of claim 7 in which said memory controller includes an input/output interface connected to exchange coupling control signals, addresses and data with said main central processing unit, said microprocessor additionally including a second clock independent of said ring oscillator variable speed system clock connected to said input/output interface.

9. The microprocessor of claim 1 in which said first push down stack has a first plurality of stack elements configured as latches, a second plurality of stack elements configured as a random access memory, said first and second plurality of stack elements and said central processing unit being provided in a single integrated circuit, and a third plurality of stack elements configured as a random access memory external to said single integrated circuit.

10. The microprocessor of claim 9 additionally comprising a first pointer connected to said first plurality of stack elements, a second pointer connected to said second plurality of stack elements, and a third pointer connected to said third plurality of stack elements, said central processing unit being connected to pop items from said first plurality of stack elements, said first stack pointer being connected to said second stack pointer to pop a first plurality of items from said second plurality of stack elements when said first plurality of stack elements are empty from successive pop operations by said central processing unit, said second stack pointer being connected to said third stack pointer to pop a second plurality of items from said third plurality of stack elements when said second plurality of stack elements are empty from successive pop operations by said central processing unit.

* * * * *

(12) EX PARTE REEXAMINATION CERTIFICATE (8052nd)
United States Patent
Moore et al.

(10) Number: US 5,530,890 C1
(45) Certificate Issued: Mar. 1, 2011

(54) HIGH PERFORMANCE, LOW COST MICROPROCESSOR

(75) Inventors: Charles H. Moore, Woodside, CA (US); Russell H. Fish, III, Mt. View, CA (US)

(73) Assignee: Patriot Scientific Corporation, San Diego, CA (US)

Reexamination Request:
No. 90/009,388, Jan. 16, 2009

Reexamination Certificate for:
Patent No.: 5,530,890
Issued: Jun. 25, 1996
Appl. No.: 08/480,206
Filed: Jun. 7, 1995

Related U.S. Application Data

(62) Division of application No. 07/389,334, filed on Aug. 3, 1989, now Pat. No. 5,440,749.

(51) Int. Cl.
*G06F 15/76* (2006.01)

(52) U.S. Cl. .............. 712/32; 711/E12.02; 712/E9.016; 712/E9.028; 712/E9.046; 712/E9.055; 712/E9.057; 712/E9.058; 712/E9.062; 712/E9.078; 712/E9.08; 712/E9.081

(58) Field of Classification Search .................. None
See application file for complete search history.

(56) References Cited

U.S. PATENT DOCUMENTS

| | | | |
|---|---|---|---|
| 3,603,934 A | 9/1971 | Heath, Jr. et al. |
| 3,696,414 A | 10/1972 | Allen et al. |
| 3,810,117 A | 5/1974 | Healey |
| 3,849,765 A | 11/1974 | Hamano |
| 3,878,513 A | 4/1975 | Werner |

(Continued)

FOREIGN PATENT DOCUMENTS

EP 113516 A2 7/1984

EP 200797 A1 11/1986

(Continued)

OTHER PUBLICATIONS

"35ns 256K Device, VLSI Debuts SRAM Designed With Hitachi," Electronic News, p. 25 (Apr. 17, 1989).

(Continued)

*Primary Examiner*—Joseph R. Pokrzywa

(57) ABSTRACT

A microprocessor (50) includes a main central processing unit (CPU) (70) and a separate direct memory access (DMA) CPU (72) in a single integrated circuit making up the microprocessor (50). The main CPU (70) has a first 16 deep push down stack (74), which has a top item register (76) and a next item register (78), respectively connected to provide inputs to an arithmetic logic unit (ALU) (80) by lines (82) and (84). An output of the ALU (80) is connected to the top item register (76) by line (86). The output of the top item register (82) is also connected by line (88) to an internal data bus (90). A loop counter (92) is connected to a decrementer (94) by lines (96) and (98). The loop counter (92) is birectionally connected to the internal data bus (90) by line (100). Stack pointer (102), return stack pointer (104), mode register (106) and instruction register (108) are also connected to the internal data bus (90) by lines (110), (112), (114) and (116), respectively. The internal data bus (90) is connected to memory controller (118) and to gate (120). The gate (120) provides inputs on lines (122), (124), and (126) to X register (128), program counter (130) and Y register (132) of return push down stack (134). The X register (128), program counter (130) and Y register (132) provide outputs to internal address bus (136) on lines (138), (140) and (142). The internal address bus provides inputs to the memory controller (118) and to an incremeter (144). The incremeter (144) provides inputs to the X register, program counter and Y register via lines (146), (122), (124) and (126). The DMA CPU (72) provides inputs to the memory controller (118) on line (148). The memory controller (118) is connected to RAM by address/data bus (150) and control lines (152).

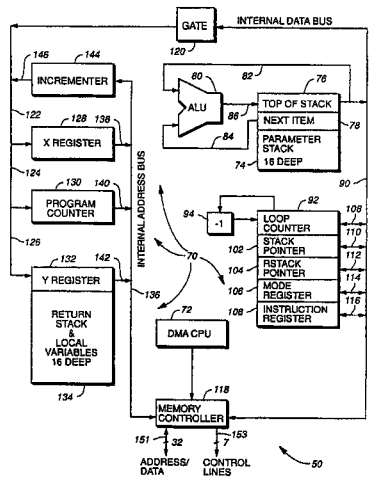

U.S. PATENT DOCUMENTS

| | | |
|---|---|---|
| 3,919,695 A | 11/1975 | Gooding |
| 3,924,245 A | 12/1975 | Eaton et al. |
| 3,930,688 A | 1/1976 | Rau et al. |
| 3,967,104 A | 6/1976 | Brantingham et al. |
| 3,968,501 A | 7/1976 | Gilbert |
| 3,969,706 A | 7/1976 | Proebsting et al. |
| 3,976,977 A | 8/1976 | Porter et al. |
| 3,980,993 A | 9/1976 | Bredart et al. |
| 3,988,717 A | 10/1976 | Kisylia |
| 4,003,028 A | 1/1977 | Bennett et al. |
| 4,003,033 A | 1/1977 | O'Keefe et al. |
| 4,016,545 A | 4/1977 | Lipovski |
| 4,037,090 A | 7/1977 | Raymond, Jr. |
| 4,042,972 A | 8/1977 | Gruner et al. |
| 4,050,058 A | 9/1977 | Garlic |
| 4,050,096 A | 9/1977 | Bennett et al. |
| 4,050,297 A | 9/1977 | Pettingell et al. |
| 4,067,058 A | 1/1978 | Brandstaetter et al. |
| 4,067,059 A | 1/1978 | Derchak |
| 4,075,691 A | 2/1978 | Davis et al. |
| 4,079,338 A | 3/1978 | Kronlage |
| 4,079,455 A | 3/1978 | Ozga |
| 4,107,773 A | 8/1978 | Gilbreath et al. |
| 4,110,822 A | 8/1978 | Porter et al. |
| 4,112,490 A | 9/1978 | Pohlman et al. |
| 4,125,871 A | 11/1978 | Martin |
| 4,128,873 A | 12/1978 | Lamiaux |
| 4,144,562 A | 3/1979 | Cooper |
| 4,181,938 A | 1/1980 | Suzuki et al. |
| 4,215,401 A | 7/1980 | Holsztynski et al. |
| 4,217,637 A | 8/1980 | Faulkner et al. |
| 4,217,652 A | 8/1980 | Klaus et al. |
| 4,223,380 A | 9/1980 | Antonaccio et al. |
| 4,223,880 A | 9/1980 | Brems |
| 4,224,676 A | 9/1980 | Appelt |
| 4,236,152 A | 11/1980 | Masuzawa et al. |
| 4,240,137 A | 12/1980 | Matsumoto et al. |
| 4,242,735 A | 12/1980 | Sexton |
| 4,253,785 A | 3/1981 | Bronstein |
| 4,255,785 A | 3/1981 | Chamberlin |
| 4,292,668 A | 9/1981 | Miller et al. |
| 4,295,193 A | 10/1981 | Pomerene |
| 4,305,045 A | 12/1981 | Metz et al. |
| 4,315,305 A | 2/1982 | Siemon |
| 4,315,308 A | 2/1982 | Jackson |
| 4,317,227 A | 2/1982 | Skerlos |
| 4,320,467 A | 3/1982 | Glass |
| 4,321,706 A | 3/1982 | Craft |
| 4,328,557 A | 5/1982 | Gastinel |
| 4,334,268 A | 6/1982 | Boney et al. |
| 4,335,447 A | 6/1982 | Jerrim |
| 4,338,675 A | 7/1982 | Palmer et al. |
| 4,348,720 A | 9/1982 | Blahut et al. |
| 4,348,743 A | 9/1982 | Dozier |
| 4,354,228 A | 10/1982 | Moore et al. |
| 4,358,728 A | 11/1982 | Hashimoto |
| 4,361,869 A | 11/1982 | Johnson et al. |
| 4,364,112 A | 12/1982 | Onodera et al. |
| 4,376,977 A | 3/1983 | Bruinshorst |
| 4,382,279 A | 5/1983 | Ugon |
| 4,390,946 A | 6/1983 | Lane |
| 4,396,979 A | 8/1983 | Mor et al. |
| 4,398,263 A | 8/1983 | Ito |
| 4,398,265 A | 8/1983 | Puhl et al. |
| 4,402,042 A | 8/1983 | Guttag |
| 4,403,303 A | 9/1983 | Howes et al. |
| 4,412,283 A | 10/1983 | Mor et al. |
| 4,425,628 A | 1/1984 | Bedard et al. |
| 4,449,201 A | 5/1984 | Clark |
| 4,450,519 A | 5/1984 | Guttag et al. |
| 4,453,229 A | 6/1984 | Schaire |
| 4,462,073 A | 7/1984 | Grondalski |
| 4,463,421 A | 7/1984 | Laws |
| 4,467,420 A | 8/1984 | Murakami et al. |
| 4,467,444 A | 8/1984 | Harmon, Jr. et al. |
| 4,467,810 A | 8/1984 | Vollmann |
| 4,471,426 A | 9/1984 | McDonough |
| 4,472,789 A | 9/1984 | Sibley |
| 4,488,217 A | 12/1984 | Binder et al. |
| 4,488,227 A | 12/1984 | Miu et al. |
| 4,491,938 A | 1/1985 | Leach |
| 4,494,021 A | 1/1985 | Bell et al. |
| 4,494,187 A | 1/1985 | Simpson |
| 4,503,500 A | 3/1985 | Magar |
| 4,509,115 A | 4/1985 | Manton et al. |
| 4,538,239 A | 8/1985 | Magar |
| 4,539,655 A | 9/1985 | Trussell et al. |
| 4,541,045 A | 9/1985 | Kromer, III |
| 4,541,111 A | 9/1985 | Takashima et al. |
| 4,553,201 A | 11/1985 | Pollack, Jr. |
| 4,556,063 A | 12/1985 | Thompson et al. |
| 4,558,176 A | 12/1985 | Arnold et al. |
| 4,562,537 A | 12/1985 | Barnett et al. |
| 4,566,063 A | 1/1986 | Zolnowsky et al. |
| 4,571,709 A | 2/1986 | Skupnjak et al. |
| 4,577,282 A | 3/1986 | Caudel et al. |
| 4,586,127 A | 4/1986 | Horvath |
| 4,607,332 A | 8/1986 | Goldberg |
| 4,616,338 A | 10/1986 | Helen et al. |
| 4,626,798 A | 12/1986 | Fried |
| 4,626,985 A | 12/1986 | Briggs |
| 4,626,988 A | 12/1986 | George |
| 4,627,082 A | 12/1986 | Pelgrom et al. |
| 4,630,195 A | 12/1986 | Hester et al. |
| 4,630,934 A | 12/1986 | Arber |
| 4,641,246 A | 2/1987 | Halbert et al. |
| 4,649,471 A | 3/1987 | Briggs et al. |
| 4,660,155 A | 4/1987 | Thaden et al. |
| 4,660,180 A | 4/1987 | Tanimura et al. |
| 4,665,495 A | 5/1987 | Thaden |
| 4,670,837 A | 6/1987 | Sheets |
| 4,679,166 A | 7/1987 | Berger et al. |
| 4,680,698 A | 7/1987 | Edwards et al. |
| 4,689,581 A | 8/1987 | Talbot |
| 4,691,124 A | 9/1987 | Ledzius et al. |
| 4,698,750 A | 10/1987 | Wilkie et al. |
| 4,701,884 A | 10/1987 | Aoki et al. |
| 4,704,678 A | 11/1987 | May |
| 4,708,490 A | 11/1987 | Arber |
| 4,709,329 A | 11/1987 | Hecker |
| 4,710,648 A | 12/1987 | Hanamura et al. |
| 4,713,749 A | 12/1987 | Magar et al. |
| 4,714,994 A | 12/1987 | Oklobdzija et al. |
| 4,718,081 A | 1/1988 | Brenig |
| 4,720,812 A | 1/1988 | Kao et al. |
| 4,724,517 A | 2/1988 | May |
| 4,739,475 A | 4/1988 | Mensch, Jr. |
| 4,750,111 A | 6/1988 | Crosby, Jr. et al. |
| 4,758,948 A | 7/1988 | May et al. |
| 4,760,521 A | 7/1988 | Rehwald et al. |
| 4,761,763 A | 8/1988 | Hicks |
| 4,763,297 A | 8/1988 | Uhlenhoff |
| 4,766,567 A | 8/1988 | Kato |
| 4,772,888 A | 9/1988 | Kimura |
| 4,777,591 A | 10/1988 | Chang et al. |
| 4,780,814 A | 10/1988 | Hayek |
| 4,782,439 A | 11/1988 | Borkar et al. |
| 4,783,734 A | 11/1988 | May et al. |
| 4,783,764 A | 11/1988 | Tsuchiya et al. |
| 4,787,032 A | 11/1988 | Culley |
| 4,791,590 A | 12/1988 | Ku et al. |

| | | | | | | |
|---|---|---|---|---|---|---|
| 4,794,526 A | 12/1988 | May et al. | | 5,121,502 A | 6/1992 | Rau et al. |
| 4,794,558 A | 12/1988 | Thompson | | 5,127,091 A | 6/1992 | Boufarah et al. |
| 4,797,850 A | 1/1989 | Amitai | | 5,127,092 A | 6/1992 | Gupta et al. |
| 4,803,621 A | 2/1989 | Kelly | | 5,133,064 A | 7/1992 | Hotta et al. |
| 4,805,091 A | 2/1989 | Thiel et al. | | 5,134,701 A | 7/1992 | Mueller et al. |
| 4,809,169 A | 2/1989 | Sfarti et al. | | 5,146,592 A | 9/1992 | Pfeiffer et al. |
| 4,809,269 A | 2/1989 | Gulick | | 5,148,385 A | 9/1992 | Frazier |
| 4,811,208 A | 3/1989 | Myers et al. | | 5,157,772 A | 10/1992 | Watanabe |
| 4,816,989 A | 3/1989 | Finn et al. | | 5,179,689 A | 1/1993 | Leach et al. |
| 4,816,996 A | 3/1989 | Hill et al. | | 5,179,734 A | 1/1993 | Candy et al. |
| 4,819,151 A | 4/1989 | May | | 5,187,799 A | 2/1993 | McAuley et al. |
| 4,833,599 A | 5/1989 | Colwell et al. | | 5,226,147 A | 7/1993 | Fujishima et al. |
| 4,835,733 A | 5/1989 | Powell | | 5,237,699 A | 8/1993 | Little et al. |
| 4,835,738 A | 5/1989 | Niehaus et al. | | 5,239,631 A | 8/1993 | Boury et al. |
| 4,837,563 A | 6/1989 | Mansfield et al. | | 5,241,636 A | 8/1993 | Kohn |
| 4,837,682 A | 6/1989 | Culler | | 5,261,057 A | 11/1993 | Coyle et al. |
| 4,847,752 A | 7/1989 | Akashi | | 5,261,082 A | 11/1993 | Ito et al. |
| 4,847,757 A | 7/1989 | Smith | | 5,261,109 A | 11/1993 | Cadambi et al. |
| 4,849,875 A | 7/1989 | Fairman et al. | | 5,325,513 A | 6/1994 | Tanaka et al. |
| 4,853,841 A | 8/1989 | Richter | | 5,339,448 A | 8/1994 | Tanaka et al. |
| 4,860,198 A | 8/1989 | Takenaka | | 5,353,417 A | 10/1994 | Fuoco et al. |
| 4,868,735 A | 9/1989 | Moller et al. | | 5,353,427 A | 10/1994 | Fujishima et al. |
| 4,870,562 A | 9/1989 | Kimoto et al. | | 5,379,438 A | 1/1995 | Bell et al. |
| 4,872,003 A | 10/1989 | Yoshida | | 5,410,654 A | 4/1995 | Foster et al. |
| 4,882,710 A | 11/1989 | Hashimoto et al. | | 5,410,682 A | 4/1995 | Sites et al. |
| 4,885,785 A | 12/1989 | Reynolds et al. | | 5,414,862 A | 5/1995 | Suzuki et al. |
| 4,890,225 A | 12/1989 | Ellis, Jr. et al. | | 5,421,000 A | 5/1995 | Fortino et al. |
| 4,899,275 A | 2/1990 | Sachs et al. | | 5,440,749 A | 8/1995 | Moore et al. |
| 4,907,225 A | 3/1990 | Gulick et al. | | 5,459,846 A | 10/1995 | Hyatt |
| 4,910,703 A | 3/1990 | Ikeda et al. | | 5,511,209 A | 4/1996 | Mensch, Jr. |
| 4,912,632 A | 3/1990 | Gach et al. | | 5,530,890 A | 6/1996 | Moore et al. |
| 4,914,578 A | 4/1990 | MacGregor et al. | | 5,537,565 A | 7/1996 | Hyatt |
| 4,924,384 A | 5/1990 | Hao et al. | | 5,604,915 A | 2/1997 | Moore et al. |
| 4,926,323 A | 5/1990 | Baror et al. | | 5,659,703 A | 8/1997 | Moore et al. |
| 4,931,748 A | 6/1990 | McDermott et al. | | 5,809,336 A | 9/1998 | Moore et al. |
| 4,931,986 A | 6/1990 | Daniel et al. | | 5,874,584 A | 2/1999 | Wear et al. |
| 4,933,835 A | 6/1990 | Sachs et al. | | 6,598,148 B1 | 7/2003 | Moore et al. |
| 4,942,553 A | 7/1990 | Dalrymple et al. | | | | |
| 4,956,811 A | 9/1990 | Kajigaya et al. | | | | |

FOREIGN PATENT DOCUMENTS

| | | |
|---|---|---|
| EP | 208287 A2 | 1/1987 |
| EP | 0 238 810 | 9/1987 |
| EP | 288649 A1 | 11/1988 |
| EP | 0 786 730 | 6/2000 |
| GB | 8233733 | 11/1982 |
| JP | 57-20979 | 2/1982 |
| JP | 57-196334 | 12/1982 |
| JP | 58025710 A | 2/1983 |
| JP | 58-103043 | 6/1983 |
| JP | 61127228 A | 6/1986 |
| JP | 61138356 A | 6/1986 |
| JP | 62145413 A | 6/1987 |
| JP | 63-026753 | 2/1988 |
| JP | 5189383 A | 7/1993 |
| WO | WO 81/00473 | 2/1981 |
| WO | 8803091 A1 | 5/1988 |
| WO | WO 91/02311 | 2/1991 |

| | | |
|---|---|---|
| 4,959,782 A | 9/1990 | Tulpule et al. |
| 4,967,326 A | 10/1990 | May |
| 4,967,352 A | 10/1990 | Keida et al. |
| 4,967,398 A | 10/1990 | Jamoua et al. |
| 4,969,091 A | 11/1990 | Muller |
| 4,974,157 A | 11/1990 | Winfield et al. |
| 4,979,102 A | 12/1990 | Tokuume |
| 4,980,821 A | 12/1990 | Koopman et al. |
| 4,984,176 A | 1/1991 | Van den Heuvel |
| 4,988,892 A | 1/1991 | Needle |
| 4,989,113 A * | 1/1991 | Asal .................... 710/22 |
| 4,989,133 A | 1/1991 | May et al. |
| 4,989,135 A | 1/1991 | Miki |
| 4,990,847 A | 2/1991 | Ishimaru et al. |
| 5,008,816 A | 4/1991 | Fogg, Jr. et al. |
| 5,013,985 A | 5/1991 | Itoh et al. |
| 5,021,991 A | 6/1991 | MacGregor et al. |
| 5,022,395 A | 6/1991 | Russie |
| 5,023,689 A | 6/1991 | Sugawara |
| 5,031,092 A | 7/1991 | Edwards et al. |
| 5,036,300 A | 7/1991 | Nicolai |
| 5,036,460 A | 7/1991 | Takahira et al. |
| 5,047,921 A | 9/1991 | Kinter et al. |
| 5,053,952 A | 10/1991 | Koopman, Jr. et al. |
| 5,068,781 A | 11/1991 | Gillett, Jr. et al. |
| 5,070,451 A | 12/1991 | Moore et al. |
| 5,081,574 A | 1/1992 | Larsen et al. |
| 5,091,846 A | 2/1992 | Sachs et al. |
| 5,097,437 A | 3/1992 | Larson |
| 5,103,499 A | 4/1992 | Miner et al. |
| 5,107,457 A | 4/1992 | Hayes et al. |
| 5,109,495 A | 4/1992 | Fite et al. |

OTHER PUBLICATIONS

"IBM RT Personal Computer Technology," IBM Corp. 1986. (collection of papers by developers).

Acorn Computers, Ltd., Acorn RISC Machine CPU Software Manual, Issue 1.00 Oct. 1985.

Acorn's RISC leapfrog, Acorn User special issue, Jun. 1987; 59: 149–153.

Agrawal et al., "Design Considerations for a Bipolar Implementation of SPARC," Compcon Spring apos;88. Thirty–Third IEEE Computer Society International Conference, Digest of Papers, Feb. 29–Mar. 3, 1988, pp. 6–9.

Agrawal, "An 80 MHz Bipolar ECL Implementation of SPARC," Sun Microsystems, Inc., Jun. 25, 1989, 40 pages total.

Alliacense Product Report—Preliminary Review, USP 5,440,749; GPS Car Navigation Main Processor.

Alliacense Product Report—Preliminary Review, USP 5,440,749; GPS Navigation System GPS Chipset.

Alliacense Product Report—Preliminary Review, USP 5,440,749; GPS Navigation System Main Microprocessor.

Alliacense Product Report—Preliminary Review, USP 5,440,749; Kyocera Digital Camera Finecam S3R Image Processor.

Alliacense Product Report—Preliminary Review, USP 5,440,749; PDA/Mobile Navigation, GPS Processor.

Alliacense U.S. Patent No. 5,784,584 Product Report, NEC Microcomputer, V850E2 32 Bit Microcontroller, pp. 1–8 (2006).

Alliacense U.S. Patent No. 5,784,584 Product Report, TLCS–900/H1 Series TMP92C820, Toshiba Microcontroller TMP92C820 / TCLS–900/H1 Series 16–bit Microcontroller, pp. 1–9 (2006).

Alliacense U.S. Patent No. 5,809,336 Product Report, Toshiba Microcontroller TMP93CS44/S45 / TLCS–900/L Series 16–bit Microcontroller (2006).

Alliacense U.S. Patent No. 5,809,336 Product Report, NEC Microcontroller UDP789478, 8 Bit Microcontroller, 38 pages (2006).

Alliacense U.S. Patent No. 5,809,336 Product Report, Toshiba Microcontroller TMP92CZ26 / TMP92CW26, 32 bit Microcontroller (2006).

Alliacense U.S. Patent No. 5,809,336 Product Report, Toshiba MPEG–4 Audiovisual LSI TC35273 MPEG–4 Audiovisual Code LSI (2006).

Anderson, D.W., The IBM System/360 Model 91: Machine Philosophy and Instruction Handling, IBM Journal, IBM, Jan. 1967, pp. 8–24.

ARM Datasheet, Part No. 1 85250 0360 0, Issue No. 1 (Mar. 17, 1987).

ATMEL SPARC Instruction Set, "Assembly Language Syntax," Rev. 4168C–AERO–08/01, 2002.

Bagula, "A 5V Self–Adaptive Microcomputer with 16Kb of #2 Program Storage and Security," IEEE International Solid–State Circuit Conference, 1983, pp. 34–35.

Bayko, Great Microprocessors of the Past and Present (V 11.7.0), downloaded from: <<http://web.archive.org/web/20010107210400/http://bwrc.eecs.berkeley.edu/CIC/Archive/cup_history.html>>, Feb. 2007, 60 pages total.

Bit SPARC Integer Unit B5000 Datasheet attached to a presentation by Anant Agrawal in 1989, 28 pages.

Books Review: Operating Systems A Systematic View, William S. Davis, Addison–Wesley Publishing Company, Inc., 1987; 26(4):453–454.

Bosshart et al., "A 533K–Transistor LISP Processor Chip," IEEE Journal of Solid State Circuits, SC–22(5): 808–819 (Oct. 1987).

Bourke, "Character Synchronization During Overrun Conditions," Delphion, IBM Technical Disclosure Bulletin, Dec. 1977.

Cal Run Fortran Guide, University of California, Computer Center, Berkeley, 292 pages total. (Sep. 1974).

CDC 6000 Computer Systems—COBOL Instant 6000, Version 3; Control Data Publication No. 60327600A (Apr. 1971).

CDC 6000 Computer Systems, 7600 Computer Systems: Fortran Extended Instant 6000 Version 3, 7600 Version 1; Control Publication No. 60305900A (May 1971).

CDC 6000 Computer Systems/ 7600 Computer Systems: Fortran Extended Reference Manual, 6000 Version 3, 7600 Version 1; Control Data Publication No. 60329100, Revision D (1972).

CDC 6000 Series Computer System, 6642 Distributive Data Path Operation and Programming Reference Manual; Control Data Publication No. 60376300C (Mar. 1979).

CDC 6000 Series Computer Systems—Chippewa Operating System Documentation, vol. I, Preliminary Edition (updated May 1966).

CDC 6000 Series Computer Systems—Chippewa Operating System Documentation, vol. II, Preliminary Edition, Peripheral Packages and Overlays (Oct. 1965).

CDC 6000 Series Computer Systems—Chippewa Operating System Documentation, vol. III, Preliminary Edition, DSD—The Systems Display, (Nov. 1965).

CDC 6000 Series Computer Systems Ascent General Information Manual; Control Data Publication No. 60135400 (Feb. 1966).

CDC 6000 Series Computer Systems Chippewa Operating System Reference Manual; Control Data Publication No. 60134400 (Dec. 1965).

CDC 6000 Series Computer Systems Hardware Reference Manual; Control Data Publication No. 60100000 (Aug. 1978).

CDC 6000 Series Computer Systems/ 7600 Computer System: 6000 Compass Version 2, 7600 Versions 1 &2 Reference Manual; Control Data Publication No. 60279900, Revision D. (1970, 1971, 1972).

CDC 6000 Series Computer Systems: Chippewa Operating System Fortran Reference Manual; Control Data Publication No. 60132700A (May 1966).

CDC 6000 Series Computer Systems: Peripheral Equipment Reference Manual; Control Data Publication No. 60156100, Revision J (Mar. 1970).

CDC 6000 Series Computer Systems: Site Preparation and Installation Manual; Control Data Publication No. 60142400, Revision B (Sep. 1965).

CDC 6000 Series Computer Systems: FORTRAN Extended General Information, Control Data Publication No. 60176400 (Oct. 1966).

CDC 6000 Series FORTRAN Extended 4.0, Internal Maintenance Specifications, (1971).

CDC 6000 Series Introduction and Peripheral Processors Training Manual, Second Edition; Control Data Publication No. 60250400 (Nov. 1968).

CDC 6400 Central Processor; Control Data Publication No. 60257200 (Feb. 1967).

CDC 6400/6500/6600 Ascent–To–Compass Translator; Control Data Publication No. 60191000 (Mar. 1967).

CDC 6400/6500/6600 Computer System Input/Output Specification; Control Data Publication No. 60045100 (Sep. 1967).

CDC 6400/6500/6600 Computer System Instant SMM; Control Data Publication No. 60299500 (Nov. 1969).

CDC 6400/6500/6600 Computer Systems Compass Reference Manual; Data 60190900, Revision B (Mar. 1969).

CDC 6400/6500/6600 Computer Systems Reference Manual; Control Data Publication No. 60100000, Revision K (Aug. 1970).

CDC 6400/6500/6600 Computer Systems Reference Manual; Control Data Publication No. 60100000D (1965, 1966, 1967).
CDC 6400/6500/6600 Extended Core Storage Systems Reference Manual; Control Data Publication No. 60225100, (Feb. 1968).
CDC 6400/6500/6600 Jovial General Information Manual; Control Data Publication No. 60252100A (Mar. 1969).
CDC 6400/6600 Computer Systems: Ascent/Asper Reference Manual; Control Data Publication No. 60172700 (Jul. 1966).
CDC 6400/6600 Fortan Conversion Guide; Data Publication No. 60175500 (Aug. 1966).
CDC 6400/6600 Systems Bulletin (Oct. 10, 1966), 84 pages.
CDC 6400/6600, Export/Import 8231 Reference Manual; Data Publication No. 60189100 (Apr. 1967).
CDC 6600 Central Processor vol. 1; Control &Memory; Data Control Publication No. 020167 (Mar. 1967).
CDC 6600 Central Processor, vol. 2; Functional Units; Control Data Publication No. 60239700 (Mar. 1967).
CDC 6600 Chassis Tabs; Control Data Publication No. 63016700A (Apr. 1965).
CDC 6600 Chassis Tabs; Control Data Publication No. 63019800 (Mar. 1965).
CDC 6600 Chippewa Operating System; Control Data Publication No. 60124500, Revision C (Apr. 1965).
CDC 6600 Computer System 6601 A–J, 6613A/B/C, 6604A/B/C, 6614–A/B/C Central Processor (Including Functional Units) vol. 1, Diagrams & Circuit Description; Control Data Publication No. 60119300BT(Jan. 1968).
CDC 6600 Computer System 6601 A–J, 6613A/B/C, 6604A/B/C, 6614–A/B/C Peripheral and Control MW Processor/Central Memory/Clock/Extended Core Storage Coupler (Std Opt 10102 and/or Spec Opt 60080)/ Power Wiring, vol. 2, Diagrams & Circuit Descriptions; Control Data Publication No. 60119300BT (Jan. 1968).
CDC 6600 Computer System Operating System/Reference Manual, SIPROS66, 1st ed.; Control Data Publication No. 60101800A (1965).
CDC 6600 Computer System Programming System/Reference Manual, vol. 1. Ascent; Control Data Publication No. 60101600B (1965).
CDC 6600 Computer System Programming System/Reference Manual, vol. 2. Asper; Control Data Publication No. 60101700B (1965).
CDC 6600 Computer System Programming vol. 3, Fortran 66; Control Data Publication No. 60101500B (1965).
CDC 6600 Computer Training Manual vol. 2, Preliminary Edition, Section 7.2 Shift Functional Units, 164 pages.
CDC 6600 Data Channel Equipment 6602–B/6612–A, 6603–B, 6622–A, 6681–B, 6682–A/6683–A, S. O. 60022, 60028,60029, Diagrams & Circuit Description' Control Data Publication No. 60125000, Revision G (Jun. 1966).
CDC 6600 Training Manual; Control Data Publication No. 60147400, Revision A (Jun. 1965).
CDC 6603—A/B/C Disk File Controller Reference Manual; Control Data Publication No. 60334000 (1970).
CDC 6638 Disk File Subsystem Training Supplement; Control Data Publication No. 602500800A (Oct. 1968).
CDC 6638 Disk File System: Standard Option 10037–A, 6639–A/B File Controller—Diagrams and Circuit Description/Maintenance/Maintenance Aids/Parts List/Wire Lists/Chassis Tabs; Control Data Publication No. 60227300, Revision H (Mar. 1974).

CDC 6639—A/B Disk File Controller Reference Manual; Control Data Publication No. 60334100E (Aug. 1973).
CDC 6639 Disk Controller Training Manual Test Edition (Sep. 1967), 28 pages.
CDC APL Version 2 Reference Manual, CDC Operating Systems: NOS; Control Data Publication No. 60454000F (Nov. 1980).
CDC Basic Version 3 Reference Manual: NOS 1 &NOS/BE 1; Control Data Publication No. 19983900G (Oct. 1980).
CDC Chippewa Operating System, Document Class ERS, System No. E012, Version 1.1; External Reference Specifications—Chippewa Operating System, (Jun. 1966).
CDC Chippewa Operating System, Document Class SIR, System No. E012, Version 1.0, (Mar. 3, 1966).
CDC Chippewa Operating System, Document Class SIR, System No. E012, Version 1.1, (Mar. 3, 1966).
CDC Cobol Version 4 Instant Manual, Cyber 170 Series, Cyber 70 Models 72, 73, 74, 6000 Series; Control Data Publication No. 60497000A (Feb. 1976).
CDC Cobol Version 5 Instant Manual,Operating Systems: NOS 1/BE 1; Control Data Publication No. 60497300B (Feb. 1981).
CDC Codes/Control Data 6400/6500/6600 Computer Systems; Control Data Publication No. 60141900, Revision C (Jun. 15, 1967).
CDC Codes/Control Data 6400/6500/6600/6700 Computer Systems; Control Data Publication No. 60141900, Revision D (Jun. 10, 1970).
CDC Codes/Control Data 6600; Control Data Publication No. 60141900, Revision A (May 1965).
CDC Compass Version3 Instant, Operating Systems: NOS 1, NOS 2, NOS/ BE 1, Scope 2; Control Data Publication No. 60492800D (Jun. 1982).
CDC Course No. FH4010–1C, NOS Analysis, Student Handout, Revision C (Apr. 1980).
CDC Course No. FH4010–4C NOS Analysis, Study Dump (Apr. 1980).
CDC Cyber 170 Models 720, 730, 740, 750 and 760 Model 176 (Level B/C) Computer Systems, Codes; Control Data Publication No. 60456920C, (Jun. 1981).
CDC Cyber 70 Computer Systems Models 72,73,74,6000 Computer Systems: Fortran Reference Manual Models 72,73,74 Version 2.3; 6000 Version 2.3; Control Data Publication No. 19980400, Revision F (Jul. 1972).
CDC Cyber 70 Computer Systems Models 72,73,74,76,7600 Computer System, 6000 Computer Systems—ALGOL Reference Manual, Cyber 70 Series Version 4, 6000 Series Version 4, 7600 Series Version 4; Control Data Publication No. 60384700A (Aug. 1973).
CDC Cyber 70 Computer Systems Models 72,73,74,76,7600 Computer System, 6000 Computer Systems: Cobol Instant Models 72, 73, 74 Version 4, Model 76 Version 1,6000 Version 4; Control Data Publication No. 60328400A (Dec. 1971).
CDC Cyber 70 Computer Systems Models 72,73,74,76,7600 Computer System, 6000 Computer OA Systems: Fortran Extended Instant Models 72, 73, 74 Version 4, Model 76 Version 2,7600 Version 2; Control Data Publication No. 60357900A (Nov. 1971).
CDC Cyber 70 Computer Systems Models 72,73,74,76,7600 Computer System, 6000 Computer Systems: Fortran Extended Reference Manual Models 72, 73, 74 Version 4, Model 76 Version 2,6000 Version 4; Control Data Publication No. 60305600A (Oct. 1971).

CDC Cyber 70 Series 6000 Series Computer Systems: APL *Cyber Reference Manual; Control Data Publication No. 19980400B (Jul. 1973).

CDC Cyber 70 Series Computer Systems Models 72,73,74, 6000 Series Computer Systems—Kornos 2.1 Workshop Reference Manual; Control Data Publication No. 974047000 (1976).

CDC Cyber 70 Series Models 72/73/74,6000 Series Computer Systems, Krono 2.1 Operator Guide; Control Data Publication Guide Control Data Publication No. 60407700A (Jun. 1973).

CDC Cyber 70 Series Models 72/73/74,6000 Series Computer Systems, Kronos 2.1 Installation Handbook; Control Data Publication No. 60407500A (Jun. 1973).

CDC Cyber 70 Series Models 72/73/74, 6000 Series Computer Systems, Kronos 2.1 Time–Sharing User's Reference Manual; Control Data Publication No. 60407600B (May 1974).

CDC Cyber 701 Model 76 Computer System, 7600 Computer System: Fortran Run, Version 2 Reference Manual; Control Data Publication No. 60360700C (May 1974).

CDC Cyber Interactive Debug Version 1 Guide for Users of Fortran Extended Version 4, CDC Operating Systems: NOS 1, NOS/BE 1, Control Data Publication No. 60482700A (Feb. 1979).

CDC Cyber Interactive Debug Version 1 Guide for Users of Fortran Version 5, Operating Systems: NOS 1, NOS / BE 1, Control Data Publication No. 60484100C (Sep. 1984).

CDC Cyber Interactive Debug Version 1 Reference Manual, NOS 1, NOS 2, NOS/ BE 1, Data Control Publication No. 60481400D (Jun. 1984).

CDC Cyber Loader Version 1 Instant, CDC Operating System NOS1, NOS/BE 1, Control Data Publication No. 60449800C (Aug. 1979).

CDC Disk Storage Subsystem—Operation and Programming Manual; Control Data Publication No. 60363900, Version T (1972–1980).

CDC Fortran Extended 2.0, Document Class ERS, System No. C012, (Dec. 1966).

CDC Fortran Extended 2.0, Document Class IMS, Internal Maintenance Specifications—64/65/6600 V Fortran Extended Version 2 (Mar. 1969).

CDC Fortran Extended Version 4 Instant Manual, Operating Systems: NOS 1, NOS/BE 1, Scope 2; Control Data Publication No. 60497900B (Jun. 1981).

CDC Fortran Extended, Sales Technical Memorandum (May 1967).

CDC Fortran Extended Version 5 Instant, CDC Operating Systems: NOS 1, NOS/BE 1, Scope 2; Control Data Publication No. 60483900A (Jan. 1981).

CDC GED Fortran Extended 1.0, Product No. C012, Dept. No. 254, Project No. 4P63FTN (Aug. 1967).

CDC Instant 6400/3500/6500 Simula; Control Data Publication No. 60235100, Revision A (Feb. 1969).

CDC Instant 6400/6500/6600 Compass; Control Data Publication No. 60191900, Revision A (1968).

CDC Instant Fortran 2.3 (6000 Series); Data Publication No. 60189500D (May 1969).

CDC Internal Maintenance Specification: Fortran V5, Part 1; Control Data Publication No. 77987506A.

CDC Internal Maintenance Specification: Fortran V5, Part 2; Control Data Publication No. 77987506A.

CDC Kronos 2.1 Reference Manual vol. 1 of 2; Control Data Cyber 70 Series Models 72/76/74, 6000 Series Computer Systems; Control Data Publication No. 60407000D (Jun. 1975).

CDC Model dd 60A Computer Control Console/Customer Engineering Manual; Control Data Publication No. 82100010 (Mar. 1965).

CDC Model dd60b Computer Control Console/Customer Engineering Manual; Control Data Publication No. 82103500 (Feb. 1967).

CDC Network Products: Network Access Method Version 1, Network Definition Language Reference Manual; Control Data Publication No. 60480000J (May 1981).

CDC Network Products: Network Terminal User's Instant— Operating System NOS 1; Control Data Publication No. 60455270C (Oct. 1980).

CDC NOS 2 Operations Handbook; Control Data Publication No. 60459310, (Aug. 1994).

CDC NOS Version 1 Applications Programmer's Instant, CDC Computer Systems: Cyber 170 Series, Cyber 70 Models 71,72,73,74,6000 Series; Control Data Publication No. 60436000H (Jan. 1980).

CDC NOS Version 1 Internal Maintenance Specification vol. 1 of 3; Control Data Publication No. 60454300B (Aug. 1979).

CDC NOS Version 1 Internal Maintenance Specification vol. 2 of 3; Control Data Publication No. 60454300B (Aug. 1979).

CDC NOS Version 1 Internal Mainenance Specification vol. 3 of 3; Control Data Publication No. 60454300B (Aug. 1979).

CDC NOS Version 1 Operator's Guide, CDC Computer Systems: Cyber 170 Series, Cyber 70 Model 71, 72,73,74,6000 Series (Dec. 1980).

CDC NOS Version 1 Reference Manual vol. 1 of 2, CDC Computer Systems: Cyber 170 Series, Cyber 70 Models 71,72,73,74,6000 Series; Control Data Publication No. 60435400J (1979).

CDC NOS Version 1 Reference Manual vol. 2 of 2, CDC Computer Systems: Cyber 170 Series, Cyber 70 Models 71, 72, 73, 74,6000 Series; Control Data Publication No. 60445300E (1977).

CDC NOS Version 1 System Maintenance Reference Manual; Control Data Publication No. 60455380H (Apr. 1981).

CDC NOS Version 2 Analysis Handbook, Cyber 180, Cyber 170, Cyber 70 Models 71, 72, 73, 74, 6000; Control Data Publication No. 60459300D (Oct. 1984).

CDC NOS Version 2 Analysis Handbook, Control Data Publication No. 60459300U (Jul. 1994).

CDC NOS Version 2 Installation Handbook, Cyber 180, Cyber 170, Cyber 70 Models 71, 72, 73, 74, 6000; Control Data Publication No. 60459320E_(Mar. 1985).

CDC NOS Version 2 Operation/Analysis Handbook, Cyber 170, Cyber 70 Models 71, 72, 73, 74, 6000, Control Data Publication No. 60459310C (Oct. 1983).

CDC NOS Version 2 System Maintenance Reference Manual, Cyber 170, Cyber 70 Models 71, 72, 73, 74, 6000; Control Data Publication No. 60459300C (Oct. 1983).

CDC NOS/BE Version 1 Diagnostic Handbook, Cyber 180, Cyber 170, Cyber 70 Models 71,72,73,74, 6000; Control Data Publication No. 60494400–V (1986).

CDC NOS/BE Version 1 Installation Handbook, Cyber 180, Cyber 170, Cyber 70 Models 71,72,73,74, 6000; Control Data Publication No. 60494300aB (Dec. 1986).

CDC NOS/BE Version 1 Reference Manual, Cyber 170 Series, Cyber 70 Models 71, 72, 73, 74, 6000 Series; Control Data Publication No. 60493800M (1981).

CDC Outline of Reports on Feasibility Study of 64/6600 Fortran Ver 3.0 and Conversational Fortran, Fortran Study Project, Product No. X010, Dept No. 254, Project No. 4P63, (Jun. 1966).

CDC Pascal Version 1 Reference Manual, Operating Systems: NOS 2; Control Data Publication No. 60497700 (Sep. 1983).

CDC Pascal Version 1 Reference Manual, Operating Systems: NOS 2; Control Data Publication No. 60497700A (Dec. 1982).

CDC PL/1 Version 1 Instant, CDC Operating Systems: NOS 1, NOS/ BE 1; Control Data Publication No. 60483700A (Nov. 1979).

CDC Simscript 11.5 Instant; Control Data Publication No. 84000450B (Sep. 1978).

CDC Sort/Merge Version 4 and 1 Instant, Operating Systems: NOS 1, NOS/BE 1, Scope 2; Control Data Publication No. 60497600C (Jan. 1981).

CDC Sort/Merge Version 5 Reference Manual, Operating Systems: NOS 2, NOS/BE 1, Control Data Publication No. 60484800C (Feb. 1984).

CDC SYMPL Version 1 Instant, NOS 1, NOS/BE 1, Scope 2; Control Data Publication No. 60482600A (May 1978).

CDC SYMPL Version 1 Users Guide, Operating Systems: NOS 1, NOS/BE 1, Scope 2; Control Data Publication No. 60499800B (Apr. 1978).

CDC Update Instant, Cyber 170 Series, Cyber 70 Series, 6000 Series, 7600 Computer Systems; Control Data Publication No. 60450000A (Nov. 1975).

CDC Update Reference Manual Operating Systems: Scope 3.4, Kronos 2.1; Control Data Publication No. 60342500, Revision H (1971–1976).

CDC Xedit Version 3 Reference Manual, Operating System: NOS 1; Control Data Publication No. 60455730B (Aug. 1979).

Chippewa Laboratories Fortran Compiler Run, Preliminary Edition, CDC 6000 Series Computer Systems, (Apr. 1966).

Cho et al., WAM 3.6: A 40K Cache Memory and Memory Management Unit, ISSCC '86, Feb. 19, 1986.

Cho et al., "The Memory Architecture and the Cache and Memory Management Unit for the Fairchild Clipper Processor," Report No. UCB/CSD 86/289, Computer Science Division (EECS), University of California (Apr. 1986).

CLIPPERTM 32–Bit Microprocessor, Introduction to the Clipper Architecture, published by Fairchild in 1986.

Cordell, II et al., "Advanced Interactive Executive Program Development Environment," IBM Systems Journal, 1987; 26(4):361–382.

Crawford, "The i486 Executing Instructions in One Clock Cycle," IEEE Micro, pp. 28–36 (Feb. 1990).

Cray–1 Computer System Hardware Reference Manual, Publication No. 2240004, Rev C, Nov. 4, 1977.

Disk Routines and Overlays, Chippewa Operating System, CDC Development Division—Applications, (Nov. 1965).

Ditzel et al., "The Hardware Architecture of the Crisp Microprocessor," AT &T Information Systems, ACM, pp. 309–319 and table of contents (1987).

DS5000 Soft Microcontroller User's Guide Preliminary V 1.0, Dallas Semiconductor.

Duell. C. H., "Everything that can be invented has been invented," 2 pages downloaded from http://www.tplgroup.net/patents/index.php.

Evans et al., "An Experimental 512–bit Nonvolatile Memory with Ferroelectric Storage Cell," IEEE Journal of Solid–Sate Circuits, 23(5):1171–1175.

Excerpt from A Seymour Cray Perspective http//research.microsoft.com/users/gbell/craytalk/sld029.htm (Slide 29).

Excerpts from A Seymour Cray Perspective http//research.Microsoft.com/users/gbell/craytalk/sld001.htm (Slide 1).

Fiasconaro, J., "Microarchitecture of the HP9000 Series 500 CPU," Microarchitecture of VLSI Computers, NATO ASI Series No. 96, Antognetti, eds., pp. 55–81.

Field Maintenance Print Set, KA780–01–01 Rev. A.

Fisher et al., "Very Long Instruction Word Architectures and the ELI–512," ACM pp. 140–150 (1983).

Fukui et al., "High Speed CMOS 4–bit Microcomputer SM550 Series," pp. 107–109 published 1982, 1983. (Document in Japanese).

Furber, VSLI RISC Architecture and Organization, Chapter 3: Commercial VLSI RISC, pp. 124–129, Marcel Dekker, Inc., 1989.

GE 600 Series, publication.

GE–625 / 635 Programming Reference Manual, revised Jan. 1996.

Gershon, Preface, IBM Systems Journal 26(4):324–325.

Green et al., "A Perspective on Advanced Peer–to–Peer Networking," IBM Systems Journal, 1987; 26(4):414–428.

Grimes et al., "64 bit Processor, The Intel i860 64–Bit Processor: A General–Purpose CPU with 3D Graphics Capabilities", published by Intel, p. 85 (Jul. 1989).

Grishman, R., "Assembly Language Programming for the Control Data 6000 and Cyber Series Algorithmics".

Grondalski et al., "Microprocessors–Special Purpose— THPM 16.3: A VLSI Chip Set for a Massively Parallel Architecture," 1987 IEEE International Solid–State Circuits Conference, Feb. 26, 1987, pp. 1998–198.

Gross et al., "Measurement and evaluation of MIPS architecture and processor," ACM Trans. Computer Systems, pp. 229–257 Aug. 1988.

Guttag, "The TMS34010: An Embedded Microprocessor", IEEE Micro, vol. 8, No. 3, May 1988, pp. 39–52.

Hansen, "A RISC Microprocessor with Integral MMU and Cache Interface," ICCD '86, pp. 145–148, 1986.

Hennessy et al., "Hardware/software tradeoff for increased performance," Proceedings of the Symposium on Architectural Support for Programming Languages and Operating Systems pp. 2–11. ACM, Apr. 1982.

Hennessy et al., "Hardware/software tradeoff for increased performance," Technical Report No. 22.8, Computer Systems Laboratory, Feb. 1983, 24 pages.

Hennessy et al., "MIPS: A Microprocessor Architecture," IEEE, pp. 17–22 (1982).

Hennessy et al., "MIPS: A VLSI Processor Architecture" VLSI Systems and Computer, Kung eds., Carnegi–Mellon University, pp. 337–346 (1981).

Hennessy et al., "The MIPS Machine", Compcon, IEEE, Spring 1982, pp. 2–7.

Hennessy, "Performance Issues in VLSI Processor Design," IEEE on VLSI in Computers, , pp. 153–156. (1983).

Hinton, 80960—Next Generation, Compcon Spring 89, IEEE, 13–16 (1989).

Hitachi America Ltd., "8–Bit Single–Chip Microprocessor Data Book", Jul. 1985, Table of Contents and pp. 251–279.

Hollingsworth et al., "The Fairchild Clipper: Instruction Set Architecture and Processor Implementation," Report No. UCB/CSD 87/329, Computer Science Division (EECS), University of California Berkeley, California, (Feb. 11, 1987).

Horowitz et al., "A 20—MIPS Peak, 32–bit Microprocessor with On–Chip Cache," IEEE Journal of Solid State Circuits, SC–22(5):790–799 (Oct. 1987).

HP 9000 Instrument Controllers, Technical Specifications Guide, Oct. 1989.

HP 9000 Series Computer Systems, HP–UX Reference 09000–090004, Preliminary Nov. 1982.

HP Sacajawea External Reference Specification Preliminary Version 1.1 (Jan. 14, 1987).

Hughes, "Off–Chip Module Clock Controller," Delphion, IBM Technical Disclosure Bulletin, Sep. 1989.

Hunter, "Introduction to the Clipper Architecture," IEEE Micro, pp. 6–26 (Aug. 1987).

IBM RT PC, Byte 1986 Extra Edition, Inside The IBM PCs, pp. 60–78.

IBM Systems Reference Library, IBM System/360 Model 67 Functional Characteristics, File No. S360–01, Form A27–2719–0, published by IBM (1967).

IEEE Std 796–1983, Microcomputer System Bus, pp. 9–46.

Index of/pdf/cdc/6x00, downloaded from http://www.bitsavers.org/pdf/cdc/6x00/.

INMOS Engineering Data, IMS T414M Transputer, Extended Temperature, (Aug. 1987).

INMOS IMS T212 Engineering Data Preliminary Data Sheet (Aug. 1987).

INMOS IMS T414 Data Sheet, (Jun. 1987).

INMOS IMS T414 Transputer, Engineering Data, pp. 107–163.

INMOS IMS T414 Transputer, Preliminary Data (Feb. 1987).

INMOS M212 Disk Processor Product Overview Oct. 1987, 12 pages total.

Intel 386TM DX Microprocessor 32–Bit CHMOS Microprocessor With Integrated Memory Management (1995).

Intel 4004 Data Sheet Single Chip 4–Bit 9–Channel Microprocessor, pp. 8–15 to 8–23.

Intel 8008 8–Bit Parallel Central Processor Unit, published by Intel (Nov. 1972), Users Manual.

Intel 80960CA User's Manual published by Intel (1989).

Intel Architecture Optimization Manual, Order No. 242816–003, published by Intel (1997).

Intel Architecture Software Developer's Manual, vol. 1: Basic Architecture, published by Intel (1997).

Intel i860 64–Bit Microprocessor, Intel Corporation Feb. 1989.

Intel MCS–4 Micro Computer Set, Integrated Circuit Engineering Collection (Nov. 1971).

Intel, iAPX 386 High Performance 32–Bit Microprocessor Product Review (Apr. 1984).

Intel 8080A/8080A–1/8080A–2, 8–Bit N–Channel Microprocessor, Order No. 231453–001, Its Respective Manufacturer (Nov. 1986).

Jguppi et al., "A 20 MIPS Sustained 32b CMOS with 64b Data Bus," IEEE Int'l Solid State Circuits Conf., pp. 84–86 (1989).

Johnson et al., "A Variable Delay Line PLL for CPU–Coprocessor Synchronization," IEEE Journal of Solid–State Circuits, 23(5): 1218–1223, Oct. 1988.

Katevenis et al., "Reduced Instruction Set Computer Architecture for VLSI," Doctoral Dessertation, Oct. 1983.

Katevenis et al., "The RISC II Micro–Architecture," Journal of VLSI and Computer Systems, 1(2): 138–152 (1984).

Kipp, "Micron Technology Inc. Reports Financial Results," Business Wire, New York, Sep. 26, 1988.

Kohn et al., "Introducing Intel i860 64–Bit Microprocessor," Intel Corporation, IEEE Micro (Aug. 1989).

Koopman, "RTX 4000," Proceedings of 1989 Rochester Forth Conference, pp. 84–86.

Koopman, "The WISC Concept: A proposal for a writable instruction set computer," Byte, pp. 187–193. (Apr. 1987).

Koopman, Jr. et al. "MVP Microcoded CPU/16 Architecture," Proceedings of 1986 Rochester Forth Conference, pp. 277–280.

Koopman, Jr. et al., "WISC Technologies, Inc., Writable Instruction Set, Stack Oriented Computers: The WISC Concept," 1987 Rochester Forth Conference, Journal of Forth Application and Research, 5(1):49–71.

"Stack Computers: the new wave, Chapter 5.2: Architecture of the FRISC 3 (SC32)", Philip Koopman, 1989, 9 pages.

Loucks et al., "Advanced Interactive Executive (AIX) Operating System Overview," IBM Systems Journal, 1987; 26(4):326–345.

LSI Logic Corporation MIPS Architecture RISC Technology Backgrounder, "Introduction to RISC Technology," LSI Logic Corporation (Apr. 1988).

Matick, "Self–Clocked Cache," Delphion, IBM Technical Disclosure Bulletin, Apr. 1985.

Matsushita Electric, 8 bit Dual1–chip Microcomputer MN1890 Series User's Manual, translation of original Japanese language document, by Matsushita Electric Industrial Co., Ltd. Semiconductor Sales Division.

Matsushita Electronics Corporation, MN1880 (MN18882) Instruction Manual, (document in Japanese), 1988.

Matsushita Electronics Corporation, MN188166 User's Manual, Japanese language document.

Matsushita Electronics Corporation, MN18882 LSI User's Manual, Japanese language document, 1987.

Matsushita Electronics Corporation, Specification Sheet, MN18882 (Book1) translation of the Japanese language original, Code No. MIG0175, Matsushita Electronics Industry Corporation, Microcomputer Products Division, Oct. 22, 1990.

Matthys R. J., Crystal Oscillator Circuits, John Wiley &Sons, pp. 25–64 (1983).

May, "The Transputer and Occam," International Conference on the Impact of Digital Microelectronics and Microprocessors on Particle Physics, held Mar. 28–30, 1988, published by World Scientific in 1988, Budnich, eds. pp. 205–211.

May, D., "The Influence of VLSI Technology on Computer Architecture," INMOS Ltd., pp. 247–256 (1988).

Mead et al., eds., Introduction to VLSI Systems, Addison Wesley Publishers, (1980), 144 pages.

Miller, Frequency Modulated Ring Oscillator for a Mode Regulated Substrate Bias Generator, Delphion, IBM Technical Disclosure Bulletin, Sep. 1989.

Mills et al., "Box Structured Information Systems," IBM Systems Journal, 1987; 26(4):395–413.

Minyard, Using a TMS320C30 Serial Port as an Asynchronous RS–232 Port, Application Brief: SPRA240, Texas Instruments (May 1994).

MMP Portfolio, News Release: Roland Becomes 50th Licensee, Setting a Major Milestone in Moore Microprocessor Patent Licensing Program, 3 pages (May 1, 2009).

Moelands, A. P. M., "Serial I/O with the MAB8400 series microcomputers," Electronic Components and Applications, 3(1):38–46 (1980).

Moore, P., "INMOS Technical Note 15: IMS B005 Design of a Disk Controller board with drives," Dec. 3, 1986.

Mostek Corp., Adveriesment, EDN, Nov. 20, 1976.

Motorola Inc., MC 68332 32–Bit Microcontroller System Integration User's Manual Preliminary Edition, Revision 0.8, (1989).

Motorola MC146805H2, Advance Information, pp. 1–12.

Motorola MC68HC11A8 HCMOS Single–Chip Microcomputer, table of contents and introduction (1985).

Motorola Semiconductors MC146805H2, Product Brochure.

Motorola, "How to Take Control" product brochure by Motorola (1988).

Motorola, MC68300 Family MC68332 User's Manual, (1995).

Moussouris et al., "A CMOS RISC Processor Integrated System Functions," Proceedings of 31st IEEE Computer Society International Conference, Cathedral Hill Hotel, San Francisco, CA Mar. 3–6, 1986, pp. 126–131, 1986.

National Semiconductor HPC16400/HPC36400/HPC46400 High–Performance MicroControllers with HDLC Controller product literature.

NEC Data Sheet MOS Integrated Circuit uPD75008, 4 bit Single–Chip Microcomputer (1989).

NEC Electronics Inc. High–End, 8–Bit, Single–Chip CMOS Microcomputers product literature.

NEC Electronics Inc. Microcomputer Products Microprocessors, Peripherals, & DSP Products Data Book vol. 2 of 2 cover page.

NEC Electronics Inc. Microcomputer Products Single–Chip Products Data Book vol. 1 of 2 cover page.

NEC Electronics Inc. MOS Integrated Circuit uPD70208H, 70216H Data Sheet, V40HL, V50HL 16/8, 16–Bit Microprocessor (1995).

NEC Electronics Inc. MOS Integrated Circuit uPD7225 Programmable LCD Controller/Driver (1986, 1999).

NEC Electronics Inc. uPD78C10/C11/C14 8–Bit, Single–Chip CMOS Microcomputers with A/D Converter product literature.

Olson, Semiconductor Die with Wiring Skirt (Packaging Structure), Delphion, IBM Technical Disclosure Bulletin, Jul. 1978.

O'Neil, "Pipeline Memory System for Drams", Delphion, IBM Technical Disclosure Bulletin, May 1989.

Paker, Y, Multi–Processor Systems, Academic Press, pp. 1–23 (1983).

Patterson et al., "Architecture of a VLSI Instruction Cache for a RISC," ACM, pp. 108–116 (1983).

Patterson et al., "RISC I: A Reduced Instruction Set VLSI Computer," Proceedings of the 8th annual symposium on Computer Architecture on Computer Architecture, Minneapolis, Minnesota, pp. 443–457 (May 1981).

Patterson, "RISC Watch", ACM, vol. 12 (1):11–19 (Mar. 1984).

Patterson, D. A., "Reduced Instruction Set Computers" Communication of the ACM, 28(1):.8–21, Jan. 1985.

Pountain, "The Archimedes A310," Byte, 1987.

Przybyiski et al., "Organizational and VLSI Implementation of MIPS," Technical Report: CSL–TR–84–259, Apr. 1984.

Przybyiski, "The Design Verification and Testing of MIPS", 1984 Conference on Advanced Research in VLSI, pp. 100–109.

Rau et al., "The Cydra 5 Departmental Supercomputer, Design Philosophies, Decisions, and Tradeoffs," IEEE, pp. 12–36 (1989).

Reekie, Realtime DSP: The TMS320C30 Course, Revision 3 (Feb. 20, 1994).

RISC Roots: CDC 6000 (1965) www.//bwrc.eecs.berkeley.edu/CIC/archive/cpu_history.html, downloaded Oct. 27, 2006.

Roche et al., "Method of Assuming a Two–Cycle Start, Zero Cycle Stop, Non–Chopping on Chip Clock Control Throughout a VLSI Clock System," Delphion, IBM Technical Disclosure Bulletin, Sep. 1989.

Rowen et al., "A Pipelined 32b NMOS Microprocessors and Microcontrollers," IEEE International Solida–State Circuits Conference, pp. 180–181, 1984.

Rubinfeld et al., "The CVAX CPU, A CMOS VAX Microprocessor Chip", International Conference on Computer Design, Oct. 1987.

Ryan, D.P., "Intel's 80960: An Architecture Optimized for Embedded Control," IEEE Micro, published in Jun. 1988.

Sanamrad et al., "A Hardware Syntactic Analysis Processor," IEEE, Aug. 1987, pp. 73–80.

Sequin et al., "Design and Implementation of RISC I," pp. 276–298 from VLSI Architecture, B. Randell and P.C. Treleaven, editors, Prentice Hall, 1983.

Shepherd et al., "Current and Future Transputers," INMOS Presentation given at Jun. 15, 1988 Workshop on Computer Architecture.

Sherburne, R. W., "Processor Design Tradeoffs in VLSI," U.C. Berkeley, May 1984. PhD Dissertation.

Shih, "Microprogramming Heritage of RISC Design," Proceedings of the 23rd annual workshop and symposium on Microprogramming and microarchitecture, pp. 275–280. (1990).

Shyam, "Hardware External Reference Specification for Enhanced Champion/Paladin," Revision of Nov. 11, 1986.

Sibigtroth, J. M., "Motorola's MC68HC11: Definition and Design of a VLSI Microprocessor," IEEE Micro, 4(1):54–65 (1984).

Signetics Microprocessor Data manual cover page.

Signetics Microprocessor Products Data manual, 8X330 Floppy Disk Formatter/Controller product specification.

Signetics Microprocessor Products Data manual, SC96AH Series Single–Chip 16–Bit Microcontrollers preliminary specification.

Simpson et al., "The IBM RT PC ROMP Processor and Memory Management Unit Archiecture," IBM systems Journal, Dec. 1987; 26(4):346–360.

Simpson, R.O., "The IBM RT Personal Computer," Byte 11 (11):43–78 (Oct. 1986).

Skruhak et al., "Modular Design of a High Performance 32–bit Microcontroller," IEEE 1989 Custom Integrated Circuits Conference, pp. 23.8.1–23.8.4 (1989).

Stanley, R. C., "Microprocessors in brief," IBM J. Res. Develop., 29(2):110–118 (Mar. 1985).

Submicron Systems Architecture Project, Caltech Computer Science Technical Report, Nov. 1, 1991.

Sultan et al., "Implementing System–36 Advanced Peer-to-Peer Networking," IBM Systems Journal, 1987; 26(4):429–452.

Texas Instrument, "TMS 370 Microcontroller Family User's Guide," (1996), 873 pages.

Texas Instruments TMS320C30 Digital Signal Processor product literature, SPRS032A (Apr. 1996, Revised Jun. 1997).

Texas Instruments TMS34010 Graphics System Processor product literature.

The Ring Oscillator VCO Schematic, 1 page.

Thornton, J. E., "Considerations in Computer Design Leading Up To the Control Data 6600," Control Data Chippewa Laboratory (1970).

Thornton, J. E., "Design of a Computer, The Control Data 6600," published by Advanced Design Laboratory (1970).

Toshiba TLCS–42, 47, 470 User's Manual Published in Apr. 1986.

Ungar et al., "Architecture of SOAR: Smalltalk on a RISC," Proceedings of the 11th Annual International Symposium on Computer Architecture ISCA '84. ACM Press, New York, NY pp. 188–197 (1984).

VAX 11/780 Architecture Handbook vol. 1, 1977–1978, 2–7 and G–8.

VAX 8800 System Technical Description vol. 2, EK–KA881–TD–PRE, Section 6, Instruction Box (IBOX), Preliminary Edition (Jul. 1986).

VAX Maintenance Handbook: VAX–11/780, EK–VAXV2–HB–002, 1983 Edition.

Waters et al., "AIX Usability Enhancements and Human Factors," IBM Systems Journal, 1987; 26(4):383–394.

Whiteby–Streven, "Transputer Technical Notes from INMOS," Google Groups; comp.sys.transputer, dated Sep. 7, 1988.

Williams, "Chip Set Tackles Laptop Design Issues, Offers Flat–Panel VGA Control," Computer Design, Oct. 15, 1988; 27(19):21–22.

Agrawal, "Bipolar ECL Implementation," The SPARC Technical Papers, Catanzaro, eds., Springer–Verlag, NY, pp. 201–211. (1991).

Gill et al. Summary of MIPS Instruction. CSL Technical Note No. 237, Computer Systems Laboratory, Stanford University, Nov. 1983. 50 pages total.

Hennessy et al., "Design of a High Performance VSL Processor," Third Caltech Conference on Very Large Scale Integration, Bryant eds., California Institute of Technology, Computer Science Press, pp. 33–54. (1983).

Horowitz et al., "A 32b Microprocessor with On–Chip 2Kbyte Instruction Cache," IEEE International Solid State Circuits Conference, pp. 30, 31 and 328 (1987).

Knapp, "Frequency Stability Analysis of Transistorized Crystal Oscillator," IEEE Transactions on Instrumentation and Measurement, vol. 12, No. 1, pp. 2–5. (Jun. 1963).

Nicoud et al., "The Transputer Instruction Set," IEEE Micro, vol. 9, No. 3, pp. 60–75 (May 1989).

Parasuraman, "High Performance Microprocessor Architectures," Proceedings of the IEEE, vol. 64, No. 6, pp. 851–859. (Jun. 1976).

Walls et al., "A Frequency–Lock System for Improved Quartz Crystal Oscillator Performance," IEEE Transactions on Instrumentation and Measurement, vol. IM–27, No. 3, pp. 249–252 (Sep. 1978).

Acorn Computers Limited; "ARM Datasheet, Part No. 1 85250 0360 0"; Issue No. 1.0; Mar. 17, 1987.

Barron, I. et al.; "Transputer does 5 or more MIPS even when not used in parallel"; Electronics; McGraw–Hill; vol. 56, No. 23; Nov. 17, 1983; pp. 109–115.

Best et al.; "An Advanced–Architecture CMOS/SOS Microprocessor"; IEEE Micro; vol. 2, No. 3; Jul. 1982; pp. 10–26.

Burroughs Corp.; "Burroughs B5500 Information Processing Systems Reference Manual"; 1964.

Dowsing and Woodhams; "Computer Architecture, A First Course"; Van Nostrand Reinhold Co., Ltd. (UK); 1985; pp. 126–139.

Haley, A. et al.; "Forth as Machine Code"; Electronics & Wireless World; vol. 93; No. 1616; Jun. 1987; pp. 584–587.

IC Master; "F8/3870 F6800 Bit–Slice Faichild Microcomputers"; United Technical Publications; 1980; pp. 2016–2040.

INMOS Limited; "IMS T212 Transputer Data Sheet"; Aug. 1987.

INMOS Limited; "IMS T414 Transputer Data Sheet"; Feb. 1987.

INMOS Limited; "IMS T424 Transputer Reference Manual"; Nov. 1984; p. i–62.

INMOS Limited; "IMS T800 Transputer Data Sheet"; Apr. 1987.

Intel; "80386 Programmer's Reference Manual"; 1986.

Koopman, Jr., Philip; "Stack Computers, the new wave"; 1989.

Motorola; "Motorola MC68020 32–Bit Microprocessor User's Manual, Second Edition"; Prentice–Hall; 1985.

Proebsting et al.; "A TTL Compatible 4096–bit N–channel RAM"; Solid–State Circuits Conference; Digest of Technical Papers; 1973 IEEE International vol. XVI; Feb. 1973; pp. 28–29.

Schoeffler, J.; "Microprocessor Architecture"; Industrial Electronics and Control Instrumentation, IEEE Transactions on; vol. IECI–22, issue 3; Aug. 1975; pp. 256–272.

Whitby–Strevens, C.; "The Transputer"; The 12$^{th}$ Annual International Symposium on Computer Architecture, Conference Proceedings; Jun. 17–19, 1985; pp. 292–300.

VLSI Technologies, Inc.; "VL86C010 RISC Family Data Manual"; 1987.

PCT Appl. No. PCT/US90/04245, International Search Report dated Jan. 23, 1991.

EP Appln No. 97200767.8, European Search Report (illegible date).

JP Appln No. 1990–511130.

"A single chip digital signal processor, Part I—architecture and addressing", Richard Pickvance, Electronic Engineering, Feb. 1985, vol. 57, No. 698, pp. 53–56, 59 and 63.

"The Architecture of the SC32 Forth Engine", Hayes et al., The Journal of Forth Application and Research, 1989, vol. 5, No. 4, pp. 493–506.

"Machine Forth, Machine Forth for the ARM processor", Reuben Thomas, Aug. 23, 1999, 10 pages.

"Stack Computers; the new wave, Chapter 5.2: Architecture of the FRISC 3 (SC32)", Philip Koopman, 1989, 9 pages.

The Motorola MC68020, MacGregor, D. et al., IEEE Micro, vol. 4, issue 4, Aug. 1984, pp. 101–118.

MC68020 32–Bit Microprocessor User's Manual, Motorola, Prentice–Hall, 1984.

MOSTEK 1981 3870 / F8 Microcomputer Data Book Feb. 1981, pp. III–76—VI–11.

F8/3870 F6800 Bit–Slice Fairchild Microcomputers United Technical Publications, IC Master, 1980, pp. 2016–2040.

80386 Programmer's Reference Manual Intel, 1986.

Transputer Reference Manual INMOS, Prentice Hall, 1988.

\* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 5-10 is confirmed.

Claims 1-4 are cancelled.

New claims 11-20 are added and determined to be patentable.

*11. A microprocessor, which comprises a main central processing unit and a separate direct memory access central processing unit in a single integrated circuit comprising said microprocessor, said main central processing unit having an arithmetic logic unit, a first push down stack with a top item register and a next item register, connected to provide inputs to said arithmetic logic unit, an output of said arithmetic logic unit being connected to said top item register, said top item register also being connected to provide inputs to an internal data bus, said internal data bus being bidirectionally connected to a loop counter, said loop counter being connected to a decrementer, said internal data bus being bidirectionally connected to a stack pointer, return stack pointer, mode register and instruction register, said stack pointer pointing into said first push down stack, said internal data bus being connected to a memory controller, to a Y register of a return push down stack, an X register and a program counter, said Y register, X register and program counter providing outputs to an internal address bus, said internal address bus providing inputs to said memory controller and to an incrementer, said incrementer being connected to said internal data bus, said direct memory access central processing unit providing inputs to said memory controller, said memory controller having an address/data bus and a plurality of control lines for connection to a random access memory.*

*12. The microprocessor of claim 11 in which said memory controller includes a multiplexing means between said central processing unit and said address/data bus, said multiplexing means being connected and configured to provide row addresses, column addresses and data on said address/data bus.*

*13. The microprocessor of claim 11 in which said memory controller includes means for fetching instructions for said central processing unit on said address/data bus, said means for fetching instructions being configured to fetch multiple sequential instructions in a single memory cycle.*

*14. The microprocessor of claim 13 additionally comprising means connected to said means for fetching instructions for determining if multiple instructions fetched by said means for fetching instructions require a memory access, said means for fetching instructions fetching additional multiple instructions if the multiple instructions do not require a memory access.*

*15. The microprocessor of claim 13 in which said microprocessor and a dynamic random access memory are contained in a single integrated circuit and said means for fetching instructions includes a column latch for receiving the multiple instructions.*

*16. The microprocessor of claim 11 in which said microprocessor includes a sensing circuit and a driver circuit, and an output enable line for connection between the random access memory, said sensing circuit and said driver circuit, said sensing circuit being configured to provide a ready signal when said output enable line reaches a predetermined electrical level, said microprocessor being configured so that said driver circuit provides an enabling signal on said output enable line responsive to the ready signal.*

*17. The microprocessor of claim 11 additionally comprising a ring oscillator variable speed system clock connected to said main central processing unit, said main central processing unit and said ring oscillator variable speed clock being provided in a single integrated circuit.*

*18. The microprocessor of claim 17 in which said memory controller includes an input/output interface connected to exchange coupling control signals, addresses and data with said main central processing unit, said microprocessor additionally including a second clock independent of said ring oscillator variable speed system clock connected to said input/output interface.*

*19. The microprocessor of claim 11 in which said first push down stack has a first plurality of stack elements configured as latches, a second plurality of stack elements configured as a random access memory, said first and second plurality of stack elements and said central processing unit being provided in a single integrated circuit, and a third plurality of stack elements configured as a random access memory external to said single integrated circuit.*

*20. The microprocessor of claim 19 additionally comprising a first pointer connected to said first plurality of stack elements, a second pointer connected to said second plurality of stack elements, and a third pointer connected to said plurality of stack elements, said central processing unit being connected to pop items from said first plurality of stack elements, said first stack pointer connected to said second stack pointer to pop a first plurality of items from said second plurality of stack elements when said first plurality of stack elements are empty from successive pop operations by said central processing unit, said second stack pointer being connected to said third stack pointer to pop a second plurality of items from said third plurality of stack elements when said second plurality of stack elements are empty from successive pop operations by said central processing unit.*

\* \* \* \* \*